US012702119B2

(12) United States Patent
Shackelford et al.

(10) Patent No.: US 12,702,119 B2
(45) Date of Patent: Aug. 11, 2026

(54) SYSTEMS AND METHODS OF IMPLEMENTING AT RESELLER FLEXIBLE AND CUSTOMIZABLE ARCHITECTURE OF TRANSACTION LEVEL SECURITY, AUTHENTICATION AND DIGITAL VERIFICATION OF COUPONS THAT IS CUSTOMER-CENTRIC

(71) Applicant: IDEXX Laboratories, Inc., Westbrook, ME (US)

(72) Inventors: Phillip G. Shackelford, Memphis, TN (US); Nick Meurrier, Memphis, TN (US)

(73) Assignee: IDEXX LABORATORIES, INC., Westbrook, ME (US)

( * ) Notice: Subject to any disclaimer, the term of this patent is extended or adjusted under 35 U.S.C. 154(b) by 0 days.

(21) Appl. No.: 19/044,029

(22) Filed: Feb. 3, 2025

(65) Prior Publication Data

US 2025/0176502 A1 Jun. 5, 2025

Related U.S. Application Data

(63) Continuation-in-part of application No. 17/715,393, filed on Apr. 7, 2022, now Pat. No. 12,213,454, which is a continuation of application No. 16/883,973, filed on May 26, 2020, now Pat. No. 11,297,802.

(51) Int. Cl.

| | |
|---|---|
| ***G08B 23/00*** | (2006.01) |
| ***A01K 29/00*** | (2006.01) |
| ***G06Q 40/10*** | (2023.01) |

(52) U.S. Cl.

CPC .......... *A01K 29/005* (2013.01); *G06Q 40/10* (2013.01)

(58) Field of Classification Search

CPC .. A01K 29/005; G06Q 40/10; G06Q 30/0224; G06Q 30/0236; G06Q 30/02; G06Q 30/0211; G06Q 30/0213; G06Q 30/0216; G06Q 30/0222; G06Q 30/0223; G06Q 30/0231; G06Q 30/0233; Y02P 90/84; Y02P 90/90

USPC .......... 340/573.3, 573.1; 119/421, 417, 452; 705/14.1, 14.15

See application file for complete search history.

(56) References Cited

U.S. PATENT DOCUMENTS

| | | | | |
|---|---|---|---|---|
| 8,799,060 | B2 * | 8/2014 | Gillenson .......... | G06Q 30/0216 705/14.1 |
| 9,070,133 | B2 * | 6/2015 | Thibedeau ......... | G06Q 30/0239 |
| 9,965,770 | B2 * | 5/2018 | Mason-Gugenheim .................... | G06Q 20/387 |

(Continued)

*Primary Examiner* — Anh V La

(74) *Attorney, Agent, or Firm* — ROSSI, KIMMS & McDOWELL LLP

(57) ABSTRACT

Systems and methods of processing transactions comprising using an interface to enable clinics to manage and opt-in to available coupons, submitting voucher codes to generate invoices, analyzing the invoices using rules that define requirements for a transaction to qualify for a coupon based on a combination of parameters to identify transactions that qualify for one or more coupons, identifying one or more redemptions for the identified transactions based on successful application of the defined plurality of rules for the opted-in coupons, generating a list of the one or more redemptions for each respective clinic, and validating the lists across a distribution network of products.

17 Claims, 32 Drawing Sheets

(56) References Cited

U.S. PATENT DOCUMENTS

| | | | | |
|---|---|---|---|---|
| 10,510,091 | B1 * | 12/2019 | Lesley ............... | G06Q 30/0238 |
| 11,978,079 | B2 * | 5/2024 | Singhal .............. | G06Q 30/0211 |

* cited by examiner

WELLNESS PLAN FOR PETS
310

Customized Parameters for a Plan
320

Customized Parameters for a Pet
330

Service Provider Transactions
340

Product Consumption
350

Conforming Products, Pricing Over Expiry Period
370

Clinic Profitability
360

PROCESS AND AUTHORIZE
380

| Doctor | Status | Products Commision % | Services Commision % | Employee ID | Initials | |
|---|---|---|---|---|---|---|
| Ashley Douglass DVM - RvRx | Active | 20% | 20% | 92647 | | EDIT |
| Ashley Douglas, DVM | Active | 20% | 20% | 92647 | | EDIT |
| Browns Bridge Animal Hospital | Active | 0% | 0% | | | EDIT |
| Dr. Alicia Moon, DVM | Active | 0% | 0% | | | EDIT |
| Dr. Brent Dennis, DVM | Active | 18% | 18% | 23607 | | EDIT |
| Dr. Brent Dennis, DVM RX code | Active | 18% | 18% | 23607 | | EDIT |
| MC Griffin DVM - RvRx | Active | 18% | 18% | 96745 | | EDIT |
| MC Griffin, DVM | Active | 18% | 18% | 96745 | | EDIT |

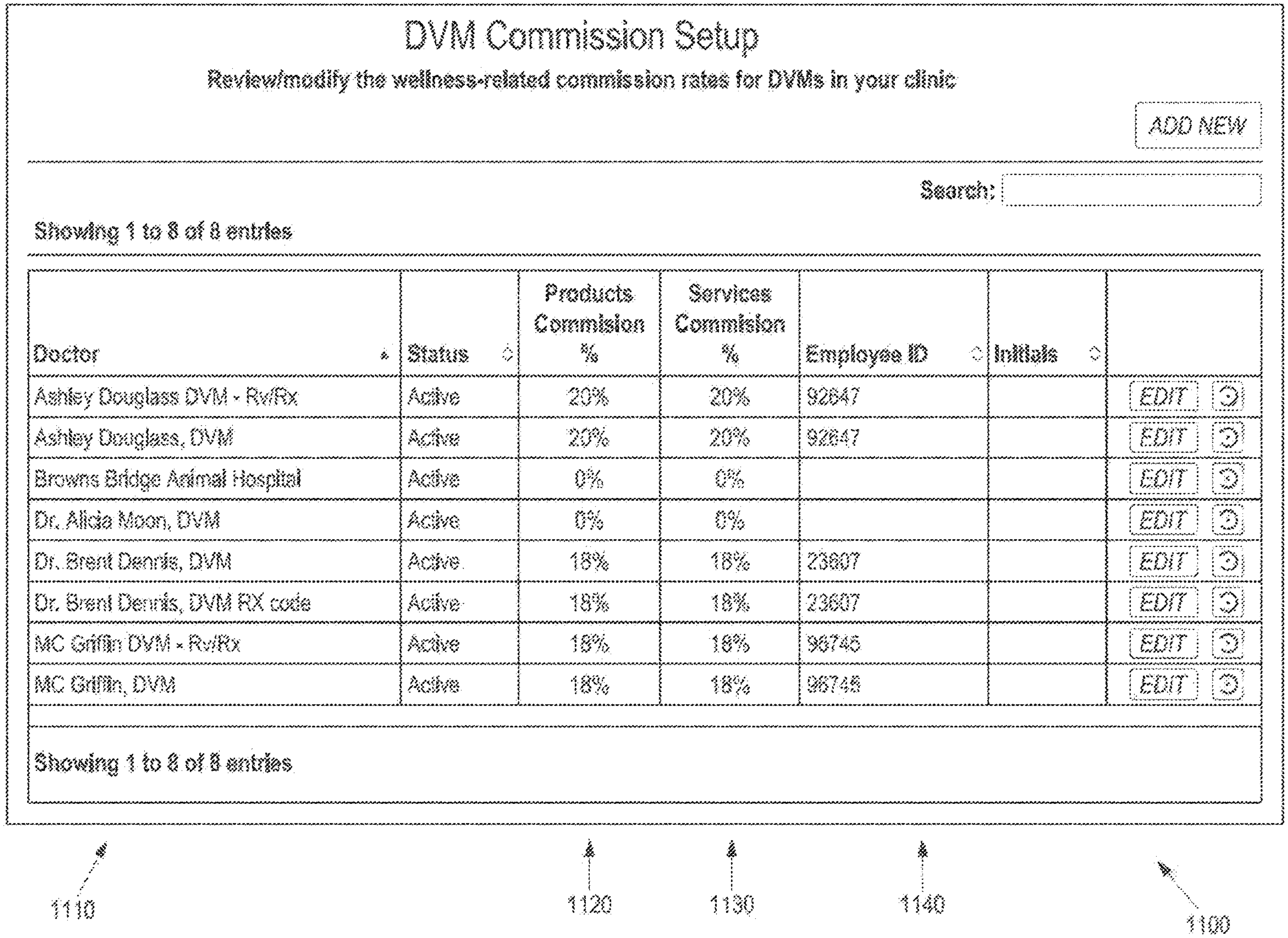

FIG. 11

Ashley Douglass, DVM

| | Client | Patient Name | Inv. # | Inv. Date | Product | Qty | Type | Commission Amount | Processed | |
|---|---|---|---|---|---|---|---|---|---|---|
| ○ | Cruz | Richie Vip | 118582 | 01/06/2020 | Rabies Vaccine-1 year Richie Vip | 1 use | Rabies 1 Yr | $3.00 | 1/7/20 6:29 AM | VOID |
| ○ | Fricke | Jake Vip | 118603 | 01/06/2020 | Wellness Plan Canine 0-25# Jake Vip | 1 | Plan Enrollment | ($7.80) | 1/9/20 9:13 AM | |
| ○ | Fricke | Jake Vip | 118603 | 01/06/2020 | Wp Puppy/Kitten Exam Jake Vip | 1 use | Exam | $6.63 | 1/9/20 9:13 AM | VOID |
| ○ | Fricke | Jake Vip | 118603 | 01/06/2020 | Fecal Exam Jake Vip | 1 use | Fecal/Parasite screen | $4.61 | 1/9/20 9:13 AM | VOID |
| ○ | Fricke | Jake Vip | 118603 | 01/06/2020 | Interceptor 2-8# Jake Vip | 1 month | Heartworm | $1.24 | 1/9/20 9:13 AM | VOID |
| ○ | Fricke | Jake Vip | 118603 | 01/06/2020 | Credelio 6.1-12# Jake Vip | 1 month | Flea/Tick | $2.95 | 1/9/20 9:13 AM | VOID |
| ○ | Garland | Sissy | 118543 | 01/04/2020 | DAPP- 1st Vaccine Sissy | 1 use | Puppy Vaccine | $3.19 | 1/9/20 9:13 AM | VOID |
| ○ | Garland | Sissy | 118543 | 01/04/2020 | Lepto 1st Vaccine Sissy | 1 use | Puppy Vaccine | $3.38 | 1/9/20 9:13 AM | VOID |
| ○ | Garland | Sissy | 118543 | 01/04/2020 | Credelio 25.1-50# Sissy | 3 months | Flea/Tick | $9.85 | 1/9/20 9:13 AM | VOID |
| ○ | Garland | Sissy | 118543 | 01/04/2020 | Interceptor 25.1-50# Sissy | 3 months | Heartworm | $4.42 | 1/9/20 9:13 AM | VOID |
| ○ | Garland | Sissy | 118543 | 01/04/2020 | Wellness Plan Canine 25-50# Sissy | 1 | Plan Enrollment | ($8.00) | 1/9/20 9:13 AM | |
| ○ | Garland | Sissy | 118543 | 01/04/2020 | Bordetella Vaccine Sissy | 1 use | Bordetella | $2.84 | 1/9/20 9:13 AM | VOID |
| ○ | Garland | Sissy | 118543 | 01/04/2020 | Fecal Exam Sissy | 1 use | Fecal/Parasite screen | $4.61 | 1/9/20 9:13 AM | VOID |
| ○ | Garland | Sissy | 118543 | 01/04/2020 | Heartworm Test Sissy | 1 use | Heartworm Test | $5.63 | 1/9/20 9:13 AM | VOID |
| ○ | Garland | Sissy | 118543 | 01/04/2020 | Rabies Vaccine-1 year Sissy | 1 use | Rabies 1 Yr | $3.00 | 1/9/20 9:13 AM | VOID |
| ○ | Garland | Sissy | 118543 | 01/04/2020 | Wellness Office Visit Sissy | 1 use | Exam | $8.02 | 1/9/20 9:13 AM | VOID |
| ○ | Jones | Mae Vip | 118655 | 01/08/2020 | Bordetella Vaccine Mae Vip | 1 use | Bordetella | $2.84 | 1/9/20 9:13 AM | VOID |
| ○ | Jones | Ella Vip | 118655 | 01/08/2020 | Bordetella Vaccine Ella Vip | 1 use | Bordetella | $2.84 | 1/9/20 9:13 AM | VOID |

Commissionable Price *Quantity*

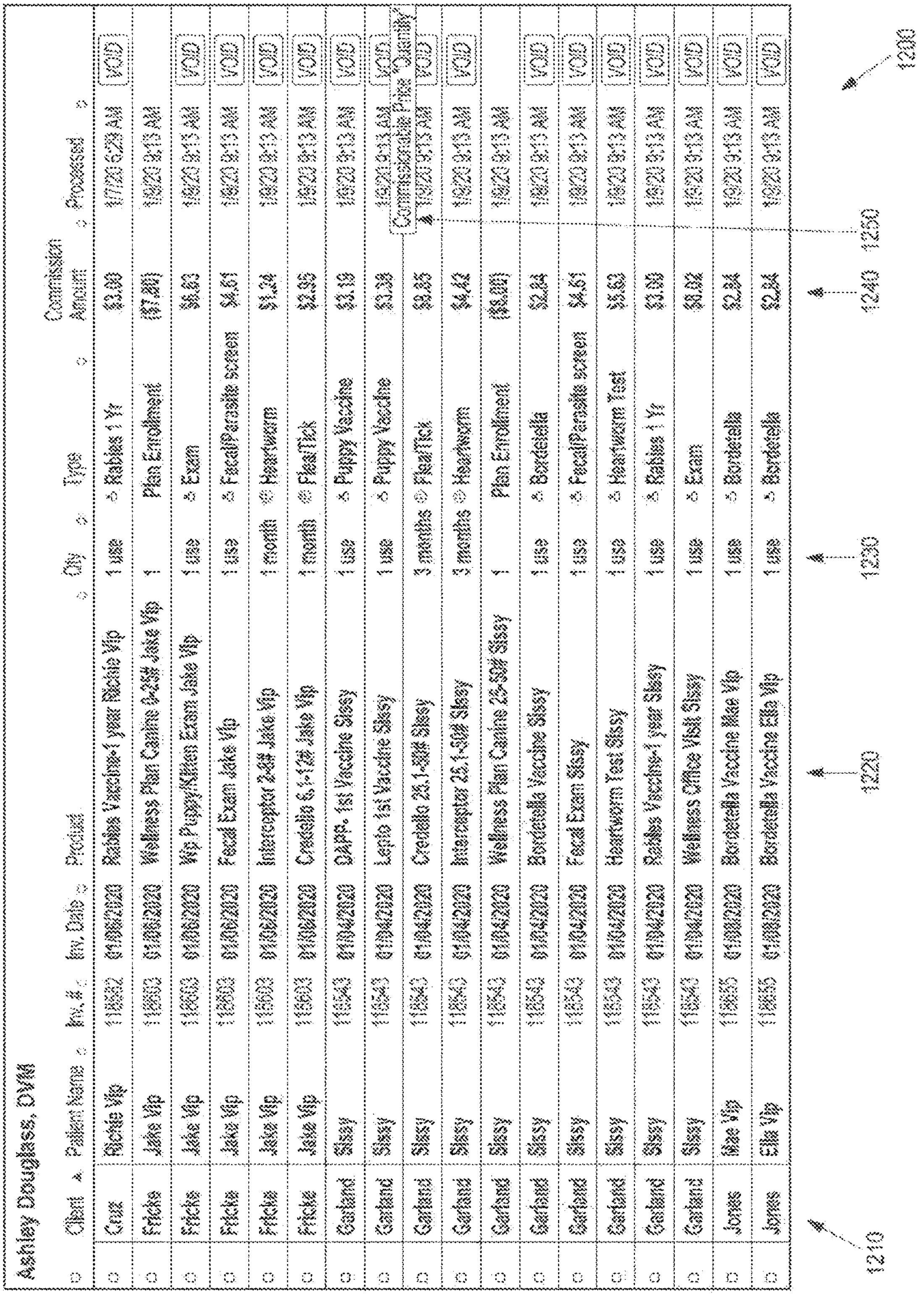

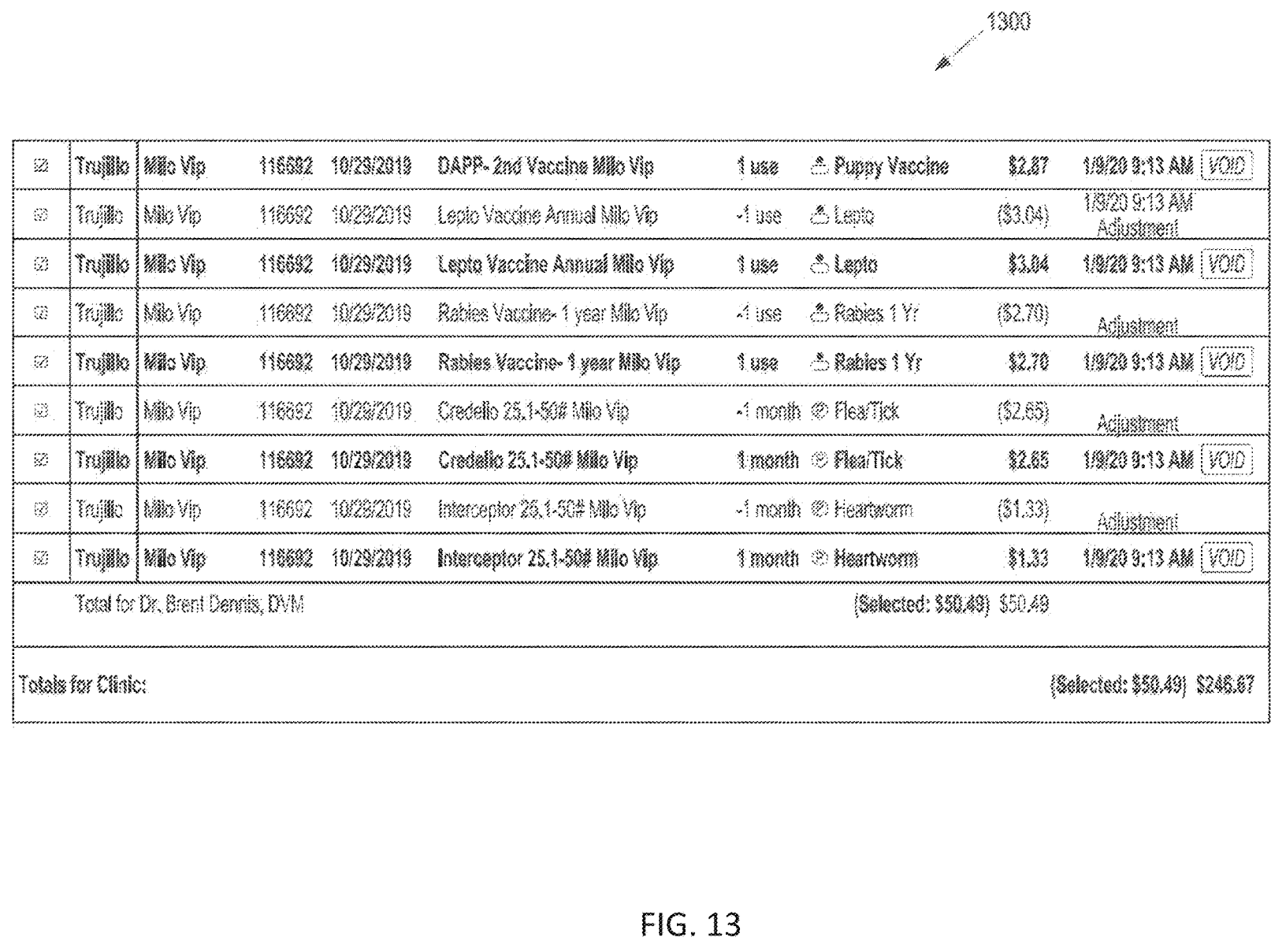

| | | | | | | | | | | |
|---|---|---|---|---|---|---|---|---|---|---|
| ☑ | **Trujillo** | **Milo Vip** | **116692** | **10/29/2019** | **DAPP- 2nd Vaccine Milo Vip** | **1 use** | **Puppy Vaccine** | **$2.87** | **1/9/20 9:13 AM** | VOID |
| ☑ | Trujillo | Milo Vip | 116692 | 10/29/2019 | Lepto Vaccine Annual Milo Vip | -1 use | Lepto | ($3.04) | 1/9/20 9:13 AM Adjustment | |
| ☑ | **Trujillo** | **Milo Vip** | **116692** | **10/29/2019** | **Lepto Vaccine Annual Milo Vip** | **1 use** | **Lepto** | **$3.04** | **1/9/20 9:13 AM** | VOID |
| ☑ | Trujillo | Milo Vip | 116692 | 10/29/2019 | Rabies Vaccine- 1 year Milo Vip | -1 use | Rabies 1 Yr | ($2.70) | Adjustment | |
| ☑ | **Trujillo** | **Milo Vip** | **116692** | **10/29/2019** | **Rabies Vaccine- 1 year Milo Vip** | **1 use** | **Rabies 1 Yr** | **$2.70** | **1/9/20 9:13 AM** | VOID |
| ☑ | Trujillo | Milo Vip | 116692 | 10/29/2019 | Credelio 25.1-50# Milo Vip | -1 month | Flea/Tick | ($2.65) | Adjustment | |
| ☑ | **Trujillo** | **Milo Vip** | **116692** | **10/29/2019** | **Credelio 25.1-50# Milo Vip** | **1 month** | **Flea/Tick** | **$2.65** | **1/9/20 9:13 AM** | VOID |
| ☑ | Trujillo | Milo Vip | 116692 | 10/29/2019 | Interceptor 25.1-50# Milo Vip | -1 month | Heartworm | ($1.33) | Adjustment | |
| ☑ | **Trujillo** | **Milo Vip** | **116692** | **10/29/2019** | **Interceptor 25.1-50# Milo Vip** | **1 month** | **Heartworm** | **$1.33** | **1/9/20 9:13 AM** | VOID |
| | Total for Dr. Brent Dennis, DVM | | | | | | **(Selected: $50.49)** | $50.49 | | |
| **Totals for Clinic:** | | | | | | | | | **(Selected: $50.49)** | **$246.67** |

FIG. 13

Wellness Audit Report

1400

Date: 1/10/2020
User: Nick AmyDoc
Date Range: 11/11/19 to 1/10/20

| Invoice Number | Invoice Date | Client Name (ID) | Pet Name | Type | Quantity on Invoice | Doses/Uses | DVM | Comm. Price | Total Comm. Price | Commission Percentage (%) | Tax Percentage (%) | Tax Amount | DVM Comm. Payout | Total Revenue | Ledger Type | Generated | Action | Action By | Action Date |
|---|---|---|---|---|---|---|---|---|---|---|---|---|---|---|---|---|---|---|---|
| 117078 | 11/11/19 | Rios, Alaida (19133) | Chanel Vip | Services-Exam | 1.00 | 1 | Ashley Douglass, DVM | $ 33.15 | $ 33.15 | 20.00% | 0.00% | $ - | $ 6.63 | $ 33.15 | | 11/20/19 8:37 PM | | OK | 12/16/19 |
| 117078 | 11/11/19 | Rios, Alaida (19133) | Chanel Vip | Services-Puppy Vaccine | 1.00 | 1 | Ashley Douglass, DVM | $ 15.94 | $ 15.94 | 20.00% | 0.00% | $ - | $ 3.19 | $ 15.94 | | 11/20/19 8:37 PM | | OK | 12/16/19 |
| 117078 | 11/11/19 | Rios, Alaida (19133) | Chanel Vip | Services-Puppy Vaccine | 1.00 | 1 | Ashley Douglass, DVM | $ 16.88 | $ 16.88 | 20.00% | 0.00% | $ - | $ 3.38 | $ 15.98 | | 11/20/19 8:37 PM | | OK | 12/16/19 |
| 117078 | 11/11/19 | Rios, Alaida (19133) | Chanel Vip | Services-Bordetella | 1.00 | 1 | Ashley Douglass, DVM | $ 14.20 | $ 14.20 | 20.00% | 0.00% | $ - | $ 2.84 | $ 14.20 | | 11/20/19 8:37 PM | | OK | 12/16/19 |
| 117078 | 11/11/19 | Rios, Alaida (19133) | Chanel Vip | Products-Flea/Tick | 1.00 | 1 | Ashley Douglass, DVM | $ 15.88 | $ 15.88 | 20.00% | 7.00% | $ 1.11 | $ 2.96 | $ 14.75 | | 11/20/19 8:37 PM | | OK | 12/16/19 |
| 117078 | 11/11/19 | Rios, Alaida (19133) | Chanel Vip | Products-Heartworm | 1.00 | 1 | Ashley Douglass, DVM | $ 6.65 | $ 6.65 | 20.00% | 7.00% | $ 0.47 | $ 1.28 | $ 6.18 | | 11/20/19 8:37 PM | | OK | 12/16/19 |
| 117079 | 11/11/19 | Sedlwick, Jackie (40000) | Grady Vip | Services-Exam | 1.00 | 1 | Ashley Douglass, DVM | $ 40.08 | $ 40.08 | 20.00% | 0.00% | $ - | $ 8.02 | $ 40.08 | | 11/20/19 8:37 PM | | OK | 12/16/19 |
| 117080 | 11/11/19 | Figueroa, Crystal (34858) | Zoey-Vip | Services-Rabies 1 Year | 1.00 | 1 | Dr Brent Dennis, DVM | $ 15.01 | $ 15.01 | 18.00% | 0.00% | $ - | $ 2.70 | $ 15.01 | | 11/20/19 8:37 PM | | OK | 12/16/19 |
| 117080 | 11/11/19 | Figueroa, Crystal (34858) | Zoey-Vip | Services-Bordetella | 1.00 | 1 | Dr Brent Dennis, DVM | $ 14.20 | $ 14.20 | 18.00% | 0.00% | $ - | $ 2.56 | $ 14.20 | | 11/20/19 8:37 PM | | OK | 12/16/19 |
| 117080 | 11/11/19 | Figueroa, Crystal (34858) | Zoey-Vip | Products-Flea/Tick | 3.00 | 3 | Dr Brent Dennis, DVM | $ 15.86 | $ 47.58 | 18.00% | 7.00% | $ 3.33 | $ 7.99 | $ 44.25 | | 11/20/19 8:37 PM | | OK | 12/16/19 |
| 117080 | 11/11/19 | Figueroa, Crystal (34858) | Zoey-Vip | Products-Heartworm | 3.00 | 3 | Dr Brent Dennis, DVM | $ 7.93 | $ 23.79 | 18.00% | 7.00% | $ 1.67 | $ 3.98 | $ 22.12 | | 11/20/19 8:37 PM | | OK | 12/16/19 |
| 117080 | 11/11/19 | Figueroa, Crystal (34858) | Milo-Vip | Services-Puppy Vaccine | 1.00 | 1 | Dr Brent Dennis, DVM | $ 16.88 | $ 16.88 | 18.00% | 0.00% | $ - | $ 3.04 | $ 15.98 | | 11/20/19 8:37 PM | | OK | 12/16/19 |
| 117080 | 11/11/19 | Figueroa, Crystal (34858) | Milo-Vip | Services-Puppy Vaccine | 1.00 | 1 | Dr Brent Dennis, DVM | $ 15.94 | $ 15.94 | 18.00% | 0.00% | $ - | $ 2.87 | $ 15.94 | | 11/20/19 8:37 PM | | OK | 12/16/19 |
| 117080 | 11/11/19 | Figueroa, Crystal (34858) | Milo-Vip | Products-Flea/Tick | 3.00 | 3 | Dr Brent Dennis, DVM | $ 15.86 | $ 47.58 | 18.00% | 7.00% | $ 3.33 | $ 7.96 | $ 44.25 | | 11/20/19 8:37 PM | | OK | 12/16/19 |
| 117080 | 11/11/19 | Figueroa, Crystal (34858) | Milo-Vip | Products-Heartworm | 3.00 | 3 | Dr Brent Dennis, DVM | $ 6.65 | $ 19.95 | 18.00% | 7.00% | $ 1.40 | $ 3.34 | $ 18.55 | | 11/20/19 8:37 PM | | OK | 12/16/19 |
| 117082 | 11/11/19 | Flores, Jasmin (40064) | Onyx Vip | Services-Exam | 1.00 | 1 | Dr Brent Dennis, DVM | $ 40.08 | $ 40.08 | 18.00% | 0.00% | $ - | $ 7.21 | $ 40.08 | | 11/20/19 8:37 PM | | OK | 12/16/19 |
| 117083 | 11/11/19 | Bagwell, Barbara (36511) | Rocko-Vip | Services-Bordetella | 1.00 | 1 | Ashley Douglass, DVM | $ 14.20 | $ 14.20 | 20.00% | 0.00% | $ - | $ 2.84 | $ 14.20 | | 11/20/19 8:37 PM | | OK | 12/16/19 |
| 117084 | 11/11/19 | Montoya, Odalis (40629) | Kyuubi-Vip | Products-Flea/Tick | 1.00 | 3 | Dr Brent Dennis, DVM | $ 48.05 | $ 48.05 | 18.00% | 7.00% | $ 3.36 | $ 8.65 | $ 44.70 | | 11/20/19 8:37 PM | | OK | 12/16/19 |
| 117084 | 11/11/19 | Montoya, Odalis (40629) | FiFi Vip | Products-Flea/Tick | 3.00 | 3 | Dr Brent Dennis, DVM | $ 15.86 | $ 47.58 | 18.00% | 7.00% | $ 3.33 | $ 7.98 | $ 44.25 | | 11/20/19 8:37 PM | | OK | 12/16/19 |
| 117084 | 11/11/19 | Montoya, Odalis (40629) | FiFi Vip | Products-Heartworm | 3.00 | 3 | Dr Brent Dennis, DVM | $ 6.65 | $ 19.95 | 18.00% | 7.00% | $ 1.40 | $ 3.34 | $ 18.55 | | 11/20/19 8:37 PM | | OK | 12/16/19 |

FIG. 14

| | | | | | | | | | | | | | | | | | | | |
|---|---|---|---|---|---|---|---|---|---|---|---|---|---|---|---|---|---|---|---|
| 11719 | 11/2/19 | Castejon, Katie (4012) | Lucas Vip | Enrollments-Plan Enrollment | 1.00 | 1 | Ashley Douglass, DVM | $ - | $ (38.00) | 20.00% | 0.00% | $ - | $ (7.60) | $ (38.00) | | 11/20/19 8:37 PM | | OK | 12/16/19 |
| 11719 | 11/2/19 | Castejon, Katie (4012) | Lucas Vip | Services-Bordetella | 1.00 | 1 | Ashley Douglass, DVM | $ 14.20 | $ 14.20 | 20.00% | 0.00% | $ - | $ 2.84 | $ 14.20 | | 11/20/19 8:37 PM | | OK | 12/16/19 |
| 11719 | 11/2/19 | Castejon, Katie (4012) | Lucas Vip | Services-Puppy Vaccine | 1.00 | 1 | Ashley Douglass, DVM | $ 15.94 | $ 15.94 | 20.00% | 0.00% | $ - | $ 3.19 | $ 15.94 | | 11/20/19 8:37 PM | | OK | 12/16/19 |
| 11719 | 11/2/19 | Castejon, Katie (4012) | Lucas Vip | Products-Flea Tick | 1.00 | 1 | Ashley Douglass, DVM | $ 15.86 | $ 15.86 | 20.00% | 7.00% | $ 1.11 | $ 2.95 | $ 14.75 | | 11/20/19 8:37 PM | | OK | 12/16/19 |
| 11719 | 11/2/19 | Castejon, Katie (4012) | Lucas Vip | Products-Heartworm | 1.00 | 1 | Ashley Douglass, DVM | $ 6.65 | $ 6.65 | 20.00% | 7.00% | $ 0.47 | $ 1.24 | $ 6.18 | | 11/20/19 8:37 PM | | OK | 12/16/19 |
| 11719 | 11/2/19 | Castejon, Katie (4012) | Lucas Vip | Services-Exam | 1.00 | 1 | Ashley Douglass, DVM | $ 33.15 | $ 33.15 | 20.00% | 0.00% | $ - | $ 6.63 | $ 33.15 | | 11/20/19 8:37 PM | | OK | 12/16/19 |
| 11720 | 11/2/19 | Kaplin, Robert (4527) | Dalmasz Vip | Services-Bordetella | 1.00 | 1 | Ashley Douglass, DVM | $ 14.20 | $ 14.20 | 20.00% | 0.00% | $ - | $ 2.84 | $ 14.20 | | 11/20/19 8:37 PM | | OK | 12/16/19 |
| 11722 | 11/2/19 | Solis, Marie-Luz (3687) | Mateo Vip | Products-Flea Tick | 3.00 | 3 | Ashley Douglass, DVM | $ 15.86 | $ 47.58 | 20.00% | 7.00% | $ 3.33 | $ 8.85 | $ 44.25 | | 11/20/19 8:37 PM | | OK | 12/16/19 |
| 11722 | 11/2/19 | Solis, Marie-Luz (3687) | Mateo Vip | Products-Heartworm | 3.00 | 3 | Ashley Douglass, DVM | $ 6.65 | $ 19.95 | 20.00% | 7.00% | $ 1.40 | $ 3.71 | $ 18.55 | | 11/20/19 8:37 PM | | OK | 12/16/19 |
| 11722 | 11/2/19 | Solis, Marie-Luz (3687) | Chiquito Vip | Products-Flea Tick | 3.00 | 3 | Ashley Douglass, DVM | $ 15.86 | $ 47.58 | 20.00% | 7.00% | $ 3.33 | $ 8.85 | $ 44.25 | | 11/20/19 8:37 PM | | OK | 12/16/19 |
| 11722 | 11/2/19 | Solis, Marie-Luz (3687) | Chiquito Vip | Products-Heartworm | 3.00 | 3 | Ashley Douglass, DVM | $ 6.65 | $ 19.95 | 20.00% | 7.00% | $ 1.40 | $ 3.71 | $ 18.55 | | 11/20/19 8:37 PM | | OK | 12/16/19 |
| 11746 | 11/3/19 | Olsen, Melanie (4835) | Fuzzy Vip | Services-Feline Core Vaccine | 1.00 | 1 | Ashley Douglass, DVM | $ 13.71 | $ 13.71 | 20.00% | 0.00% | $ - | $ 2.74 | $ 13.71 | | 11/20/19 8:37 PM | | OK | 12/16/19 |
| 11746 | 11/3/19 | Olsen, Melanie (4835) | Fuzzy Vip | Services-Felv | 1.00 | 1 | Ashley Douglass, DVM | $ 15.54 | $ 15.54 | 20.00% | 0.00% | $ - | $ 3.11 | $ 15.54 | | 11/20/19 8:37 PM | | OK | 12/16/19 |
| 11746 | 11/3/19 | Olsen, Melanie (4835) | Fuzzy Vip | Services-Exam | 1.00 | 1 | Ashley Douglass, DVM | $ 33.15 | $ 33.15 | 20.00% | 0.00% | $ - | $ 6.63 | $ 33.15 | | 11/20/19 8:37 PM | | OK | 12/16/19 |
| 11747 | 11/3/19 | Hall, Tonya (3148) | Whiskey Vip | Products-Flea Tick | 1.00 | 1 | Ashley Douglass, DVM | $ 15.86 | $ 15.86 | 20.00% | 7.00% | $ 1.11 | $ 2.95 | $ 14.75 | | 11/20/19 8:37 PM | | OK | 12/16/19 |
| 11747 | 11/3/19 | Hall, Tonya (3148) | Whiskey Vip | Products-Heartworm | 3.00 | 3 | Ashley Douglass, DVM | $ 6.65 | $ 19.95 | 20.00% | 7.00% | $ 1.40 | $ 3.71 | $ 18.55 | | 11/20/19 8:37 PM | | OK | 12/16/19 |
| 11747 | 11/3/19 | Hall, Tonya (3148) | Whiskey Vip | Services-Exam | 1.00 | 1 | Ashley Douglass, DVM | $ 40.08 | $ 40.08 | 20.00% | 0.00% | $ - | $ 8.02 | $ 40.08 | | 11/20/19 8:37 PM | | OK | 12/16/19 |
| 11764 | 11/3/19 | Guerrero, Rodolfo (1798) | Kiki- Vip | Products-Heartworm | 1.00 | 1 | Ashley Douglass, DVM | $ 7.93 | $ 7.93 | 20.00% | 7.00% | $ 0.56 | $ 1.47 | $ 7.37 | | 11/20/19 8:37 PM | | OK | 12/16/19 |
| 11764 | 11/3/19 | Guerrero, Rodolfo (1798) | Kiki- Vip | Products-Flea Tick | 1.00 | 1 | Ashley Douglass, DVM | $ 15.86 | $ 15.86 | 20.00% | 7.00% | $ 1.11 | $ 2.95 | $ 14.75 | | 11/20/19 8:37 PM | | OK | 12/16/19 |
| 11764 | 11/3/19 | Guerrero, Rodolfo (1798) | Kiki- Vip | Products-Heartworm | 2.00 | 2 | Ashley Douglass, DVM | $ 9.49 | $ 18.98 | 20.00% | 7.00% | $ 1.33 | $ 3.53 | $ 17.65 | | 11/20/19 8:37 PM | | OK | 12/16/19 |
| 11764 | 11/3/19 | Guerrero, Rodolfo (1798) | Kiki- Vip | Products-Flea Tick | 2.00 | 2 | Ashley Douglass, DVM | $ 15.86 | $ 31.72 | 20.00% | 7.00% | $ 2.22 | $ 5.90 | $ 29.50 | | 11/20/19 8:37 PM | | OK | 12/16/19 |
| 11764 | 11/3/19 | Guerrero, Rodolfo (1798) | Kiki- Vip | Services-Canine Core Vaccine | 1.00 | 1 | Ashley Douglass, DVM | $ 15.94 | $ 15.94 | 20.00% | 0.00% | $ - | $ 3.19 | $ 15.94 | | 11/20/19 8:37 PM | | OK | 12/16/19 |
| 11775 | 11/4/19 | Blair, James (4261) | Shelby Vip | Enrollments-Plan Enrollment | 1.00 | 1 | Dr Brent Dennis, DVM | $ - | $ (40.00) | 18.00% | 0.00% | $ - | $ (7.20) | $ (40.00) | | 11/20/19 8:37 PM | | OK | 12/16/19 |
| 11775 | 11/4/19 | Blair, James (4261) | Shelby Vip | Services-Fecal/Parasite screen | 1.00 | 1 | Dr Brent Dennis, DVM | $ 23.05 | $ 23.05 | 18.00% | 0.00% | $ - | $ 4.15 | $ 23.05 | | 11/20/19 8:37 PM | | OK | 12/16/19 |
| 11775 | 11/4/19 | Blair, James (4261) | Shelby Vip | Services-Exam | 1.00 | 1 | Dr Brent Dennis, DVM | $ 33.15 | $ 33.15 | 18.00% | 0.00% | $ - | $ 5.97 | $ 33.15 | | 11/20/19 8:37 PM | | OK | 12/16/19 |
| 11775 | 11/4/19 | Blair, James (4261) | Shelby Vip | Products-Flea Tick | 1.00 | 1 | Dr Brent Dennis, DVM | $ 15.86 | $ 15.86 | 18.00% | 7.00% | $ 1.11 | $ 2.66 | $ 14.75 | | 11/20/19 8:37 PM | | OK | 12/16/19 |
| 11775 | 11/4/19 | Blair, James (4261) | Shelby Vip | Products-Heartworm | 1.00 | 1 | Dr Brent Dennis, DVM | $ 6.65 | $ 6.65 | 18.00% | 7.00% | $ 0.47 | $ 1.11 | $ 6.18 | | 11/20/19 8:37 PM | | OK | 12/16/19 |
| 11775 | 11/4/19 | Blair, James (4261) | Shelby Vip | Services-Puppy Vaccine | 1.00 | 1 | Dr Brent Dennis, DVM | $ 15.94 | $ 15.94 | 18.00% | 0.00% | $ - | $ 2.87 | $ 15.94 | | 11/20/19 8:37 PM | | OK | 12/16/19 |
| 11778 | 11/4/19 | Ives, Patricia (2078) | Coby Vip | Products-Heartworm | 3.00 | 3 | Dr Brent Dennis, DVM | $ 9.49 | $ 28.47 | 18.00% | 7.00% | $ 1.99 | $ 4.77 | $ 26.48 | | 11/20/19 8:37 PM | | OK | 12/16/19 |

1400

1500

Pet Plan Tracking

Review the progress of pet wellness plans in your clinic

ADD NEW

1510

Show 10 entries

Search:

Showing 1 to 10 of 442 entries

First Previous 1 2 3 4 5 - 45 Next Last

| | Client | Patient Name | Plan | Plan Start Date | Plan Duration | Last Payment Received | Plan Status | |
|---|---|---|---|---|---|---|---|---|
| ⊞ | Alan Saldana Becerra (41431) | Lucy- Vip (7) | Cat | 8/15/2019 | 12 Months | 1/1/2020 | Active | EDIT |
| ⊞ | Aleida (19133) | Chiquilla Vip (49081) | Small Dog | 10/21/2019 | 12 Months | 1/7/2020 | Active | EDIT |
| ⊞ | Aleida (19133) | Chanel Vip (49083) | Medium Dog | 10/21/2019 | 12 Months | 1/7/2020 | Active | EDIT |
| ⊞ | Alexander Martin (42136) | Link (1) | Cat | 12/23/2019 | 12 Months | 12/23/2020 | Active | EDIT |
| ⊞ | Alexis Salgado (39620) | Bucky - Vip (1) | Large Dog | 6/19/2019 | 12 Months | 1/10/2020 | Active | EDIT |
| ⊞ | Ali Guthrie (41678) | Beelzebub (bub) Vip (1) | Medium Dog | 6/19/2019 | 12 Months | 12/15/2020 | Active | EDIT |
| ⊞ | Ali Guthrie (41678) | Cookie - Vip (2) | Small Dog | 6/19/2019 | 12 Months | 12/15/2020 | Active | EDIT |
| ⊞ | Alicia Murphy (40854) | Pusheen (4) | Cat | 11/29/2019 | 12 Months | 1/5/2020 | Active | EDIT |
| ⊞ | Allison Viassis (40787) | Sadie - Vip (1) | Small Dog | 7/11/2019 | 12 Months | 12/15/2020 | Active | EDIT |
| ⊞ | Amber Ellis (39707) | Rocky - Vip (1) | Small Dog | 6/17/2019 | 12 Months | 12/15/2020 | Active | EDIT |

Showing 1 to 10 of 442 entries

First Previous 1 2 3 4 5 - 45 Next Last

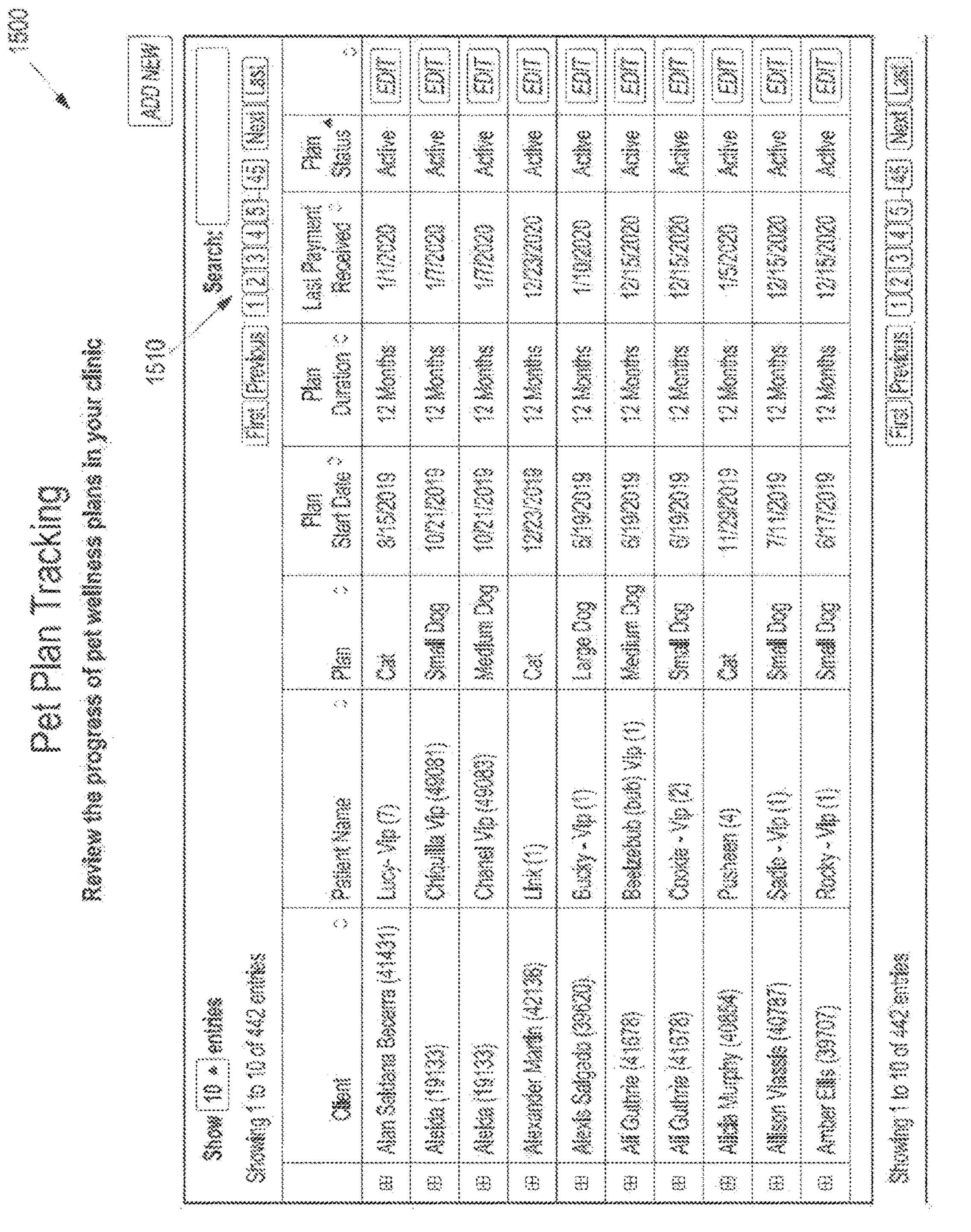

Pet Plan Tracking

Review the progress of pet wellness plans in your clinic

ADD NE

Show 10 entries

Search:

Showing 1 to 10 of 442 entries

First Previous 1 2 3 4 5 ... 45 Next Last

| | Client | Patient Name | Plan | Plan Start Date | Plan Duration | Last Payment Received | Plan Status | |
|---|---|---|---|---|---|---|---|---|
| ⊕ | Alan Saldana Becerra (41431) | Lucy- Vip (7) | Cat | 8/15/2019 | 12 Months | 1/1/2020 | Active | EDIT |
| ⊕ | Aleida (19133) | Chiquilla Vip (49081) | Small Dog | 10/21/2019 | 12 Months | 1/7/2020 | Active | EDIT |
| ⊖ | Aleida (19133) | Chanel Vip (49083) | Medium Dog | 10/21/2019 | 12 Months | 1/7/2020 | Active | EDIT |

| Service | Doses/Users Remaining | Last Invoice Date | Last Invoice | Last Item Purchased | Next Dispense Date |
|---|---|---|---|---|---|
| **Bordetella** | 1 | 11/11/2019 | 117078 | Bordetella Vaccine Chanel Vip (6016) | N/A |
| **Canine Core Vaccine** | 0 | 10/21/2019 | 116399 | DAPP Annual Vaccine Chanel (6015) | N/A |
| **Exam** | 0 | 11/11/2019 | 117078 | WP Puppy/Kitten Exam Chanel Vip (6050) | N/A |
| **Fecal/Parasite screen** | 0 | 10/21/2019 | 116399 | Fecal Exam Chanel (6001) | N/A |
| **Heartworm Test** | 1 | | n/a | n/a | N/A |
| **Lepto** | 0 | 1/7/2020 | 118640 | Lepto Vaccine Annual Chanel Vip (6018) | N/A |
| **Nail Trim** | 6 | | n/a | n/a | N/A |
| **Puppy Vaccine** | *unlimited* | 11/11/2019 | 117078 | DAPP_ 2nd Vaccine Chanel Vip (6012) | N/A |
| **Rabies 1 Yr** | 0 | 1/7/2020 | 118640 | Rabies Vaccine- 1 year Chanel Vip (6010) | N/A |
| **Flea/Tick** | 7 | 1/7/2020 | 118640 | Credelio 25.1-50# Chanel Vip (6053) | 4/7/2020 |
| **Heartworm** | 7 | 1/7/2020 | 118640 | Interceptor 25.1-50# Chanel Vip (6036) | 4/7/2020 |
| Paid In Clinic | *unlimited* | | n/a | n/a | N/A |

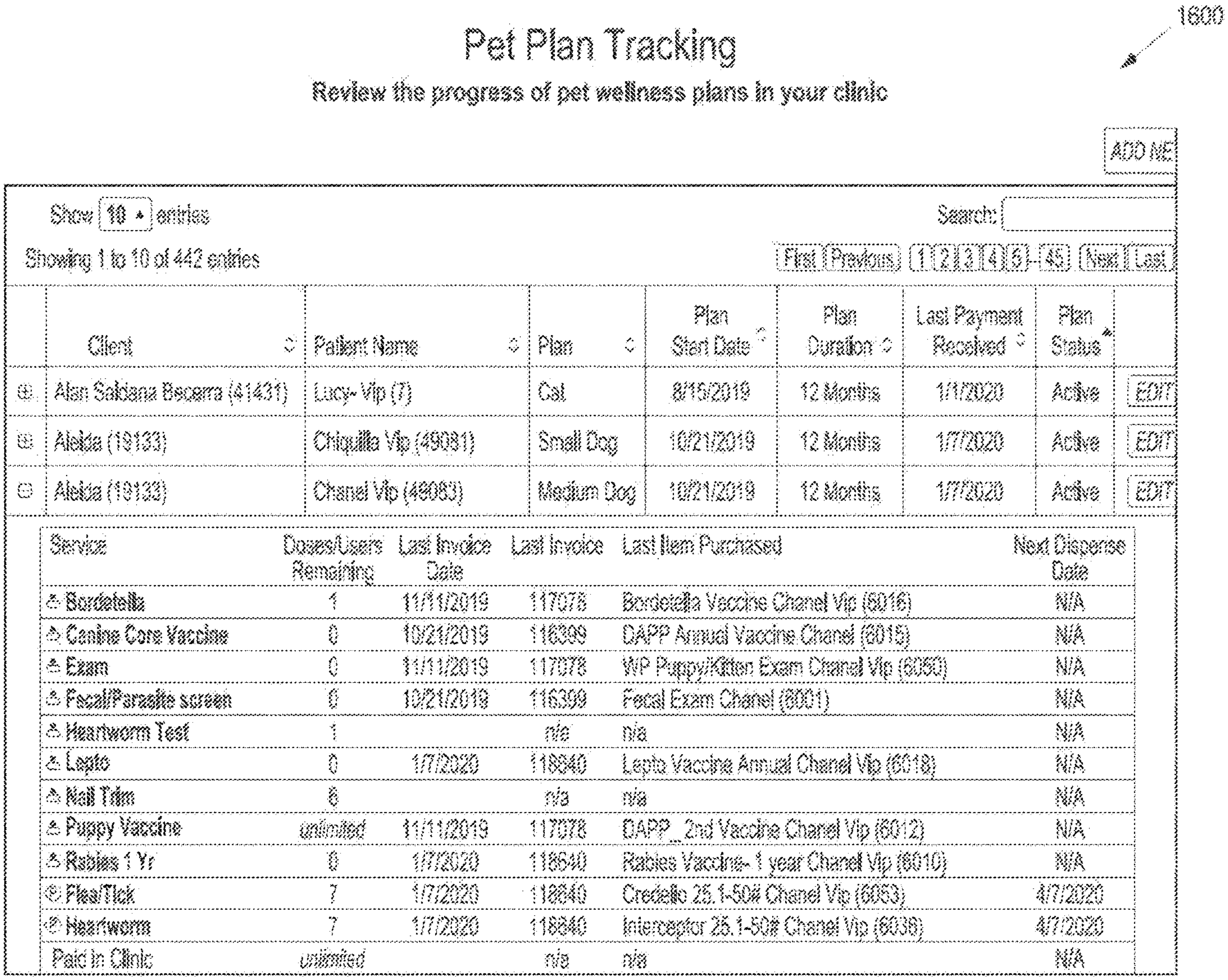

ADD NEW

Show 10 entries

Search:

Showing 31 to 40 of 442 entries

First Previous 1 2 3 4 5 - 45 Next Last

| | Client | Patient Name | Plan | Plan Start Date | Plan Duration | Last Payment Received | Plan Status | |
|---|---|---|---|---|---|---|---|---|
| ⊞ | Antonia Olivera-Santos (42019) | Perla Vip (1) | Small Dog | 10/26/2019 | 12 Months | 1/6/2020 | Cancelled | EDIT |
| ⊞ | Audrey Lopez (41354) | Coco - Vip (1) | Small Dog | 2/25/2019 | 12 Months | 2/25/2019 | Cancelled | EDIT |
| ⊞ | Audrey Lopez (41354) | Bear - Vip (2) | Small Dog | 5/25/2019 | 12 Months | 12/5/2019 | Cancelled | EDIT |
| ⊞ | Benjamin Sanchez (36572) | Max-vip (2) | Large Dog | 4/5/2019 | 12 Months | 4/5/2019 | Cancelled | EDIT |
| ⊞ | Blair Tucker (39635) | Bella - Vip (1) | Small Dog | 9/11/2019 | 12 Months | 12/31/2019 | Cancelled | EDIT |
| ⊞ | Brenda O'keefe (41592) | Ira - Vip (1) | Small Dog | 5/24/2019 | 12 Months | 12/21/2019 | Cancelled | EDIT |
| ⊞ | Brittanny Cosme (39907) | Mr. Ace-vip (13) | Large Dog | 4/22/2019 | 12 Months | 4/22/2019 | Cancelled | EDIT |
| ⊞ | Cassandra Stephens (37002) | Hammer - Vip (3) | Large Dog | 9/20/2019 | 12 Months | 1/8/2020 | Cancelled | EDIT |
| ⊞ | Claudia Ocampo (41417) | Colondrina - Vip (1) | Large Dog | 3/22/2019 | 12 Months | 3/22/2019 | Cancelled | EDIT |
| ⊞ | Claudia Ocampo (41417) | Paloma (2) | Large Dog | 3/27/2019 | 12 Months | 3/27/2019 | Cancelled | EDIT |

Showing 31 to 40 of 442 entries

First Previous 1 2 3 4 5 - 45 Next Last

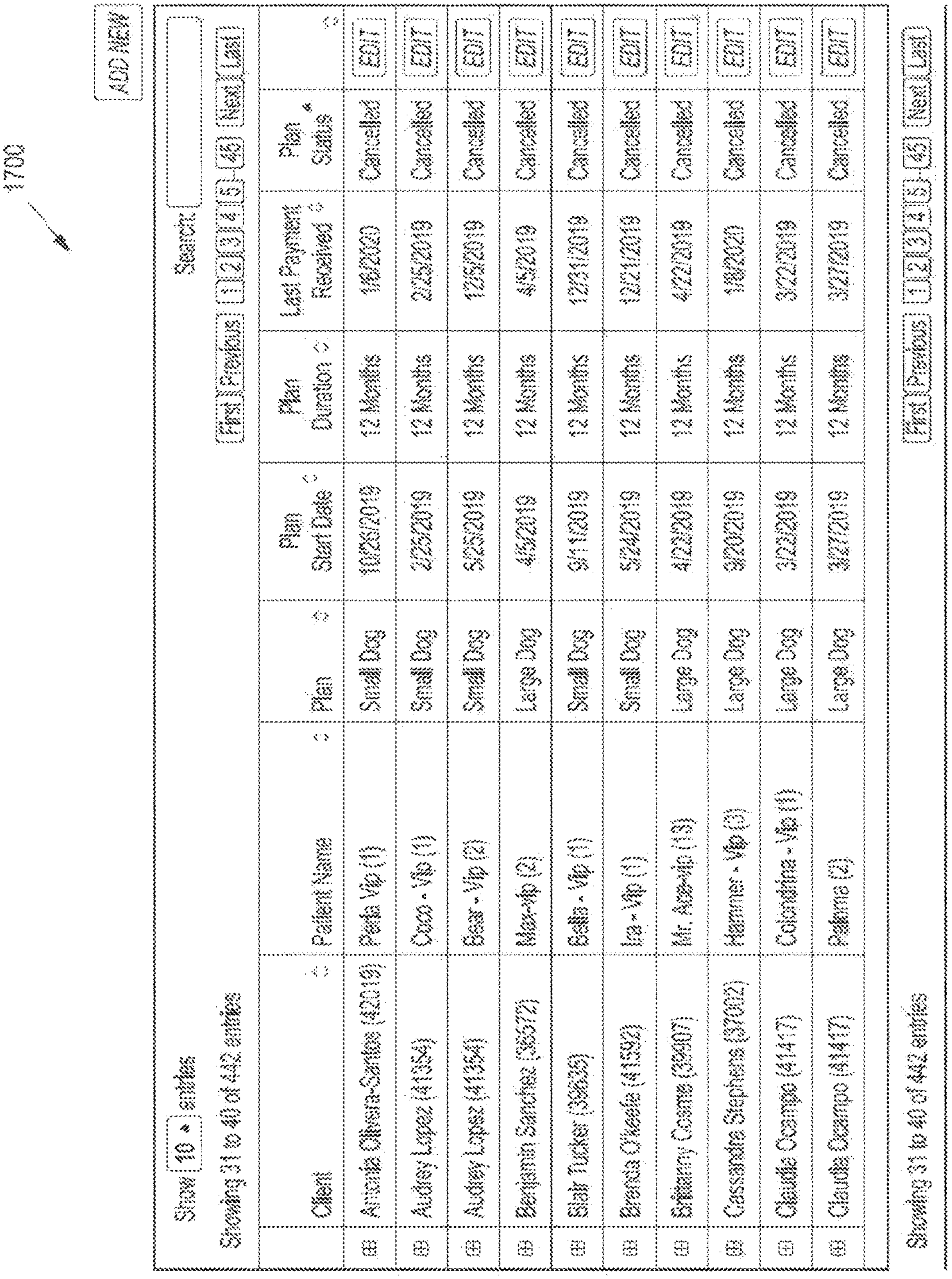

SYSTEMS AND METHODS OF IMPLEMENTING AT RESELLER FLEXIBLE AND CUSTOMIZABLE ARCHITECTURE OF TRANSACTION LEVEL SECURITY, AUTHENTICATION AND DIGITAL VERIFICATION OF COUPONS THAT IS CUSTOMER-CENTRIC

CROSS-REFERENCE TO RELATED APPLICATIONS

The present application is a continuation-in-part of and claims priority to U.S. patent application Ser. No. 17/715,393, which is a continuation of and claims priority to U.S. patent application Ser. No. 16/883,973. Additionally, U.S. patent application Ser. No. 16/883,860, titled "SYSTEMS AND METHODS OF VALIDATING DATA ENTRY AND GENERATING ERROR FLAGS USING ARTIFICIAL INTELLIGENCE," is incorporated herein in its entirety by reference.

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

FIELD OF THE INVENTIONS

Some aspects of the disclosure pertain to the technical field of allowing clinic opt-in and customization for coupon distribution that favors the consumer without requiring to be tied to a given clinic or manufacturer. More particularly, the present invention is in the technical field of providing automated coupon distribution with flexibility and control through a distributed processing platform.

BACKGROUND

Current wellness plans for pets are tied to a manufacturer or a clinic location. A pet-owner does not see the flexibility in choosing different wellness plan options at affordable clinics. Startup costs to invest in a wellness plan, implementation and operations are formidable at a clinic level. Wellness plans require a mix of products and service options with providers of their choice. Simple accounting, contracts, invoicing and IT solutions do not address or give flexibility, customization and options to pet-owners at various clinics who do not have resources and bandwidth to implement a wellness plan.

Pet-owners may also receive coupon deals to offset some cost of the treatments for their pets. Current coupon plans or offers are tied to a manufacturer or a retailer, seller or clinic location. An end-user or consumer does not have the flexibility in participating in different coupon deals or tracking them for an extended period of time. The administrative burden to implement coupon deals is also large on the manufacturer or clinics themselves. Startup costs to invest in a digital coupon plan would require modifications to the existing systems that implement invoicing, billing and accounting. Simple accounting, contracts, invoicing and IT solutions do not address or give reporting, flexibility, customization and options to pet-owners at various clinics who do not have resources and bandwidth to implement coupons.

In many instances, the customer is not able to analyze or does not have the data to analyze or opportunity to analyze what combination of coupons will give him the best deal for a given transaction. There could be different combinations of line items and coupon deals that trigger overall the best discount on a transaction that currently are not accessible with manual coupon prints because of massive administrative overheads.

SUMMARY OF THE INVENTIONS

The present invention pertains to systems and methods processing transactions across a distribution network of products through a plurality of clinics.

In some embodiments, a method of processing transactions across a distribution network of products through a plurality of clinics, executed by a computing device comprising a processor and a storage unit for storing data associated with a coupon library with available coupons together with their applicability requirements, the processor executing a program to function as a coupon library module, a coupon definition module, and a coupon processing module, comprises: presenting, via the computing device, a user interface to each clinic of the plurality of clinics, the user interface displaying one or more of the available coupons together with their applicability requirements stored in the coupon library; receiving, via the user interface, a selection for opt-in or opt-out for each displayed available coupon from each clinic of the plurality of clinics; for each respective clinic of the plurality of clinics: customizing, via the coupon library module, the coupon library based at least on the selection for opt-in or opt-out for each displayed available coupon from the respective clinic; generating, via the coupon definition module, a plurality of rules that define requirements for a transaction to qualify for a coupon based on a combination of parameters including one or more of the following: number of doses bought, number of doses previously bought, number of doses given for no charge to a client, patient's age, patient's weight, patient's species, patient's breed, or invoice date; receiving, via the user interface, one or more voucher codes corresponding to a plurality of transactions performed at the respective clinic; generating, via the computing device, one or more invoices based on the received plurality of transactions; analyzing, via the coupon processing module, the generated one or more invoices to identify transactions that qualify for one or more coupons included in the customized coupon library for the respective clinic, based on the defined plurality of rules; identifying, via the coupon processing module, one or more redemptions for the identified transactions based on successful application of the defined plurality of rules for the selected opted-in coupons for the respective clinic; and generating, via the computing device, a list of the one or more redemptions for the respective clinic; and validating the generated lists across the distribution network of products.

In some embodiments, the method further comprises customizing the coupon library based also on one or more of a location of the respective clinic, a list of products or services sold at the respective clinic, time of year, a number of clients of the respective clinic, types of patients of the respective clinic, and a number of patients of the respective clinic.

In some embodiments, the method further comprises receiving, via the user interface, authentication information from each clinic to access the coupon library.

In some embodiments, the method further comprises reporting, via the computing device, the validated lists of the one or more redemptions to one or more manufacturers.

In some embodiments, validating the generated lists further comprises permitting, via the user interface, the respective clinic to approve or reject each redemption of the one or more redemptions.

In some embodiments, the method further comprises, via the computing device, permitting instant rebate execution for applicable redemptions to automatically reduce the invoice price.

In some embodiments, the method further comprises conforming the customized coupon library across the distribution network of products by categorizing duplicate codes correctly to map to a same transaction code at a clinic location, thereby avoiding duplicate transaction codes at the distribution network.

In some embodiments, identifying the one or more redemptions for the identified transactions further includes identifying a redemption with a maximum discount for the identified transactions.

In some embodiments, a system for processing transactions across a distribution network of products through a plurality of clinics comprises one or more storage devices configured to store data associated with a coupon library with available coupons together with their applicability requirements; and one or more processors configured to execute one or more of the methods discussed above.

In some embodiments, a non-transitory computer-readable medium stores a program that performs one of more of the above-discussed methods of processing transactions across a distribution network of products through a plurality of clinics.

BRIEF DESCRIPTION OF THE DRAWINGS

The embodiments of this invention are illustrated by way of example and not limitation in the figures of the accompanying drawings, in which like references indicate similar elements and in which:

FIG. 11 is an exploded view of setting up service providers for a wellness plan for a clinic, according to one embodiment.

FIG. 12 is an exploded view of a service provider handling users and related transactions, according to one embodiment.

FIG. 13 is a second exploded view of a service provider handling users and related transactions, according to one embodiment.

FIG. 14 is an exploded view of wellness plan accounting, according to one embodiment.

FIG. 15 is an exploded view of tracking from a user's perspective, according to one embodiment.

FIG. 16 is a second exploded view of tracking from a user's perspective, according to one embodiment.

FIG. 17 is a third exploded view of tracking from a user's perspective, according to one embodiment.

DETAILED DESCRIPTION OF THE INVENTIONS

Figure 1:
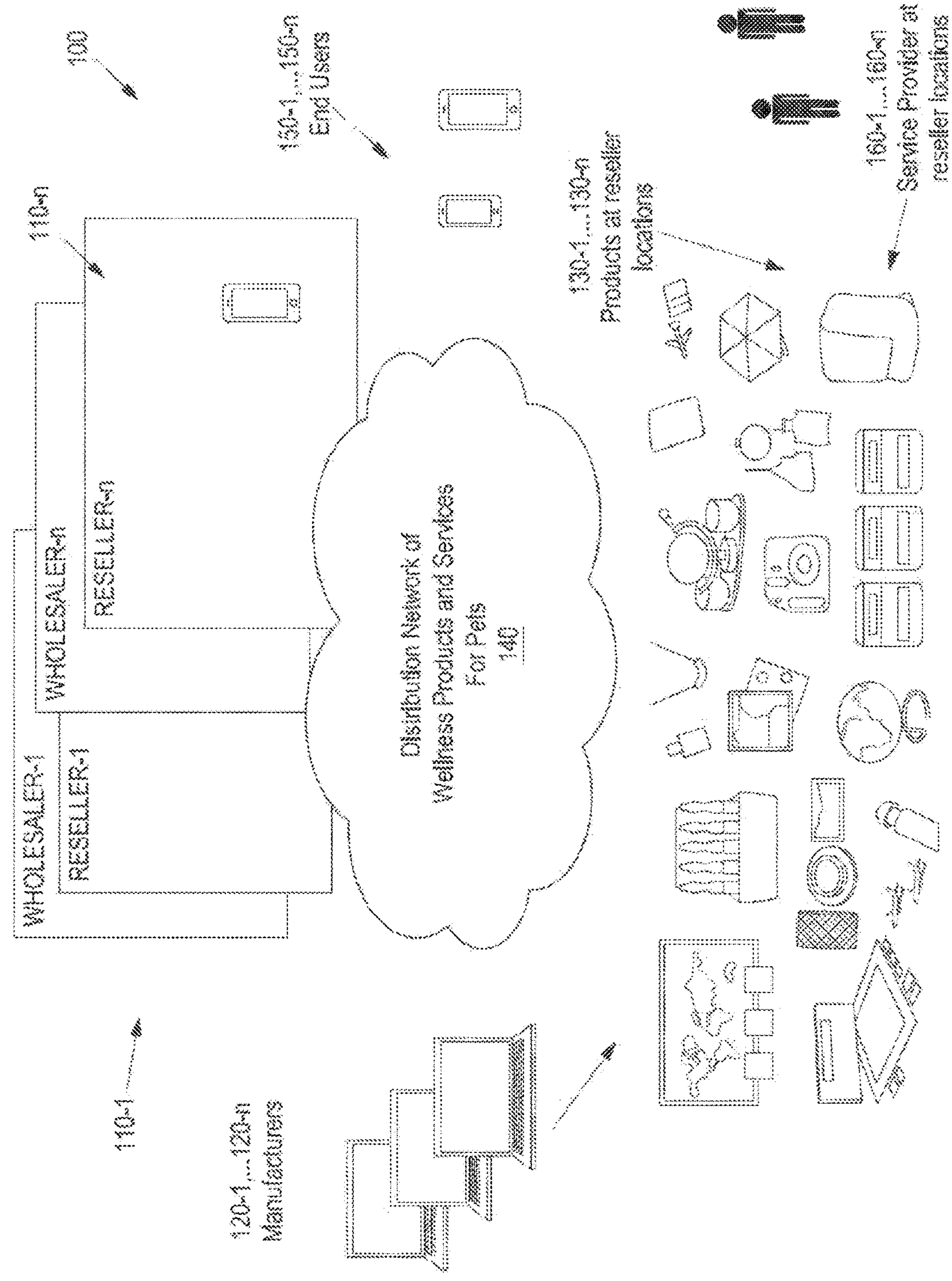
FIG. 1 shows a diagram illustrating an example of systems and methods of flexible and customizable wellness program plan for pets through a distribution network connecting pet-owners, manufacturers, clinics and veterinarians with different types and categories of computing devices and varied products at veterinary clinics from different manufacturers and service providers.

The disclosure of U.S. patent application Ser. No. 16/883,952, titled "SYSTEMS AND METHODS OF IMPLE- MENTING AT RESELLER FLEXIBLE AND CUSTOMIZABLE ARCHITECTURE OF TRANSACTION LEVEL SECURITY, AUTHENTICATION AND DIGITAL VERIFICATION OF COUPONS THAT IS CUSTOMER-CENTRIC", which was incorporated by reference in its entirety in the parent applications (U.S. patent application Ser. Nos. 16/883,973 and 17/715,393) has been explicitly added to this application.

The systems and methods of flexible and customizable wellness program plan for pets through a distribution network connecting pet-owners, manufacturers, clinics and veterinarians includes techniques to enable different clinics to provide seamless wellness plans for pets giving flexibility in customization of the plans, products used, as well as service providers involved. Most of the clinics do not have resources and bandwidth to invest in wellness plans. When a wellness plan is implemented, a clinic can efficiently implement such a plan and track it in terms of accounting, renewal at the end of the year, and associated discounted billing. A clinic can also track as to whether the wellness plan made profit for the clinic after paying manufacturers for the products and any veterinarians or service providers for the services under the plan. A veterinarian may be commission based or salaried and the wellness plan allows for computation of costs and usage under either model. A manufacturer may provide different coupon deals that can be incorporated into the wellness plan with customization and flexibility.

The systems and methods of flexible and customizable wellness program plan allows a single clinic to promote more than one wellness plan at the same time. It allows a subscription service that allows users to have pet related information readily available on their computing devices including mobile applications or web-browser related interfaces on their laptops. The system allows for tracking of all rebates applied and how many of those applied were reimbursed. Such a system allows reconciliation of different rebates used for a cap at the total annual amount.

The systems and methods of flexible and customizable wellness program plan allows monitoring of clinic input data. It can check for fake free doses, changing addresses, rebates going to the same addresses and flag any standard deviations from activities. The wellness plan is implemented to catch rogue employees who are stealing on invoices. This prevents manufacturers from giving away more money in rebates than the amount they received in payments for selling the products.

This invention discloses a novel mechanism that is used to aid in scaling even small business who do not have the bandwidth to invest in computer IT and customized solutions. Irrespective of the level of sophistication of the users or computer systems, the invention provides a mechanism to promote efficiencies in transaction handlings. Such a solution is not dependent on the brand names, product types or manufacturers. Regardless of who operates the wellness plan system, its operations are flexible and streamlined without any accounting or maintenance headaches.

A Wellness Engine (WE) is a new module that is designed to build, track, pay commissions on, and report out on wellness plans. Wellness plans can be broadly defined as pay over-time or subscription plans that most commonly cover a pet's annual exam, vaccinations, bloodwork, and yearly preventatives. The appeal of these plans for consumers is the ability to pay for top notch care for their pets over time and keep up with the rising cost of veterinary services. While somewhat simple to build, wellness plans become exponentially harder to manage as more users sign up in the practice.

Another important aspect of a wellness plan is that the client is not charged when he or she comes in and a clinic performs a covered service. But doctors are still expecting commission and the hospital still needs a way to report revenue versus the plan.

This is administrative part of what makes wellness plans complex. It is not trivial to figure revenue or commission on zero-dollar items in an easy or efficient way, while at the same time keeping track of what services or other items on the plan (such as vaccines) are still available to the client at no cost. When combined with the administrative activities, such as managing commission rates and payments, the administration of wellness plans requires dedicated personnel.

The main benefit of the Wellness program Engine (WE) to the clinic is the aggregation of commission reporting and management, doctor payment, plan usage history, and plan item availability for all clients in the clinic is a series of easy-to-use reports and web pages. Because the source of the WE is the invoice data sent daily, no duplicate or manual data entry is required during day-to-day administration of the clients and patients enrolled in plans on web site. The WE can report to clinics as well as product manufacturers.

In one embodiment, FIG. 1 depicts a diagram 100 illustrating an example of systems and methods of flexible and customizable wellness program plan for pets through a distribution network 140 connecting pet-owners 150-1 to **150-*n*, manufacturers 120-1 to 120-*n*, clinics 110-1 to 110-*n* and veterinarians 160-1 to 160-*n*, with different types and categories of computing devices and varied products 130-1 to 130-*n* at veterinary clinics from different manufacturers. In the example of FIG. 1, the environment includes a set of clinics that have varied computer systems and IT departments at 110-1 through an nth clinic system 110-*n*, a distribution network 140, a set of manufacturers supplying the products 120-1 to 120-*n*, different products originating from different manufacturers having variable parameters for each clinic at 130-1 to 130-*n*, and end-users or pet owners at 150-1 to 150-*n* who may or may not have a computing device, i.e. a web-browser application or a mobile application that connects to the network 140. The end-users may also use services from veterinarians, nurses and other service providers 160-1 to 160-*n* who may be independent contractors or employees at different clinics 110-1 to 110-*n***.

In an implementation, the clinic computing system 110 includes components related to network connectivity. In one implementation, the clinic computing system 110 includes hardware and software components to enable data-entry from different computing stations local to the clinic or remote. In one embodiment, the transaction entry is through execution of speech commands. In another implementation, the computing device 110 includes capability to directly communicate with the distribution network 140 that includes authentication and secure communication. The clinic 110 also includes capability to handle variety of pets in one implementation. In one implementation, the clinic 110 specializes in a specific species, for example, cats or dogs. Each clinic is independent of the other and not in any way associated in terms of ownership, control or computer systems installed. In one embodiment, a group of clinics are associated with each other.

The role of the computing device manufacturers 120-1 to **120-*n* is separated from the use of the computing devices at clinics 110-1 to 110-*n*. While the manufacturers may have a business partnership with clinics 110-1 to 110-*n***, typically manufacturers do not control the information technology or computer systems that exist at clinics. A manufacturer freely associates with one or more clinics. The data processing invention allows for manufacturers to audit inventory at clinics without adding cumbersome techniques of manual review. Broadly speaking, a manufacturer may have more sophisticated computer systems and applications than those available at clinics.

For a wellness plan, a user or pet-owner with computing device 150-1 to **150-*n* may visit a clinic to make subscription to a customized plan that is tailored specifically to the needs of his or her own pet. Such a wellness plan may include one or more purchases related to products 130-1 to 130-*n* as well as combination of services provided by service providers 160-1 to 160-*n***.

A person of ordinary skill in the art would appreciate that a clinic is a small business that does not have the resources to integrate different veterinarian service options with products from different manufacturers and track transactions tied to a customized subscription plan for a period longer than a year. Many of these clinics reset prices yearly and any contract involving a longer subscription plan is lost. Clinics with the wellness plan disclosed herein can now provide well-informed wellness plans that can be automatically tracked for rebates and costs. A clinic can also pull up revenue and costs at any time to analyze whether a particular wellness plan is working within the estimated profit margins.

From the perspective of a service provider, for example, a veterinarian, the wellness plan now provides tracking irrespective of whether the veterinarian is paid a salary or a commission from the wellness plan subscriptions. A veterinarian can pull up the record of his patients and assess whether a given clinic is making payments to him or her on a timely basis and whether his participation in the wellness plan is working with the estimated profits for him.

From the perspective of a manufacturer, the wellness plan provides flexibility to provide rebates based on prior purchases that could span longer than a year. The manufacturer can figure out anomalies in the rebates as well as track a clinic's efficiency in terms of selling products as well as attracting regular paying users through the subscription plans.

From the perspective of an end-user, for example, a pet owner, the wellness plan are available at affordable clinics with ease of information on the pet's health and record as well as past or upcoming payments. By bringing these efficiencies, the wellness plan promotes good health in pets as well as makes it affordable to many pet-owners.

Distribution Network 140 can be different wireless and wired networks available to connect different computer devices including client and server systems. In an implementation, distribution network 140 is publicly accessible on the internet through secure messaging protocol described herein. In an implementation, distribution network 140 is inside a secure corporate wide area network. In an implementation, distribution network 140 allows connectivity of different systems and devices using a computer-readable medium.

The messaging and notification between different components can be implemented using Application Programming Interface (API) calls, extensible Markup Language ("XML") or Javascript Object Notation ("JSON") config file interfaces between different interfaces, Hypertext Preprocessor (earlier called, Personal Home Page) ("PHP"), Python, Node.js, Java/C++ object-oriented programming or simple web-based tools.

Different components may also implement authentication and encryption to keep the data and the requests secure. Authentication of a device may be accomplished using public/private key, passwords, token, transaction, biometrics, multi-factor authentication or other methods known in the industry. Encryption may use data encryption standard (DES), TripleDES, Rivest-Shamir-Adleman (RSA) algorithm, Advanced Encryption Standard (AES) or other methods known in the industry.

Figure 2:
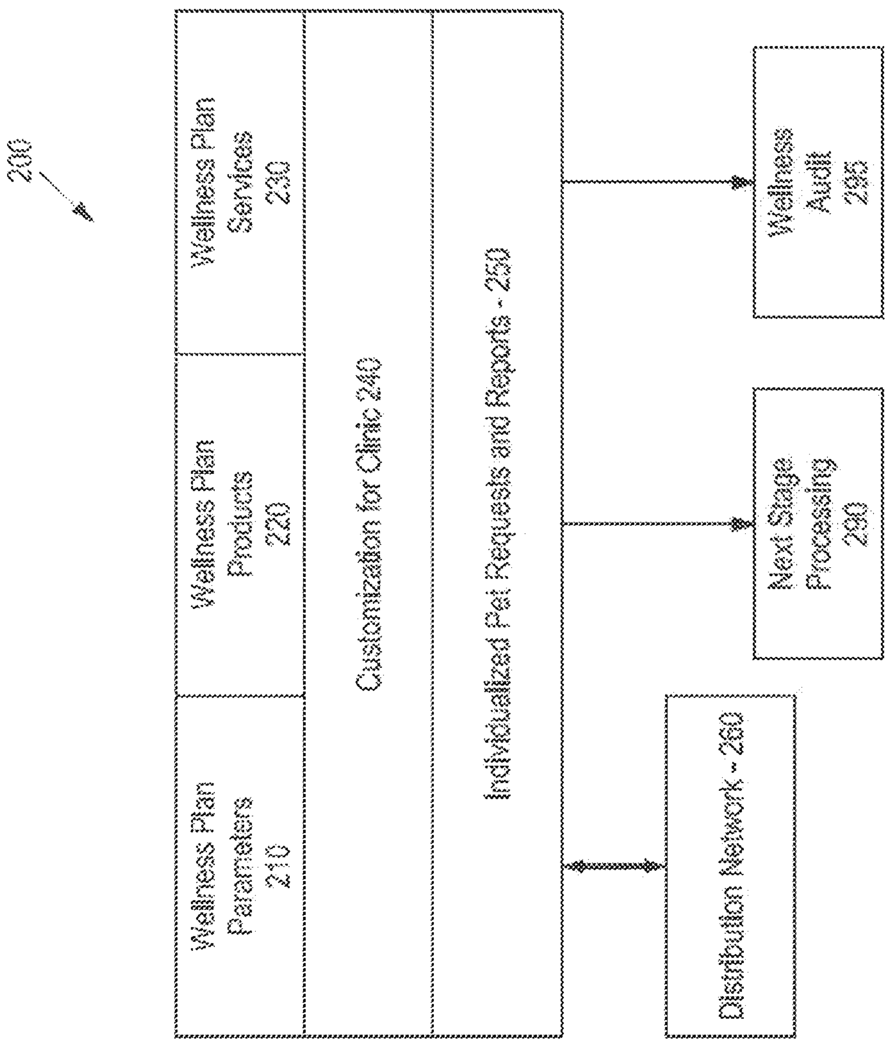
FIG. 2 shows exploded view of a computing device with different interfaces included in systems and methods of flexible and customizable wellness program plan for pets through a distribution network connecting pet-owners, manufacturers, clinics and veterinarians, according to one embodiment.

FIG. 2 shows exploded view 200 of a wellness program plan computing device with different interfaces included in systems and methods of flexible and customizable wellness program plan for pets through a distribution network connecting pet-owners, manufacturers, clinics and veterinarians, according to one embodiment. There is an interface between the distribution network 260 and computing device with the module to receive individualized pet transaction requests and reports 250. Module 250 passes on processed information to next stage processing 290. The wellness plan can be audited by requesting an audit at module 295. The clinic can customize one or more wellness plans that work for its categories of pets or pet-owners at module 240. In one embodiment, each pet owner can customize his or her own wellness plan. The modules operate with a computing device that may have one or more operating systems including Android, iPhone Operating System (iOS) or Internet of Things (IoT) operating system.

The computing device includes software module 210 that includes a wellness plan parameters, lists a wellness plan products 220 and includes the wellness plan services 230 and associated service providers. The wellness plan configurations may be stored locally at a clinic or in a cloud computing environment or in a split client/server type architecture.

The distribution network 260 API/hooks may be incorporated at a system level on the computing device. In one embodiment, depending on the computing device platform the distribution network overlay hooks are implemented using Java Android Software Development Kit (SDK), Objective C, or C++. In one embodiment, any and all communications are controlled using the distribution network overlay architecture that encompasses the operating system to allow for component based flexibility. In one embodiment, a user can customize the alias to go in and out of the distribution network overlay architecture mode. In one embodiment, the overlay network is based on peer to peer network. In one embodiment, the distribution network using an overlay network using the existing public network.

In one embodiment, the computing device includes applications or services that request and make wellness plans configurations and corresponding transactions. In one embodiment, the wellness plan is marketed across more than one clinics, providing a pet owner to visit more than one clinic under a subscription plan. In one embodiment, the individualized pet reports 250 also tracks improvement in health and greenness of a plan. In one embodiment, a veterinarian may select wellness plans to enroll and provide services for within a clinic. In one embodiment, a veterinarian may do regular billing that is absorbed by the clinic and converted to a subscription plan equivalent for the pet-owner.

In one embodiment, manufacturers or clinics may get reports on anomalous activity including misuse of rebates or stealing on invoices, and/or detecting low inventory. In one embodiment, anomalous activity includes detecting pricing that is out of minimum and maximum range for a given dosage.

Figure 3:
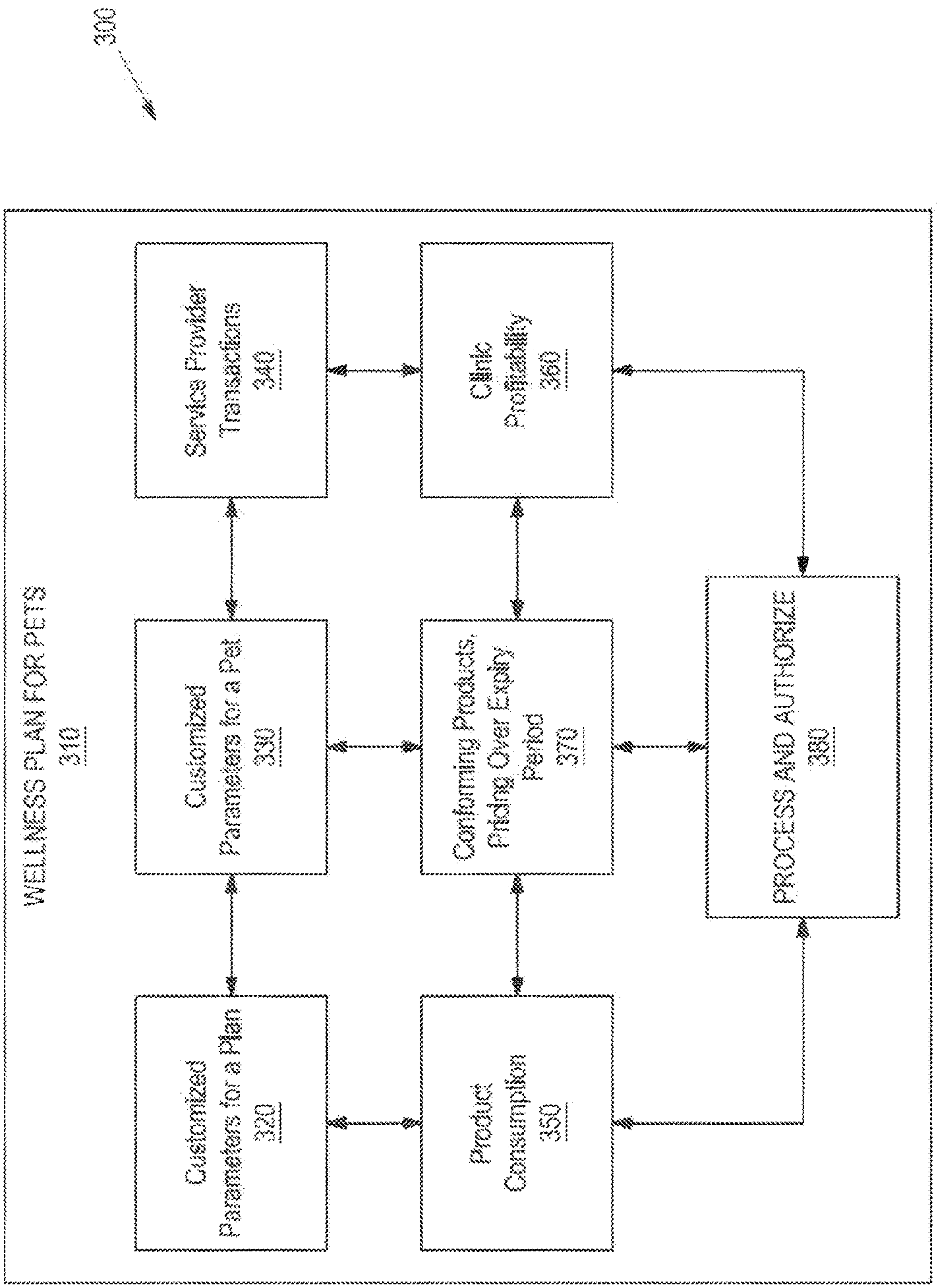
FIG. 3 is an exploded view of different modules included in systems and methods of flexible and customizable wellness program plan for pets through a distribution network connecting pet-owners, manufacturers, clinics and veterinarians, according to one embodiment.

FIG. 3 is an exploded view of different modules included in systems and methods of flexible and customizable wellness program plan 300 for pets through a distribution network connecting pet-owners, manufacturers, clinics and veterinarians, according to one embodiment. FIG. 3 outlines a view of wellness plan 300 implemented as a service in the cloud computing space 310 that includes different modules and functions, according to one embodiment. At 380, the process and authorize module creates, designs and processes different wellness plans that are offered for subscription to different pet-owners. At 350, product consumption is tracked per transaction as approved by the wellness plan. At 320, customized parameters for a plan are decided by a clinic or a pet-owner. At 330, customized parameters for a wellness plan for a pet condition are selected. At 340, service provider transactions are tracked. At 360, clinic profitability is tracked for a given wellness plan. At 370, conforming products, pricing over expiry period and renewal of wellness plans is tracked.

Figure 4:
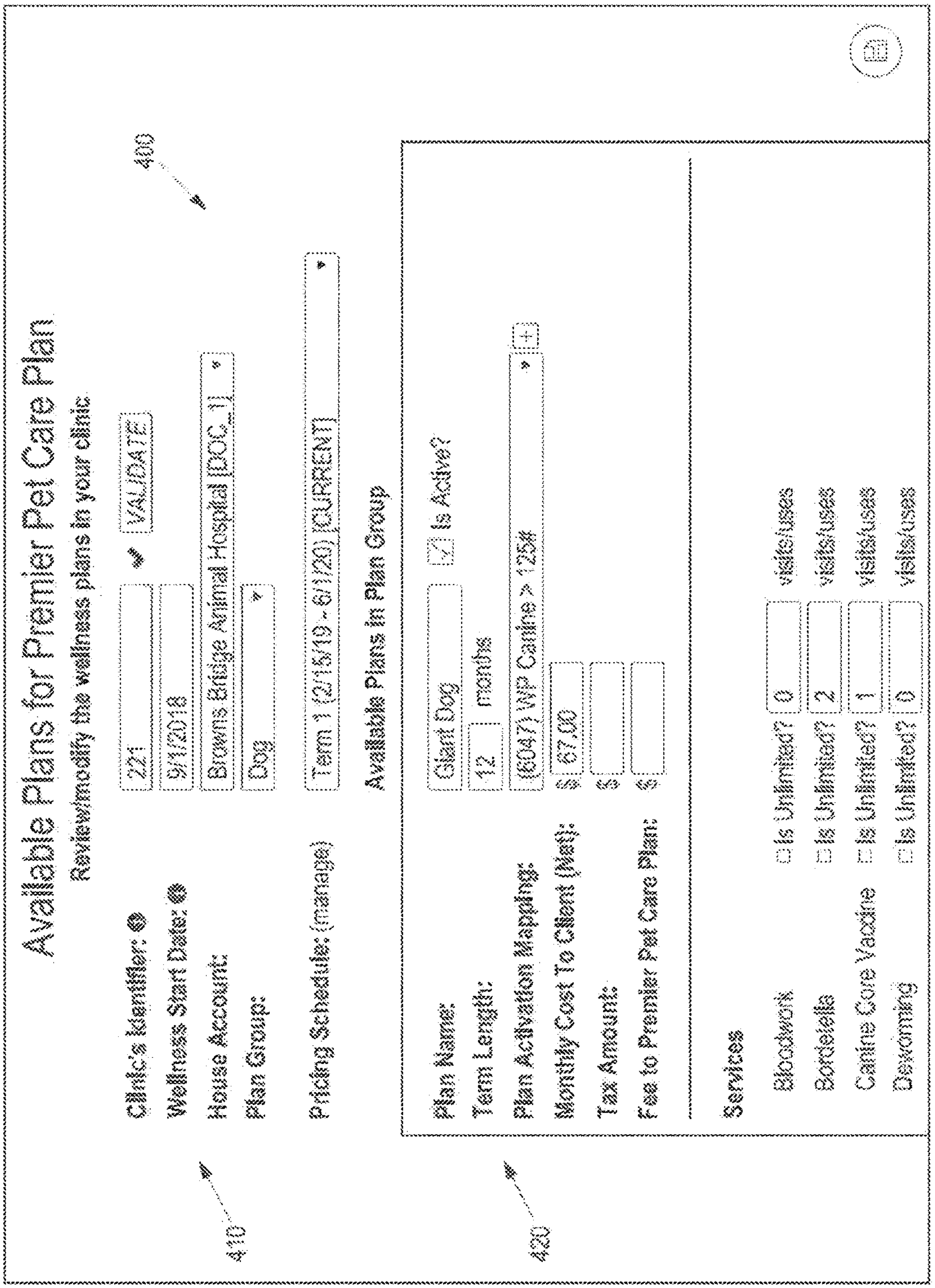
FIG. 4 is a view of steps of creating a wellness plan, according to one embodiment.

FIG. 4 is a view of steps of creating a wellness plan 400, according to one embodiment. In plan setup, the operator sets the plan start date, the house account, what species (canine, feline, equine, etc.), assigns a pricing schedule, the activation mapping (i.e., what Stock Keeping Unit (SKU) codes will enroll the animal), the plan's cost, and finally the allowed uses for services and products. Some important features to highlight in section 410: Clinic identifier—a unique clinic identifier used with the wellness billing company for reporting and billing status. House Account—A designated account that receives no commission. Needed for tax purposes and in cases where products are dispensed with no doctor involvement. Pricing Schedule—The period where a set of prices and commissions are valid. When a consumer signs up for wellness plans, he is she is technically they are signing up for a set price for 12 months.

Because the pricing was also built off all the current prices for products and services, however, at some point the clinic will take a price increase. Prices changes are not applicable to client already enrolled in plans, but apply only to new enrollments instead. Also, the doctors commission and revenue are based on the pricing of the current plan the patient is in. The WE allows for concurrent pricing schedules to accommodate for people on old plans that have not rolled over and new people coming on to a plan built on increased fees. This also allows commissions to be correctly calculated based on when the original plan was sold. Because clients enroll at different times during the run of a pricing schedule, managing commissions is difficult, and for most clinics impossible to accomplish without dedicated staff and special reports.

Section 420 at the bottom of FIG. 4 includes different options for the Plan and group of plans available in a Plan Group. The bottom section lists different service options or parameters that can be selected.

Figure 5:
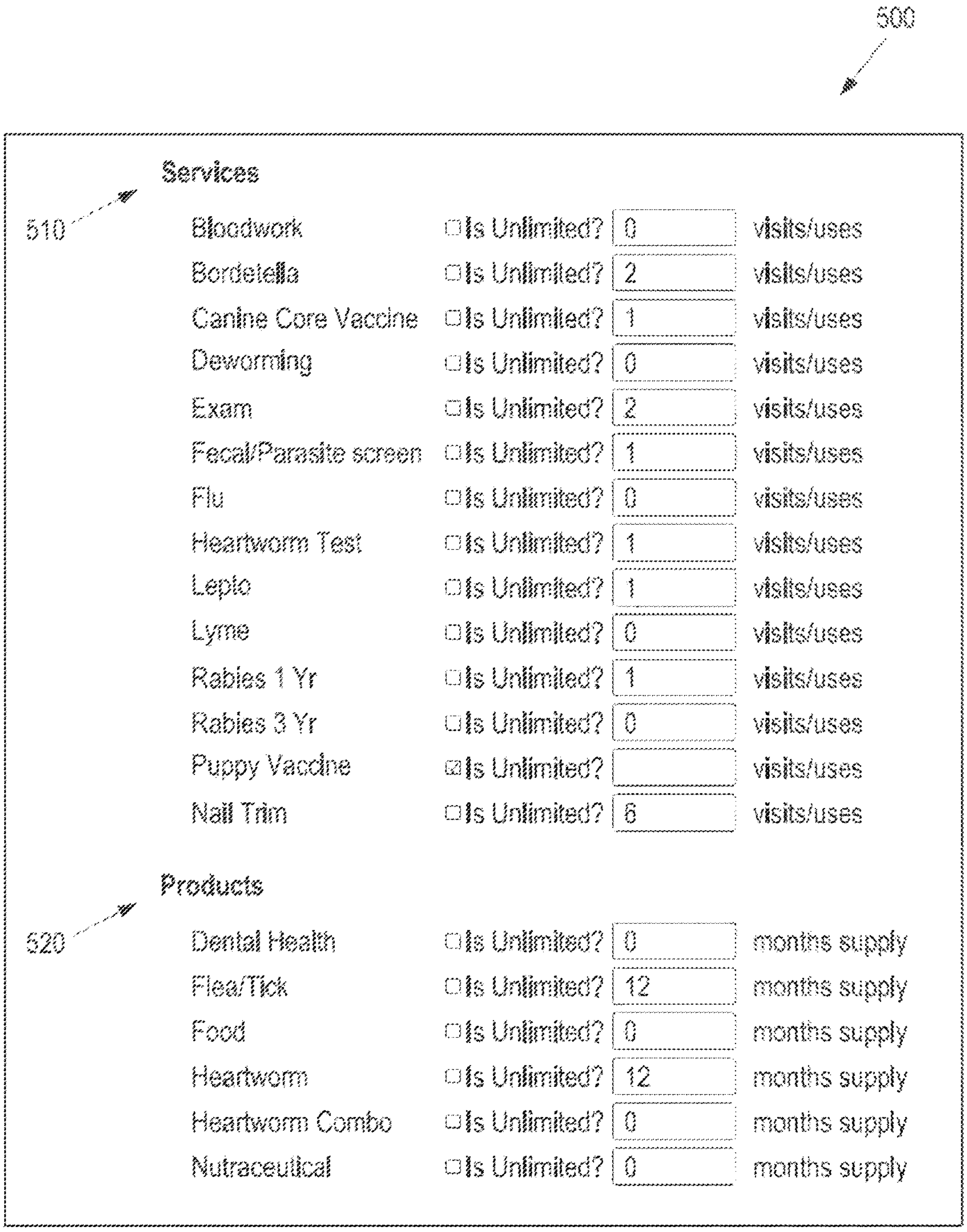
FIG. 5 is a view of enrollment options in a wellness plan, according to one embodiment.

FIG. 5 is a view 500 of enrollment options in a wellness plan, according to one embodiment. The screenshots show different options for services in a plan. In one embodiment, the WE includes Use Counts or Visits—Another complex administrative task comes from tracking multiple clients and what exactly remains in each of their plans, and if they have rolled over or not. At 510, at the top different types of service parameters are included. At 520, closer to the bottom, different products are listed and selected. A person of ordinary skill in the art would understand that the selections and choices given herein are exemplary.

Figure 6:
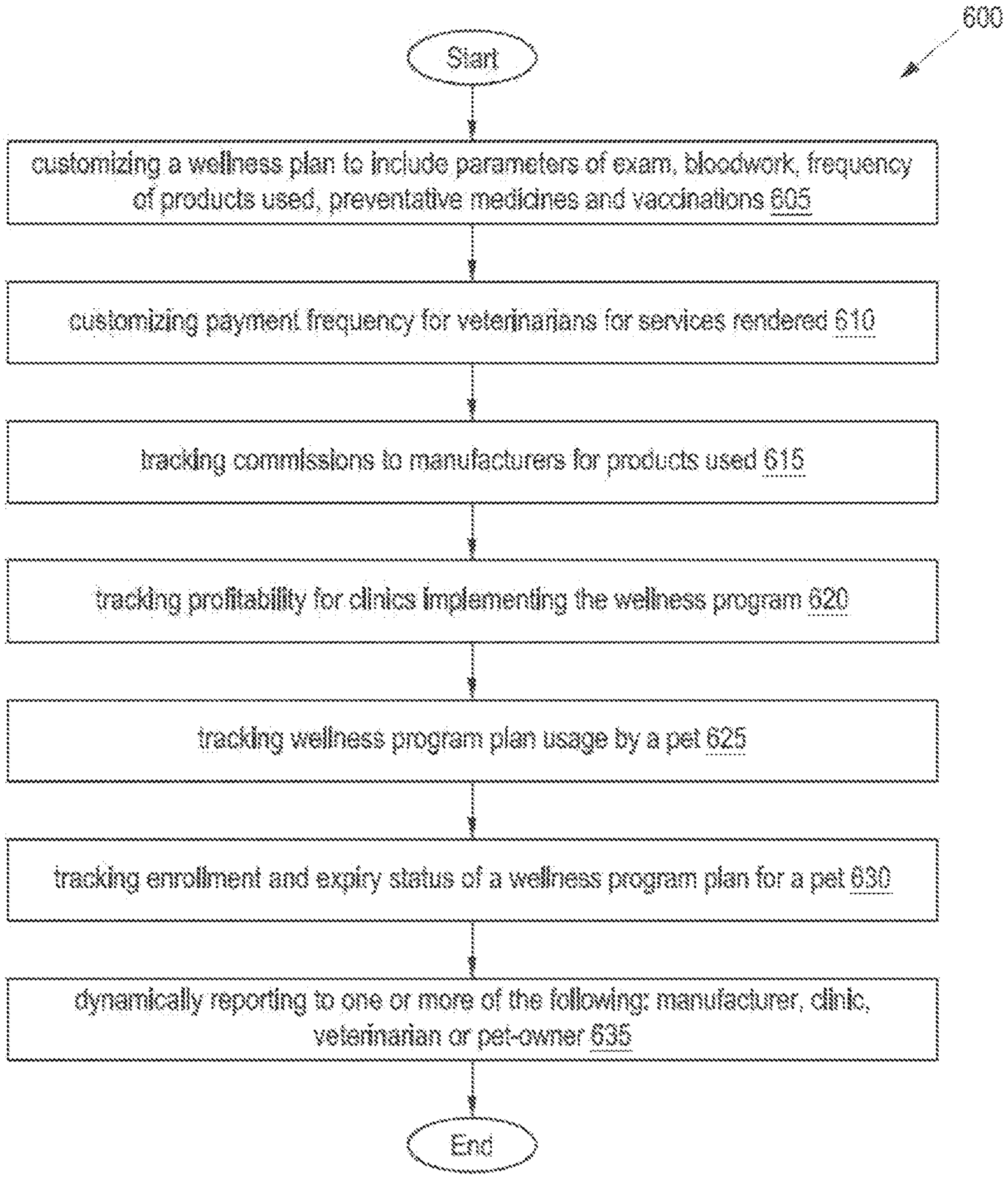
FIG. 6 shows a flowchart illustrating an example of systems and methods of flexible and customizable wellness program plan for pets through a distribution network connecting pet-owners, manufacturers, clinics and veterinarians, according to one embodiment.

FIG. 6 depicts a flowchart 600 illustrating an example of systems and methods of flexible and customizable wellness program plan for pets through a distribution network connecting pet-owners, manufacturers, clinics and veterinarians, according to one embodiment. The flowchart 600 is discussed in conjunction with the environment shown in the diagram 100 in FIG. 1. At block 605, begins with customizing a wellness plan to include parameters of exam, bloodwork, frequency of products used, preventative medicines and vaccinations. At block 610, customizing payment frequency for veterinarians for services rendered. At block 615, tracking commissions to manufacturers for products used. At block 620, tracking profitability for clinics implementing the wellness program. At block 625, tracking wellness program plan usage by a pet. At block 630, tracking enrollment and expiry status of a wellness program plan for a pet. At block 635, dynamically reporting to one or more of the following: manufacturer, clinic, veterinarian or pet-owner. A person of ordinary skill in the art would appreciate that by following the steps outlined above that is inbuilt into the computing device, the distribution network enforces wellness plans creation, design, implementation and transactions that are customized control by the clinic as well as allowing tracking different usage parameters over an extended period of time.

In a broad embodiment, the invention is systems and methods of flexible and customizable wellness program plan for pets allows a clinic with minimal resources and infrastructure to promote and implement flexible and tailored plans that meet the needs of its pet-owners. The system allows implementation of multiple wellness plans at the same time without increasing any administrative burdens of accounting, invoicing or tracking.

Figure 7:
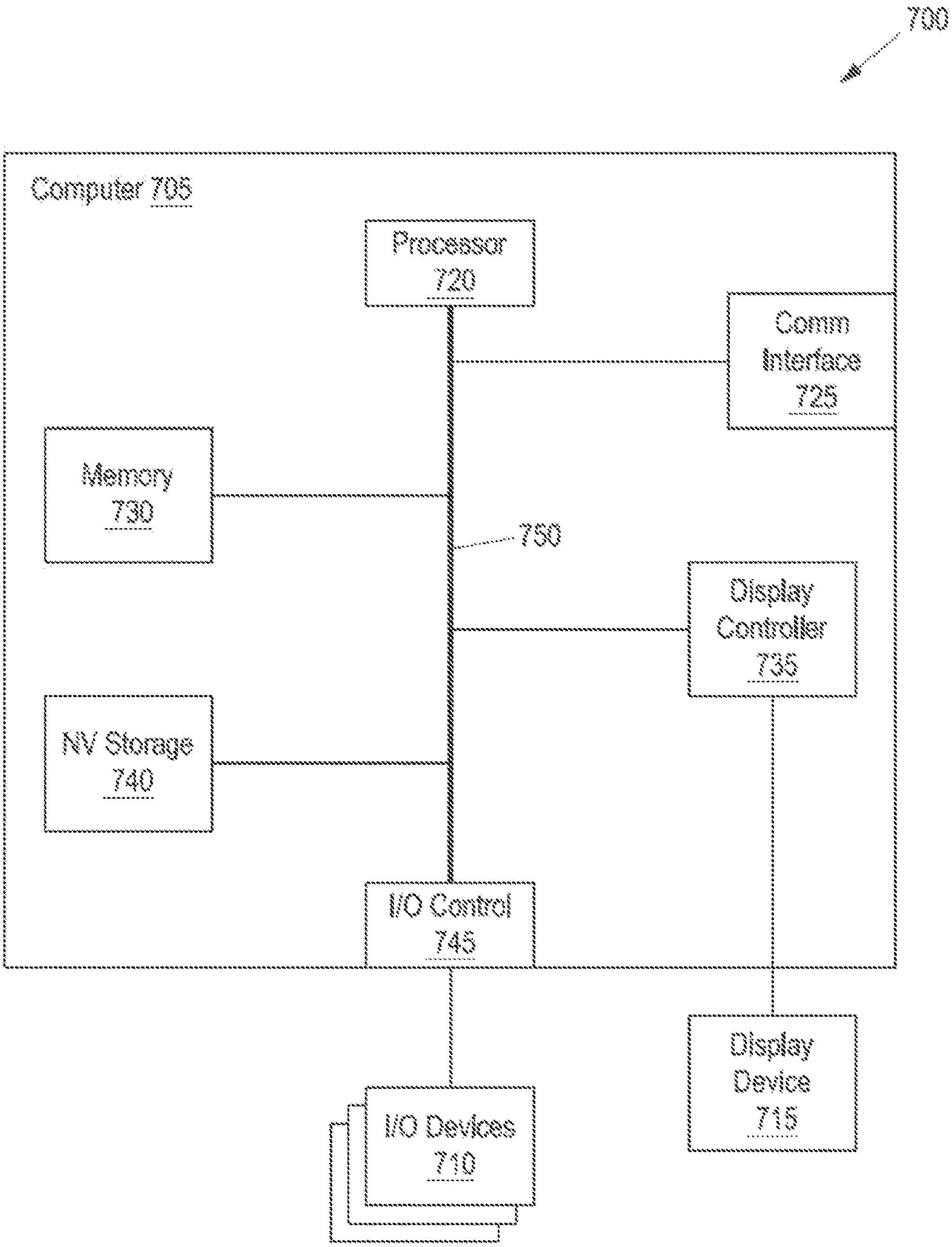
FIG. 7 is a schematic diagram of exemplary computing devices that can be used to implement the methods and systems disclosed herein, according to one embodiment.

FIG. 7 is a schematic diagram of computing device 700 that can be used to implement the methods and systems disclosed herein, according to one or more embodiments. FIG. 7 is a schematic of a computing device 700 that can be used to perform and/or implement any of the embodiments disclosed herein. In one or more embodiments, Internet of Things (IoT) device 110, SDK/API 120, Speak-to-IoT system 130, voice assistants, user end devices with mobile apps 150 or computing devices at service providers 160 of FIG. 1 may be the computing device 700.

The computing device 700 may represent various forms of digital computers, such as laptops, desktops, workstations, personal digital assistants, servers, blade servers, mainframes, and/or other appropriate computers. The computing device 700 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

FIG. 7 shows an example of a computing device 700 on which techniques described here can be implemented. The computing device 700 can be a conventional computer system that can be used as a client computer system, such as a wireless client or a workstation, or a server computer system. The computing device 700 includes a computer 705, I/O devices 710, and a display device 715. The computer 705 includes a processor 720, a communications interface 725, memory 730, display controller 735, non-volatile storage 740, and I/O controller 745. The computer 705 may be coupled to or include the I/O devices 710 and display device 715.

The computer 705 interfaces to external systems through the communications interface 725, which may include a modem or network interface. It will be appreciated that the communications interface 725 can be considered to be part of the computing device 700 or a part of the computer 705. The communications interface 725 can be an analog modem, integrated services for digital networks ("ISDN") modem, cable modem, token ring interface, satellite transmission interface (e.g. "direct personal computer" also known as "direct PC"), or other interfaces for coupling a computer system to other computer systems.

The processor 720 may be, for example, a conventional microprocessor such as an Intel Pentium microprocessor or Motorola power PC microprocessor. The memory 730 is coupled to the processor 720 by a bus 750. The memory 730 can be Dynamic Random Access Memory (DRAM) and can also include Static RAM (SRAM). The bus 750 couples the processor 720 to the memory 730, also to the non-volatile storage 740, to the display controller 735, and to the I/O controller 745.

The I/O devices 710 can include a keyboard, disk drives, printers, a scanner, and other input and output devices, including a mouse or other pointing device. The display controller 735 may control in the conventional manner a display on the display device 715, which can be, for example, a cathode ray tube (CRT) or liquid crystal display (LCD). The display controller 735 and the I/O controller 745 can be implemented with conventional well-known technology.

The non-volatile storage 740 is often a magnetic hard disk, an optical disk, or another form of storage for large amounts of data. Some of this data is often written, by a direct memory access process, into memory 730 during execution of software in the computer 705. One of skill in the art will immediately recognize that the terms "machine-readable medium" or "computer-readable medium" includes any type of storage device that is accessible by the processor 720 and also encompasses a carrier wave that encodes a data signal.

The computing device 700 is one example of many possible computer systems that have different architectures. For example, personal computers based on an Intel microprocessor often have multiple buses, one of which can be an I/O bus for the peripherals and one that directly connects the processor 720 and the memory 730 (often referred to as a memory bus). The buses are connected together through bridge components that perform any necessary translation due to differing bus protocols.

Network computers are another type of computer system that can be used in conjunction with the teachings described here. Network computers do not usually include a hard disk or other mass storage, and the executable programs are loaded from a network connection into the memory 730 for execution by the processor 720. A Web TV system, which is known in the art, is also considered to be a computer system, but it may lack some of the components shown in FIG. 7, such as certain input or output devices. A typical computer system will usually include at least a processor, memory, and a bus coupling the memory to the processor.

Though FIG. 7 shows an example of the computing device 700, it is noted that the term "computer system," as used here, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller. An example of a computer system is shown in FIG. 7.

The memory can include, by way of example but not limitation, random access memory (RAM), such as dynamic RAM (DRAM) and static RAM (SRAM). The memory can be local, remote, or distributed. As used here, the term "computer-readable storage medium" is intended to include only physical media, such as memory. As used here, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a Compact Disc Read Only Memory (CD-ROM), Erasable Programmable Read Only Memory (EPROM), or Electrically Erasable Programmable Read Only Memory (EEPROM), a magnetic or optical card, a solid state disk or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory here. Even when software is moved to the memory for execution, the processor will typically make use of hardware registers to store values associated with the software, and local cache that, ideally, serves to speed up execution. As used here, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

A person of ordinary skill in the art would appreciate that flexible and customizable wellness plan as disclosed herein includes network wide control and flexibility as well as individual level control and flexibility without having direct control of a clinic, a manufacturer, a service provider or a pet owner.

Figure 8:
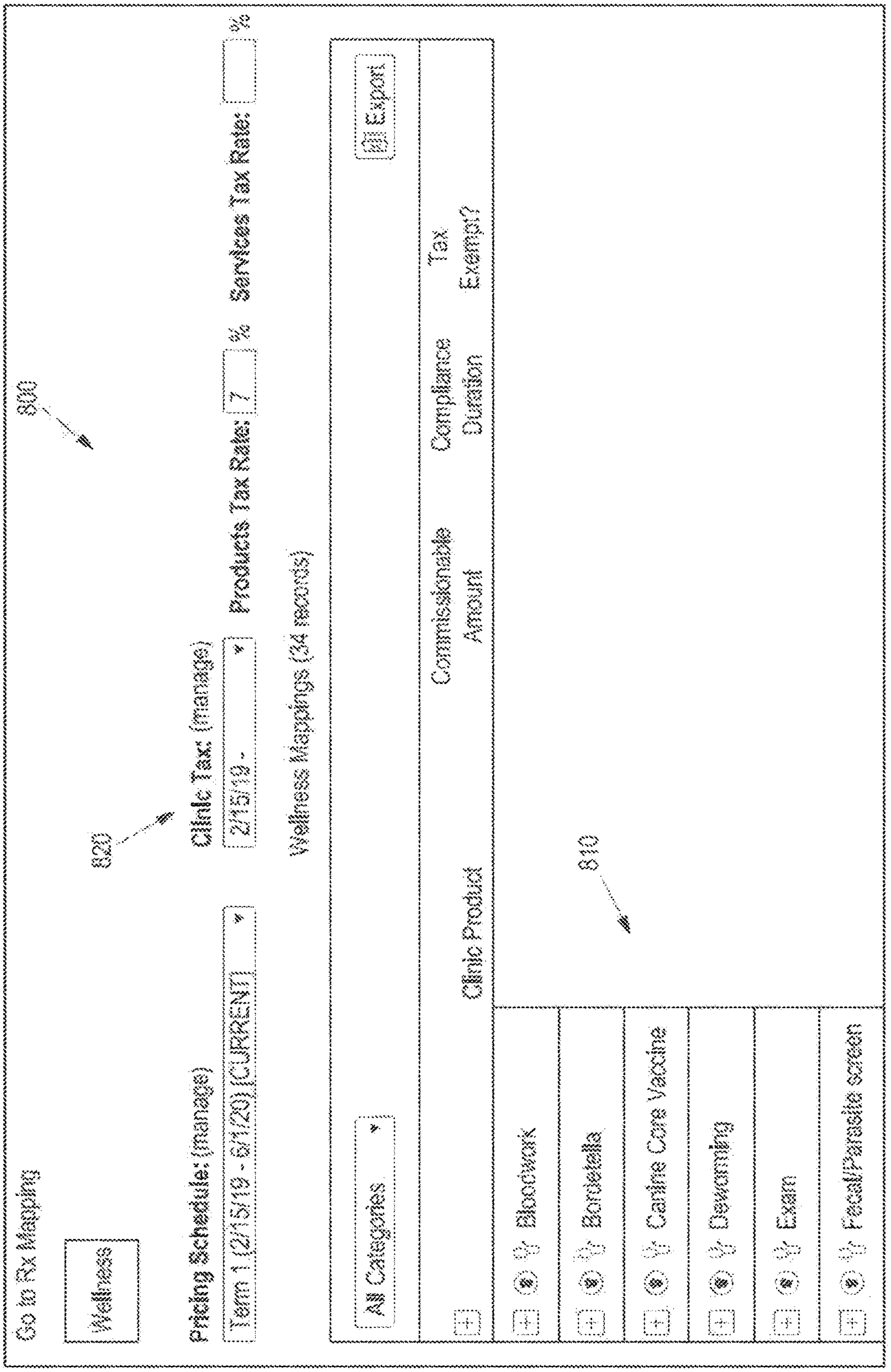
FIG. 8 is an exploded view of creating a wellness plan for a clinic, according to one embodiment.

FIG. 8 is an exploded view 800 of creating a wellness plan for a clinic, according to one embodiment. At 810, the different services in the wellness plan are listed. At 820, there are tax-rates that need to be adjusted based on the subscription payment plan and the benefits selected. A Tax Exempt flag is available for those products for which no tax is collected. The products selected in a wellness plan for a clinic are then mapped to uniform master list to manage conformity across different clinics and standardize data sets from different clinics. Such mapping allows for uniform reports from different perspectives, including that of a manufacturer, clinic, veterinarian and/or a pet-owner.

Figure 9:
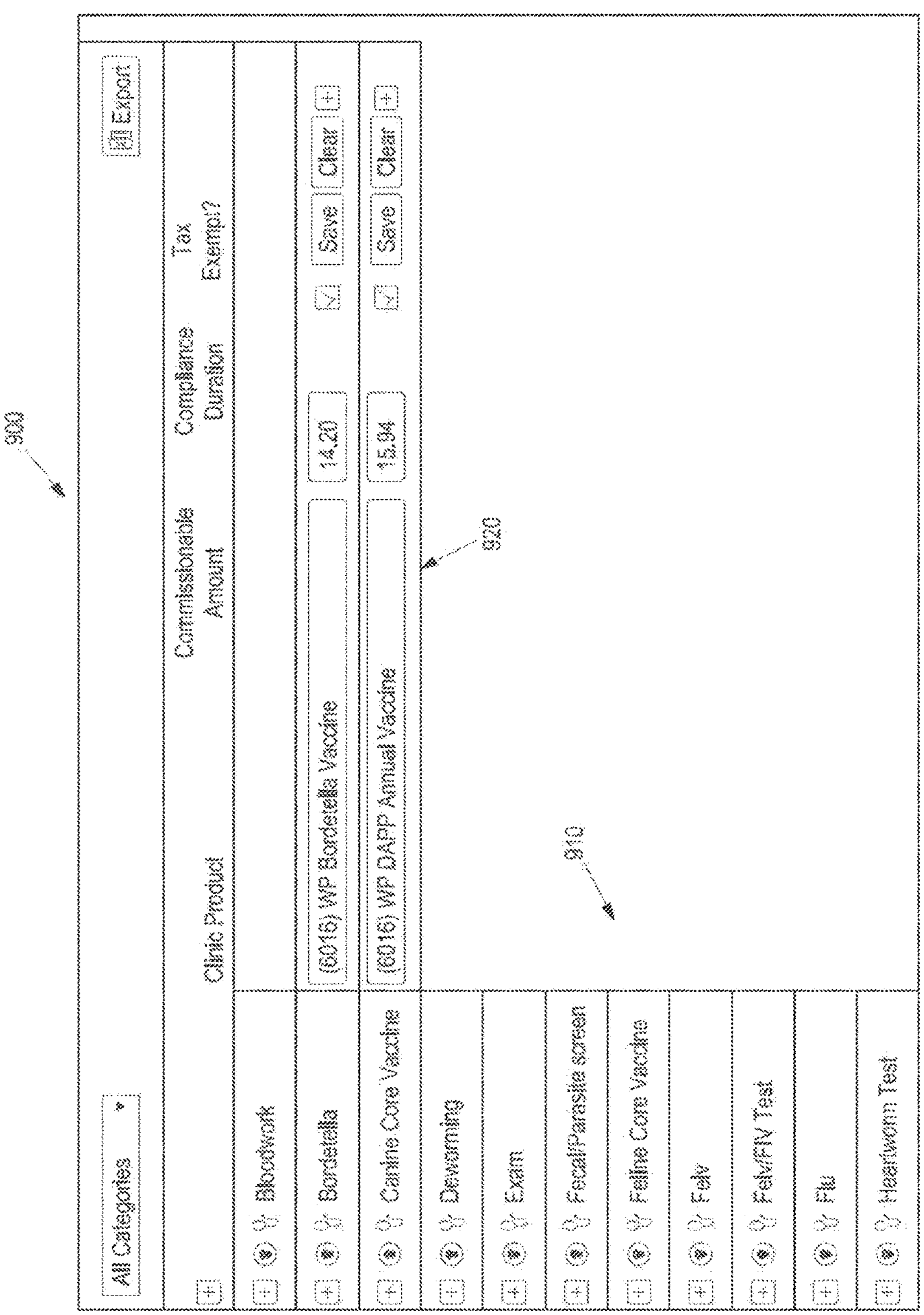
FIG. 9 is an exploded second view of creating a wellness plan for a clinic, according to one embodiment.

FIG. 9 is an exploded second view of creating a wellness plan for a clinic, according to one embodiment. At 910, the different services in the wellness plan are listed. At 920, there are commission rates that need to be adjusted based on the subscription payment plan and the benefits selected. As discussed earlier, the products and services selected in a wellness plan for a clinic are then mapped to uniform master list to manage conformity across different clinics and standardize data sets from different clinics. Such mapping allows for uniform reports from different perspectives, including that of a manufacturer, clinic, veterinarian and/or a pet-owner.

Figure 10:
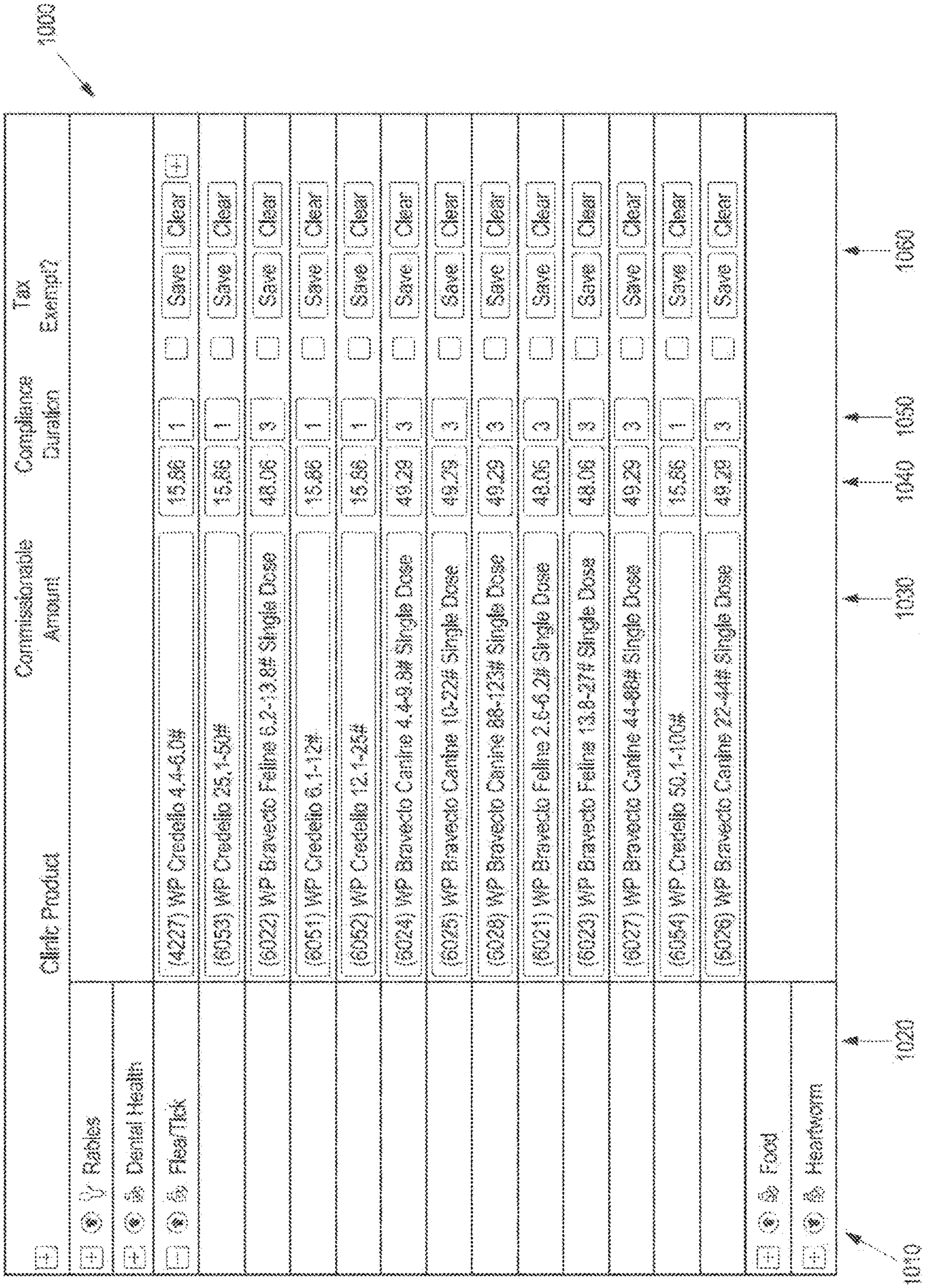
FIG. 10 is an exploded third view of creating a wellness plan for a clinic, according to one embodiment.

FIG. 10 is an exploded third view 1000 of creating a wellness plan for a clinic, according to one embodiment. The view gives examples of products selected in a wellness plan. Products have a compliance duration; i.e., how long they are effective on the animal once applied, such a flea/tick medication (whose compliance varies anywhere between 30 days and 8 months). The WE uses the compliance duration determine when the client is due for more product. For example, in the case of Bravecto listed below, it has a compliance duration of three months. So, on an invoice where the quantity of Bravecto is listed as one, the WE recognizes that the coverage lasts for three months from the date of the invoice. If a pet-owner wants to get another dose within that time frame, the system flags that as an anomaly. Commission rates can be assigned for each of the products and services that have been mapped.

At 1010, there is a category for the wellness plan. Opening up the plus sign shows options available under that category. At 1020 are the categories from the wellness plan. Examples shown are dental health, flea/tick, food, heartworm etc. At 1030, are the products available under that category as benefits of the wellness plan. 1040 shows the commission rate. At 1050 shows the use count or compliance duration. 1060 shows different flags including whether a transaction is tax-exempt etc.

FIG. 11 is an exploded view 1100 of setting up service providers for a wellness plan for a clinic, according to one embodiment. Example of commissions for different service providers are shown. The WE can keep up with separate rates for products and services when necessary, and across price schedules. This ensures commissions from clients enrolled in plans with different prices schedules are seamlessly calculated.

At 1110 the name of the service provider is given. At 1120 the product commission is given that goes to the manufacturer. At 1130, the services commission is given that goes to the service provider. 1140 gives fields to track the employee or contractor with different flags and edit buttons.

FIG. 12 is an exploded view 1200 of a service provider handling users and related transactions, according to one embodiment. The screenshot shows wellness audit. The audit screen is where the clinic is presented with previous wellness transactions that have been invoiced for wellness patients. These transactions are then grouped by Doctor for the clinic to go verify and sign off on.

In this example, one can see the client, patient and invoice number so that the clinic has enough information to locate the invoice in question on its practice management software. Also available are the date of the invoice, the product or service, how many were used/dispensed, the commission generated and the date of processing. The clinic user can hover over and see the math behind the commission calculation for a more detailed validation.

At 1210, information regarding the pet-owner is given with invoice number and date. At 1220, the product information with dosage is included. At 1230 the quantity used as well as any tracking with use count for the plan is shown. At 1240 the price and invoice processing date is tracked.

The audit screen is where the clinic is presented with previous wellness transactions that have been invoiced for wellness patients. These transactions are then grouped by Doctor for the clinic to go verify and sign off on. In this example, one can see the client, patient and invoice number so that the clinic has a enough information to locate the invoice in question on its practice management software. Also available are the date of the invoice, the product or service, how many were used/dispensed, the commission generated and the date of processing. The clinic user can hover over at 1250 and see the math behind the commission calculation for a more detailed validation.

FIG. 13 is a second exploded view of a service provider 1300 handling users and related transactions, according to one embodiment. This is another example of that shown in FIG. 12. In this screen, there are examples of the adjustments and corrections as well as the sign off section at the bottom. The sign-off feature provides the clinic with a stopping point where its staff can review the activities and commissions of its service providers (such as doctors). The audit screen displayed herein presents a window into the activities of the providers that is invaluable for the early detection of any discrepancies, and before commissions are handed out.

For example, mistakes in mapping can be identified before commissions are reported, and wellness revenue mistakenly reported on a doctor can be corrected and moved without the need to reinvoice. This process would not be possible in a traditional system without multiple manual corrections. Finally, the audit provides a quick and concise way to report commissions on zero-dollar invoice items without manual calculation. This is extremely valuable since zero-dollar items make up almost the totality of line items (and thus calculations) on invoices for clients enrolled in plans.

FIG. 14 is an exploded view of wellness plan accounting 1400, according to one embodiment. The screenshot lists the submitted items from the audit page. They form a fully reconcilable report that is prefiltered and shows all pertinent information about the wellness transactions. The granularity and ease of use are another feature of the WE that sets it apart from traditional tracking methods.

FIG. 15 is an exploded view 1500 of tracking from a user's perspective, according to one embodiment. The screenshot shows the plan usage tracking aspect that provide a view into the current plan usage for the patient. This is designed to be viewed by a receptionist or tech as clients come in for service. The screenshot shows that there is a search field 1510 that will work with client or patient name, a list of clients and plan status.

FIG. 16 is a second exploded view 1600 of tracking from a user's perspective, according to one embodiment. This expanded view provides immediately a complete picture of what the client is still eligible for on their plan. To assemble this information without WE, the clinic would need an error-prone paper process together with a time-consuming lookup in the practice management system of multiple invoices over multiple months. This view with the uses remaining and next dispense date also protects the clinic from over proscribing or delivering services which are not included in the plan.

FIG. 17 is a third exploded view 1700 of tracking from a user's perspective, according to one embodiment. Another aspect of WE is the management of plans that have been cancelled so that further service under that plan is denied. The screenshot shows that the cancelled plans are also tracked easily. When compared to the traditional methods listed above, the WE allows accuracy, efficiency, and speed not otherwise available to a clinic.

While the examples herein are shown for distribution network of products and services for pets that sold at different veterinary clinics using different veterinarians or service providers and sourced from different manufacturers, a person of ordinary skill in the art would understand that the disclosure can be applied to different types of distribution networks of products. For example, this could apply equally to a distribution network for contact lens and ophthalmologists, salons with beauty parlor products, fitness/gyms with instructors, or dentist with cosmetic teeth whitening products.

The systems and methods of flexible and customizable coupon deals for a distribution network of products through clinics includes techniques to enable different clinics to provide seamless coupon plans that are implemented digitally to provide automated tracking on rebates as well as giving an end-user interface that allows for a maximum discount on a transaction. Manufacturers, including manufacturers of products, individual clinics, and other providers, can promote different coupon deals that clinics may opt-in or opt-out. Digital coupons allow efficient processing as well as detection of any anomalies and stealing. Further, digital coupons blocks attempts to take undue advantage of the offers.

The digital coupon system provides automatic and seamless identification of offers applicable to each invoice; gathering of all data (client & patient information, applicable products, and offer details), and their display in a user-friendly manner so that clinics can quickly approve or reject a given coupon applied to an invoice or redemption; direct submission to the manufacturer cuts down from months to a few days on time required for clients to get their rebates, and for the clinics to get their replenishment doses.

Providing a seamless digital coupon architecture that works across different clinics and with different manufacturers requires, in one embodiment, different modules including mapping, coupons creation and processing, coupon library, coupon definition engine, coupon processing engine, clinic side agent, patent intake management system and a synchronization process. Each of these modules is described in detail below.

In the mapping module, each clinic has its own set of codes that uniquely identify a given product at the clinic. For example, clinic A may have a code 6NG for a 6-pack of NexGard, while clinic B uses 6PACKNG for the same product and pack size. Processing agent has a set of canonical codes that are referenced by all applications (such as coupon processor, wellness processor, reporting engine) in an effort to standardize the handling of data. Processing agent maps each of the clinic's codes to this set of canonical codes based on, say, the number of doses (e.g., 6 doses), the product (NexGard), and whether it's a free-dose code or not. In the above example, both 6NG and 6PACKNG would be mapped to master code NexGard 6-pack code. All processing in master or uniform codes (coupon, wellness, and reporting) is done based on the canonical codes, thus allowing master codes to effectively handle the clinics' disjoint set of codes. When appropriate (such as when generating reports for a clinic) master codes may use the clinic's actual code since canonical codes are not themselves relevant to the clinic. An Artificial Intelligence (AI)-based engine has been developed and is being improved on continuously to automate and shorten the mapping process while minimizing mapping errors. The AI engine learns from feedback received from manual reviews.

Using master codes allows conforming the customized sets of the coupons across the distribution network of products includes categorizing transaction code correctly to map to duplicate codes at a clinic location and avoiding duplicate transaction codes at the distribution network.

In the Coupons module, a coupon can be viewed as a collection of rules and unique identifiers that describe which transactions need to appear on the invoice for the coupon to be applicable, as well as the time in which the transactions must occur. For example, one must buy 6 doses of NexGard between Mar. 1, 2020 and Jun. 1, 2020 to be eligible for a $10 rebate. The rules as imposed by the manufacturer of the coupon, and include but are not limited to: number of doses, patient's weight, species, age, price paid for the doses, and validity period. The manufacturer may wish to target specific clinics with customized coupons, for example to increase sales in clinics that are not selling enough of the manufacturer's own products and/or are selling too much of a competitor's products. The geographical location of the clinic is also a potential factor when choosing offers and target clinics. For example, regions of the country that are more susceptible to tick and flea infestation than others may benefit from expanded parasiticide offers. Offering dissimilar coupons to different clinics was practically impossible to manage without a digital system tracking disclosed herein due to administrative overhead. In one embodiment, the coupon service may partner with clinics to run clinic-originated offers (such as discounted boarding if the client has previously bought a certain number of products, say). These offers may be manufacturer agnostic. This is a unique flexibility of the coupon processing system disclosed herein.

The coupon creator computing device works on customizing and creating different coupons.

The Coupon Library module works as follows. The coupon library has two main objectives: a) to present the clinic with the list of coupons available and b) to let the clinic opt in or out of each individual coupon. Because of special offers and of the manufacturers' program the clinic has enrolled in, each clinic can potentially have a different set of coupons available in the library. The coupon's rules are fixed and cannot be changed by the clinic.

The Coupon definition engine works as follows. Each coupon has a set of rules that specify a) which transactions (products, services) must be on the invoice for the coupon to be applicable, and b) which clinics can view the coupon on the clinic's library page and thus opt in and out. For (a), those rules can be based on, but not limited to, doses bought or previously bought, services rendered, patient weight, species, age, or breed. Also, whether the coupon is multi-redeemable by patient, and whether products from different patients on a given invoice can be combined. For (b), the geographical location of the clinic, the number of Doctor of Veterinary Medicine (DVM) s at the clinic, the product sales, etc., can be considered. The coupon definition engine uses master canonical mapping to express rules that can be applied to any clinic.

The coupon processing engine works as follows. The coupon processing engine applies each of the opted in coupons to the invoices of a clinic. This means a) identifying the opted-in coupons and b) evaluating the rules of each coupon viz-a-viz the contents of an invoice. If a coupon's rules are satisfied, then a redemption is generated on behalf of the client and patient for that coupon. This process is fully automated and happens after every batch of invoices is received for processing. All redemptions generated are made available to the clinic for validation, at which point the clinic can approve or reject the redemption. The clinic-validated and approved redemptions are subsequently submitted to the respective manufacturer for processing. For instance, if the clinic handed out two free doses (no charge) of a given product to the client, then the submitted corresponding redemption signals the manufacturer that it must refill the clinic's inventory at no cost to the clinic. This automated identification of qualifying coupons has reduced the processing time from months to a few weeks. So now the clinic receives the two doses in three weeks instead of three months after they were dispensed to the client.

The Clinic Agent works as follows. The Clinic Agent extracts invoice, client, patient, and line item information from each clinic's Patient intake management system ("PIMS"). The agent has a user interface that configures its run-time parameters, such as the type of PIMS in the clinic, its database location, and relevant folders. One configured, the agent runs daily to extract and forward (sync) the data to coupon servers. The agent automatically updates its files when newer ones are made available by coupon processing on its servers.

The Optional Online PIMS module works as follows. Some of the clinics do not have their own PIMS installed, but instead use cloud-based PIMS. Coupon processing has developed an application that extracts the same data as the agent's from cloud based PIMS and submits the data to coupon servers.

The Sync process works as follows. The daily batch of data from the clinics undergo validation upon arrival at coupon server (such as rejecting duplicate invoices). Valid invoices are subsequently stored in the database. Triggered by the arrival of the batch, applications such as the coupon processor inspect the newly stored data and may generate redemptions and updates to enrollment (or usage) of a patient, respectively. The data is also made available for reporting.

In another embodiment, the architecture shown in the diagram 100 of FIG. 1 also illustrates an example of systems and methods of flexible and customizable coupon deals for a distribution network 140 of products through clinic 110-1 to **110-*n* connecting to end-users or consumers 150-1 to 150-*n* and manufacturers 120-1 to 120-*n*, with different types and categories of computing devices and varied products 130-1 to 130-*n*. The architecture shown in FIG. 1** provides for flexibility that allows coupon deals to originate from a manufacturer or from a clinic, i.e. wholesaler or reseller.

For a coupon to be implemented through the system, a user or pet-owner 150-1 to **150-*n*** with computing device may visit a clinic to enter into a transaction with multiple line items. The coupon system automatically provides rebate information on different line items suggesting the best available deal the clinic can offer for that transaction. The end-user always gets the best possible discount. Rebates received in the past are automatically tracked, allowing for efficient use and preventing anomalies. The system can also detect fraud of coupons as well as stealing on invoices. The system works seamlessly industry-wide and can also provide competitive clinic and manufacturer data that can be anonymized for privacy concerns but can be very insightful for usage trends that feed into marketing, sales and promotions of different products.

A person of ordinary skill in the art would appreciate that a clinic is a small business that does not have the resources to integrate different coupon options with products from different manufacturers and track transactions tied to a customized coupon plan for a period longer than a year. Many of these clinics reset prices yearly and any contract involving a longer subscription plan is lost. Clinics with the digital coupons invention disclosed herein can now provide well-informed customized coupon plans that can be automatically tracked for rebates and costs. A clinic can also pull up revenue and costs at any time to analyze whether a particular coupon plan is working within the estimated profit margins. Backend coupon submissions for rebates and payments from the manufacturers becomes automatic and seamless.

Figure 18:
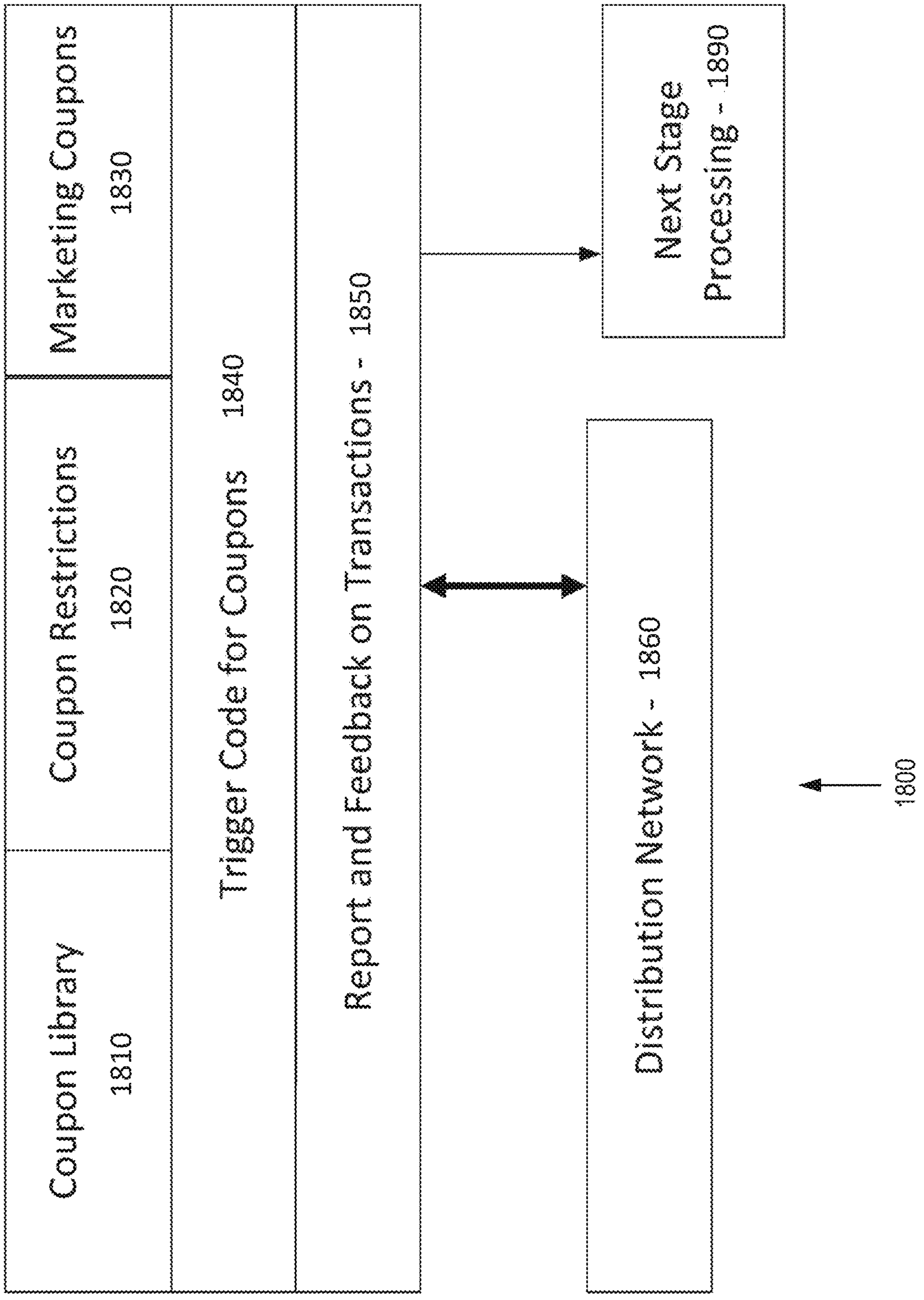
FIG. 18 shows exploded view of a computing device with different interfaces included in the systems and methods of flexible and customizable coupon deals for a distribution network of products through clinics, according to one embodiment.

FIG. 18 shows exploded view 1800 of a computing device with different interfaces included in the systems and methods of flexible and customizable coupon deals for a distribution network of products through clinics, according to one embodiment. There is an interface between the distribution network 1860 and computing device with the module to receive transaction requests and generate individualized reports and feedback. Distribution network 1860 passes on processed information to next stage processing 1890. The digital coupons system can be audited by requesting an audit at individualized reports 1850 module. The clinic can customize line item trigger codes based on opted-in coupon deals at coupon application 1840 module. In one embodiment, each clinic can customize his or her own coupon library. In one embodiment, each manufacturer can customize its own coupon library that is implemented across different clinics globally. The modules operate with a computing device that may have one or more operating systems including Android, iPhone Operating System (iOS) or Internet of Things (IOT) operating system.

The computing device includes software module 1810 that includes creating a digital coupon plan library, lists coupon restriction 1820 parameters and includes coupon marketing 1830 parameters. The trigger codes are applied per line item on a transaction or invoice based on a coupon application 1840 and report or feedback on transactions is automatically tracked at individualized reports 1850 module. The digital coupon system interfaces with distribution network 1860 and moves the transaction to the next stage processing 1890. The digital coupon system configurations may be stored locally at a clinic or in a cloud computing environment or in a split client/server type architecture.

In one embodiment, the computing device includes applications or services that request and make digital coupon configurations and corresponding transactions. In one embodiment, the digital coupon system is marketed across more than one clinics, providing consumers options to visit more than one clinic under a subscription plan. In one embodiment, the individualized reports 1850 module also tracks any anomalies or frauds in the coupons. In one embodiment, a clinic may select coupon deal to enroll and provide rebates for within a clinic independent of any association with any manufacturer. In one embodiment, a clinic may do regular billing that is automatically connected to the coupon system to give rebates and track payments.

In one embodiment, manufacturers or clinics may get reports on anomalous activity including misuse of rebates or stealing on invoices, and/or detecting low inventory. In one embodiment, anomalous activity includes detecting pricing that is out of minimum and maximum range for a given dosage. This prevents incorrect data from reaching the manufacturer and affecting the reports generated.

Figure 19:
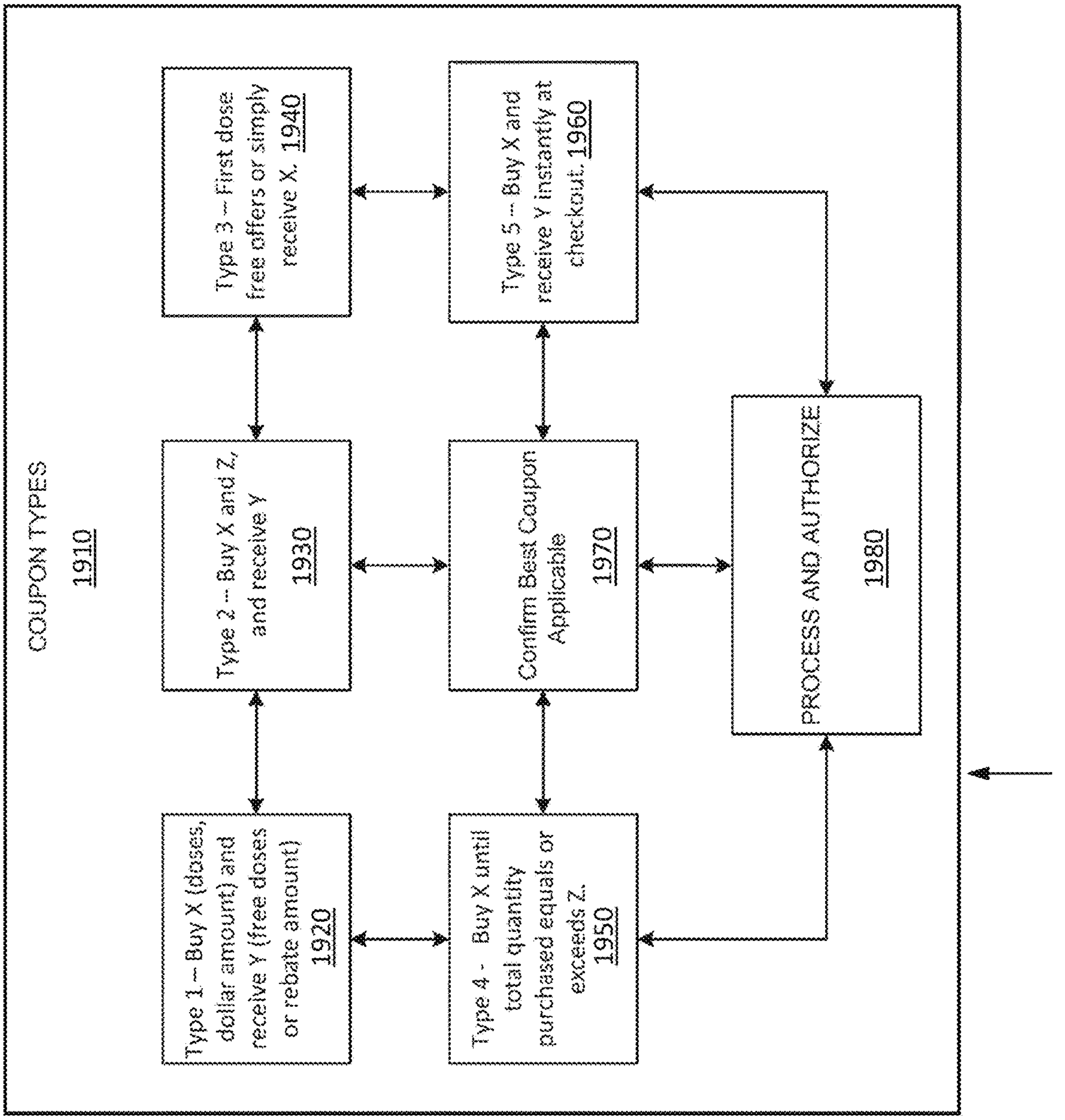
FIG. 19 is an exploded view of different modules included in the systems and methods of flexible and customizable coupon deals for a distribution network of products through clinics, according to one embodiment.

FIG. 19 is an exploded view 1900 of different modules included in the systems and methods of flexible and customizable coupon types 1910 that provides deals for a distribution network of products through clinics, according to one embodiment. FIG. 19 outlines a view 1900 of different types of coupon plans that can be implemented in a coupon library for a clinic or a manufacturer. At 1980, the process and authorize module creates, designs and processes different coupon types that are offered and creates corresponding tracking related to line item triggers and invoicing. At 1920, coupon type 1 are created, designed and maintained that include options of buy X doses for dollar amount and receive Y free doses or a rebate amount. At 1930, coupon type 2 are created, designed and maintained that include options of buy X and Z and receive Y. At 1940, coupon type 3 are created, designed and maintained that include options of first does free offers or simply receive X. At 1950, coupon type 4 are created, designed and maintained that include options of buy X until total quantity purchased equals or exceeds Z. At 1960, coupon type 5 are created, designed and maintained that include options of buy X and receive Y instantly at checkout. The best coupon applicable trigger code 1970 is applied to confirm application on a transaction. Generating line item triggers to list applicable coupon offers includes providing details on the best applicable coupon option with maximum discount for the transaction. The process and authorize 1980 module processes the transactions with applicable coupons.

Figure 20:
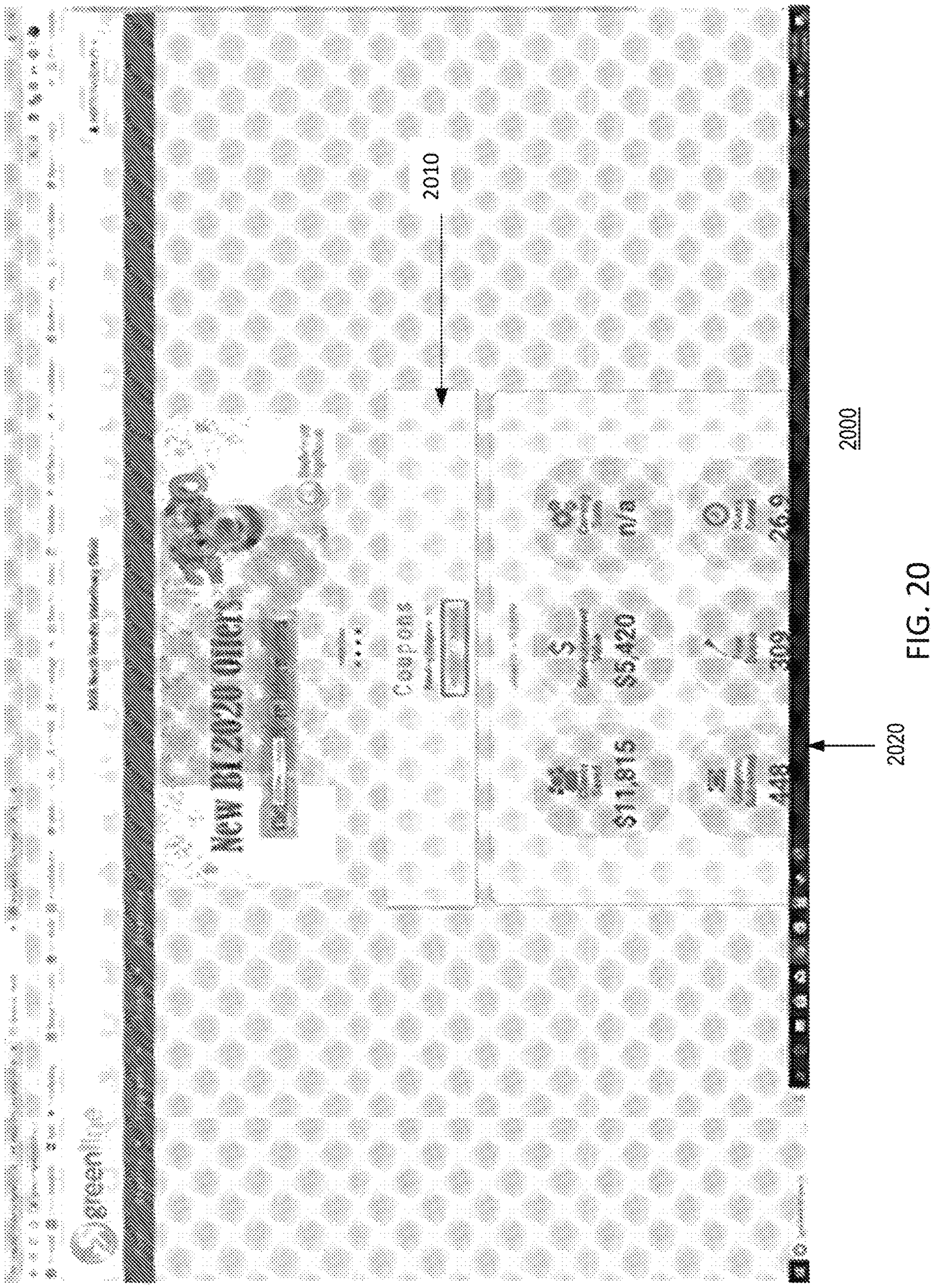
FIG. 20 is a view of steps of processing digital coupons, according to one embodiment.

FIG. 20 is a view of steps of processing digital coupons 2000, according to one embodiment. The first page shows the status of coupons executed across different clinics. By pressing the Process Coupons 2010 button, an operator can go and check into more details related to coupons. Clinics need to login before they can access this status page. They can see the number of coupons 2020 for review, and below that stats around all their offers. The clinic operator can press process coupons or the actual number to be taken to its audit page.

Coupon stats can include reporting coupon usage to the manufacturer or usage at a clinic location. Coupon stats can also detect any coupon frauds or anomalies. Coupon digital processing allows instant rebate execution for the coupon. Coupons can be tracked based on location. Stats of coupons receiving an opt-in option for a clinic location where the coupon is offered for the coupon to be effective. Coupons on products can be combined with services provided at a clinic location.

Digital coupon system works with their manufacturer clients to set up new offers. The following information is required to implement an offer in the coupon system. First, for Business Requirements: The type of purchase that triggers the offer (e.g., quantity, dollar amount); The value/dollar amount of the offer; The type of offer: a product reimbursement, rebate, or instant rebate; The species (i.e., canine, feline) targeted by the offer; Age constraints (e.g., puppies or adults only, or no constraint); The start and end date of the offer; The target clinics of the offers (all, or a subset); Available to certain sales reps or companywide; Data required by the manufacturer to process the offer: file formats, delivery location; Scope of the offer: once per pet or household, or redeemable multiple times; Whether different weight classes or dosages be combined to reach a target quantity; Purchases are or are not cumulative over time.

Second, for Collateral requirements: Image files of the offer for the coupon library; Branding or messaging requirements; Any email communication that needs to be sent to notify clinics of the start or end of offers.

Once these requirements have been satisfied, coupon developers create the offer and add it to the Coupon Logic Engine (CLE). The CLE has been built to consider those requirements when deciding whether a given set of transactions qualify for an offer.

Figure 21:
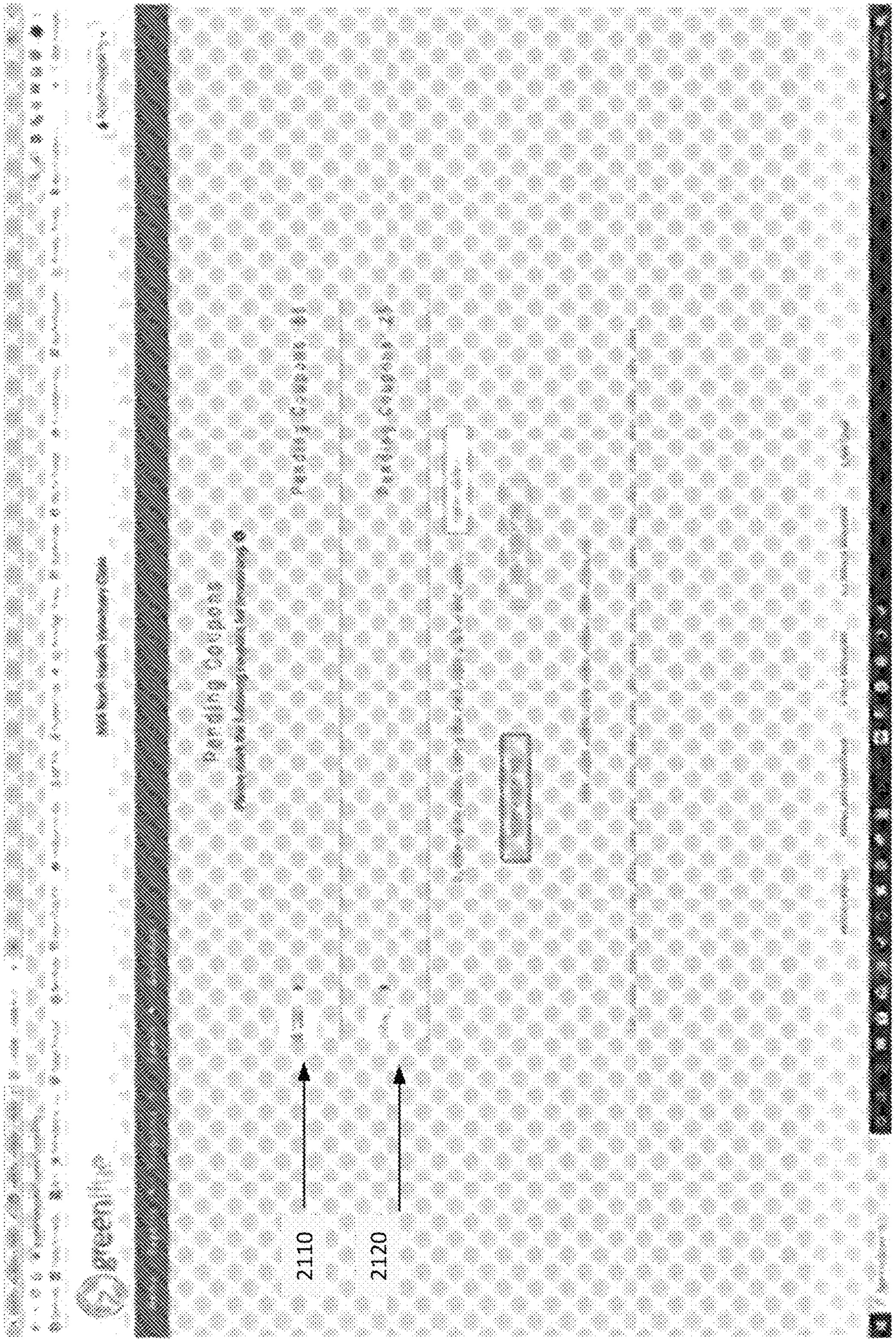
FIG. 21 is a view of pending coupons, according to one embodiment.

FIG. 21 is a view 2100 of pending coupons, according to one embodiment. On this screenshot, one can see that there are coupons to process for multiple manufacturer clients. Manufacturer 2110 is manufacturer 1 is with 66 pending coupons. Manufacturer 2120 is manufacturer 2 with 26 pending coupons.

Figure 22:
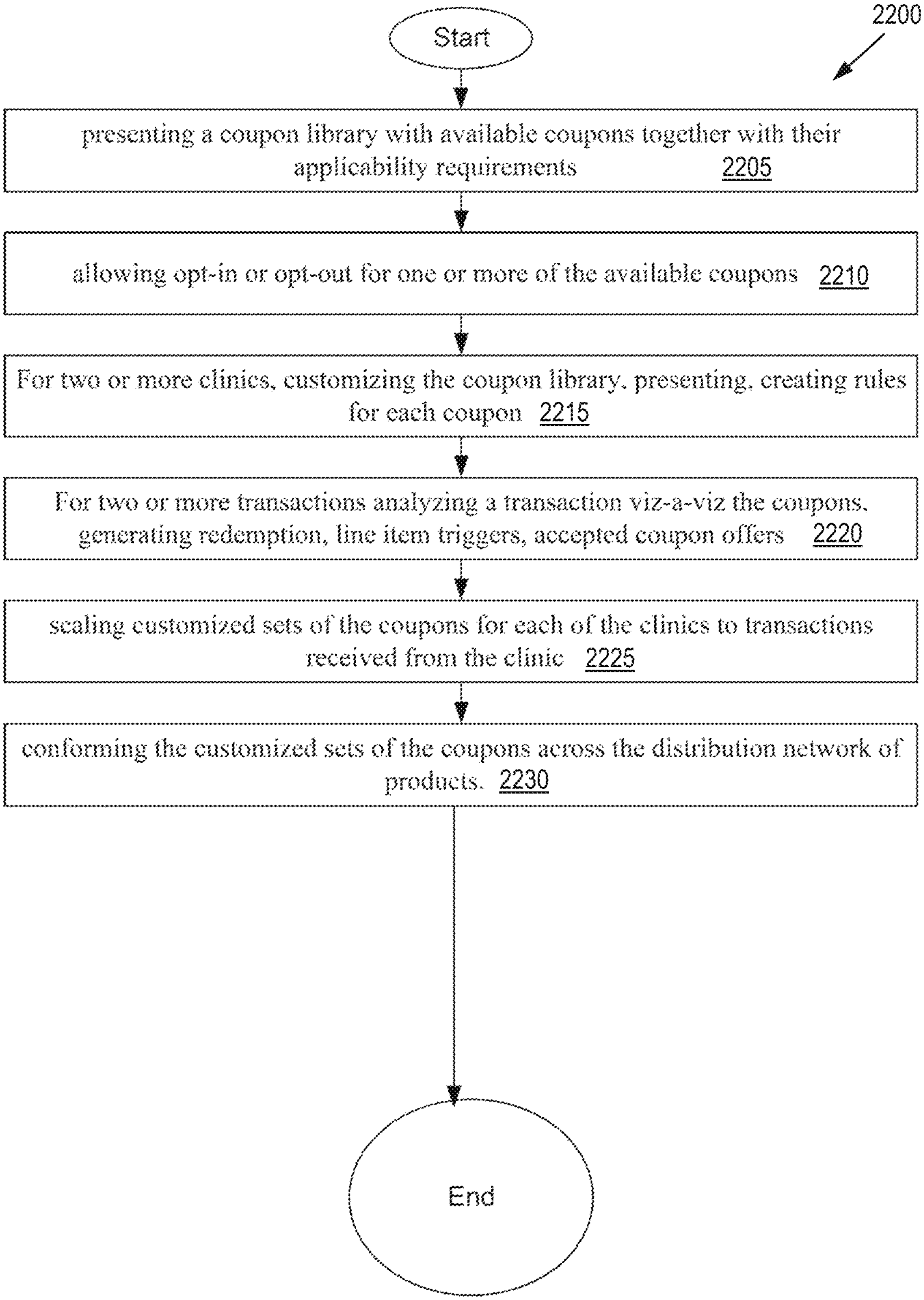
FIG. 22 shows a flowchart illustrating an example of the systems and methods of flexible and customizable coupon deals for a distribution network of products through clinics, according to one embodiment.

FIG. 22 shows a flowchart 2200 illustrating an example of the systems and methods of flexible and customizable coupon deals for a distribution network of products through clinics, according to one embodiment. The flowchart 2200 is discussed in conjunction with the environment shown in the diagram 100 in FIG. 1. At block 2205, begins with presenting a coupon library with available coupons together with their applicability requirements. At block 2210, allowing opt-in or opt-out for one or more of the available coupons. At block 2215, for two or more clinics, customizing the coupon library, presenting, creating rules for each coupon. In one embodiment, this further includes, customizing the coupon library for a clinic by defining a list of coupons for the clinic based on one or more of the following: the clinic itself, clinic location, products or services sold at the clinic, time of the year, number of clients, types of patients, and number of patients; presenting the customized sets of coupons to the clinic; creating rules that indicate requirements for a transaction to qualify for each coupon based on a combination of parameters using one or more of the following: number of doses bought, number of doses previously bought, number of doses given for free to the client, the patient's age, weight, species, breed, and invoice date. For example, an offer may not apply to a clinic because of type of patients served. If the offer is a program for flea/tick protection for cats, and the clinic may not qualify because 90% of its patients are cows.

At block 2220, for two or more transactions analyzing a transaction viz-a-viz the coupons, generating redemption, line item triggers, accepted coupon offers. In one embodiment, this further includes, analyzing a transaction viz-a-viz the coupons that the clinic has opted into; generating a redemption based on the successful application of the rules for the coupons to the transaction; generating line item triggers to list applicable coupon offers; and receiving indication on accepted coupon offers. In one embodiment, the clinic confirms or denies the correctness of the coupon applied to an invoice and patient.

At block 2225, scaling customized sets of the coupons for each of the clinics to transactions received from the clinic. Scaling or to scale customized sets of the coupons to clinics involves propagating the digital coupon sets to clinics. The processing server tracks which clinic has which variation of the customized sets of the coupons. At block 2230, conforming the customized sets of the coupons across the distribution network of products. A person of ordinary skill in the art would appreciate that by following the steps outlined above that is inbuilt into the computing device, the distribution network enforces digital coupons creation, design, implementation and transactions that are customized control by the clinic as well as allowing tracking different usage parameters over an extended period of time. This makes backend submissions to the manufacturers seamless and efficient. It helps in minimizing the administrative tasks and goes towards zero paper invoicing.

In a broad embodiment, the invention is systems and methods of flexible and customizable coupon deals for a distribution network of products through clinics as well as manufacturers to provide for customized coupon deals with automated tracking from transactions with consumers to backend submissions to the servers for rebates. The system allows implementation of multiple coupon plans at the same time without increasing any administrative burdens of accounting, invoicing or tracking. The methods and systems disclosed herein may be implemented using the computing device 700, shown in FIG. 7.

A person of ordinary skill in the art would appreciate that flexible and customizable wellness plan as disclosed herein includes network wide control and flexibility as well as individual level control and flexibility without having direct control of a clinic, a manufacturer, a service provider or a pet owner.

Figure 23:
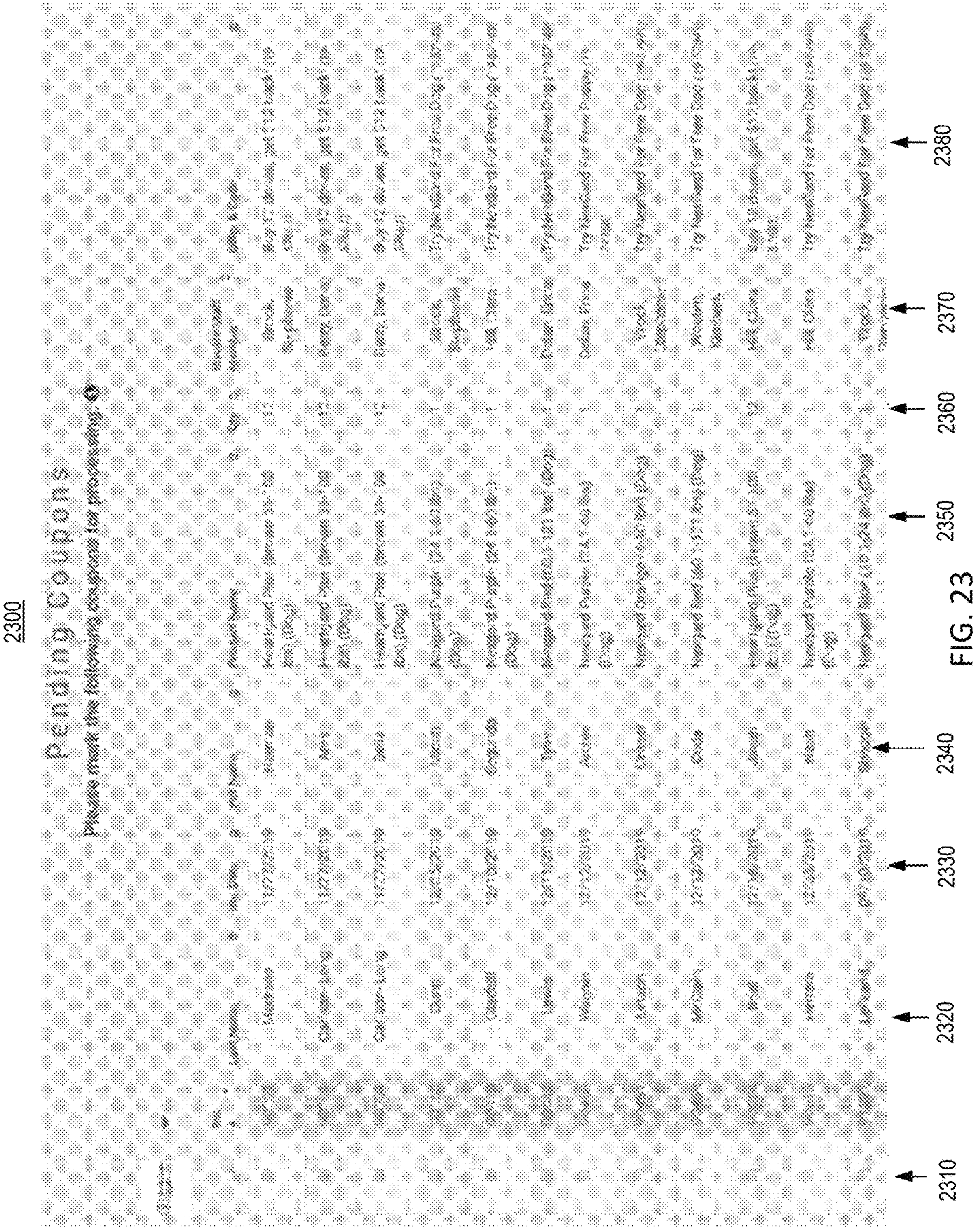
FIG. 23 is an exploded view of pending coupon processing, according to one embodiment.

FIG. 23 is an exploded view 2300 of pending coupon processing, according to one embodiment, for example of clinics selling products for pets. The invoice id 2310 gives details of different transactions that have coupon processing pending. The next field is the consumer name 2320. The next field is the invoice date 2330. The next field is the name of the pet 2340. The next field is the product purchased 2350. The next field is the quantity 2360. The next field is the staff member 2370 at the clinic who performed the intake of the invoice. The next field is the coupon offer 2380 and trigger code with applicable rebate. The info here is so that the clinic can audit the process before submission. Each line item represents a qualifying transaction that met the rules for an offer. There is also a description of the product along with the staff member who is associated with the transaction.

Figure 24:
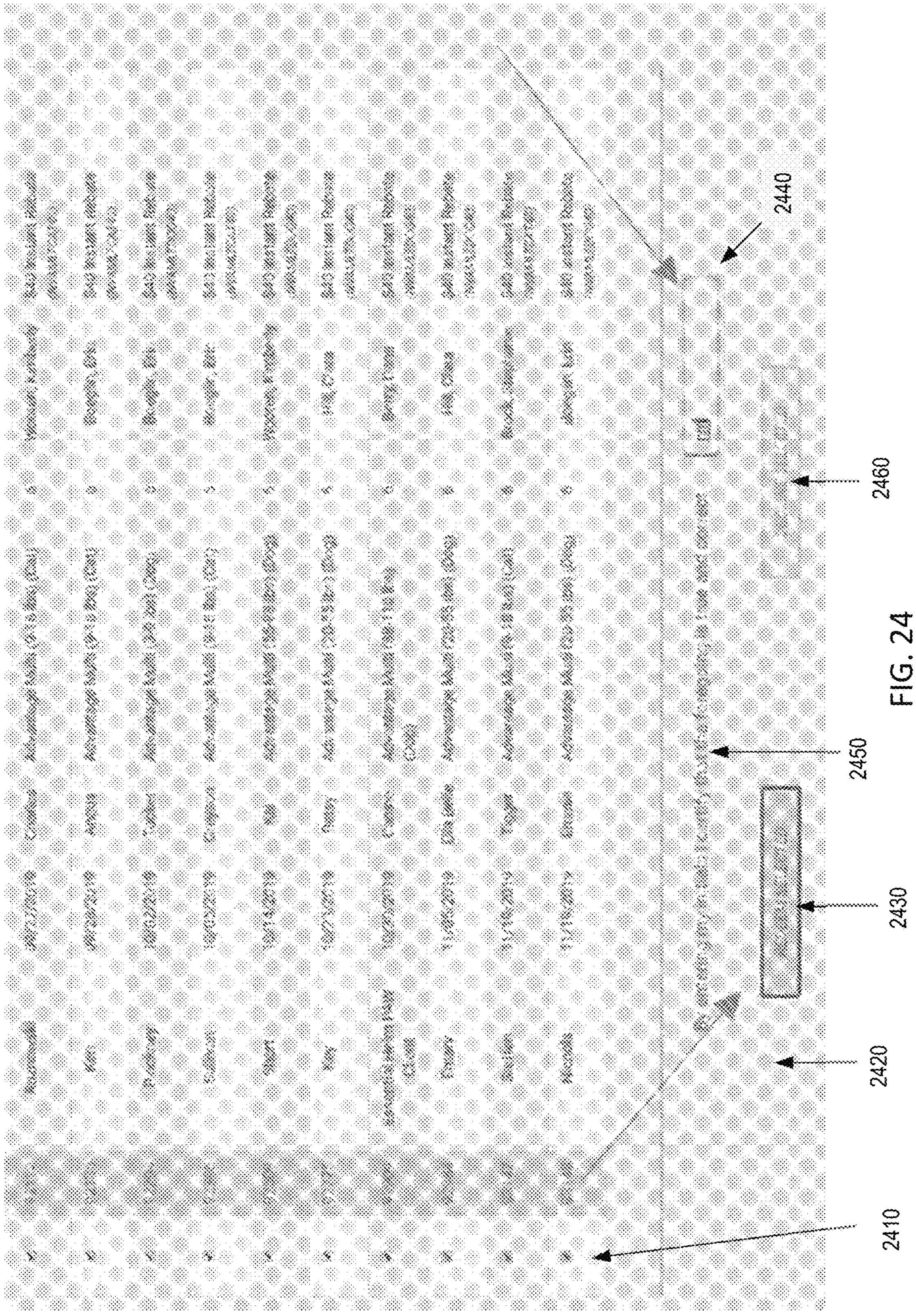
FIG. 24 is an exploded second view of pending coupon processing, according to one embodiment.

FIG. 24 is an exploded second view 2400 of pending coupon processing, according to one embodiment. The field is the invoice id 2410 of different transactions that have coupon processing pending with a select check box that can be marked to process multiple invoices at the same time. The next field is the consumer name 2420. The next field is the redeem 2430 selected that allows multiple invoices to be approved for redemption at the same time. The next field is the initials of the staff 2440 approving the invoices. The next field is the agreement 2450 that the staff member is certifying that the invoices are true and correct. The next field is multiple invoices 2460 can be selected to decline application of coupons.

The screen shows that a clinic has now selected offers to process. With the digital coupon system, a clinic may process hundreds of coupons in seconds, as opposed to having to create and submit coupons manually to each individual manufacturer (such as Elanco or Boehringer-Ingelheim). They simply make their selection, enter their initials as shown below, and click redeem. When compared to the manual submission of coupons, this step saves clinics about 10 minutes per invoice. Considering that clinics process hundreds of offers per week, these savings are considerable in terms of logistics (to retrieve the data for each coupon) and execution (fill out and mail paper forms).

Figure 25:
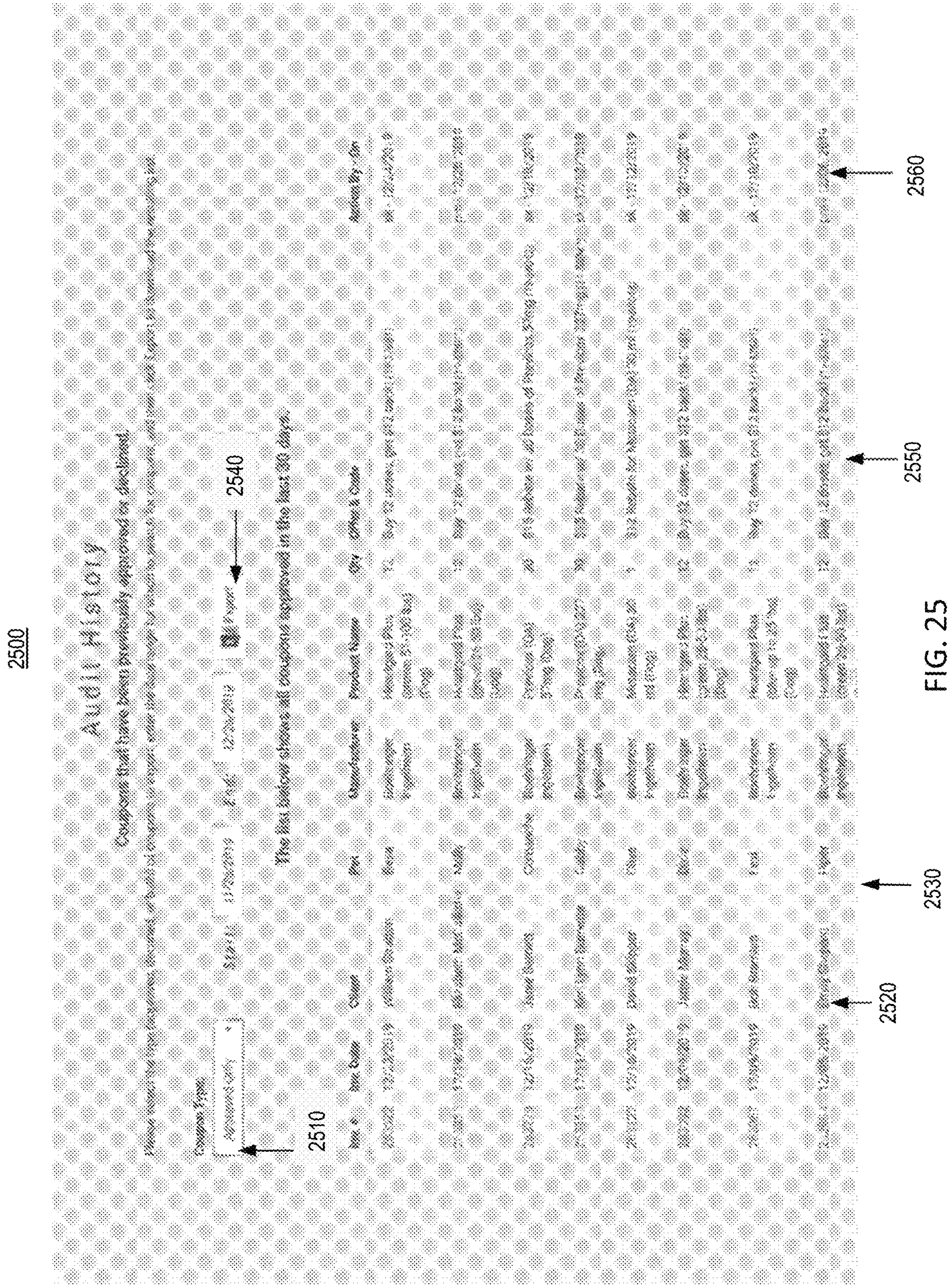
FIG. 25 is an exploded view of audit history on coupon processing, according to one embodiment.

FIG. 25 is an exploded view 2500 of audit history on coupon processing, according to one embodiment. The audit history may include history of redemptions or history of approved coupons that are applied to invoices by a clinic. The screenshot shows a recent history of submitted coupons. Also, the clinic can export any timeframe that they wish for the purpose of reconciliation or reporting.

The field is a category for filtering 2510 based on status type of approved or declined. The next field is the client, end-user or consumer information 2520. The next field is pet and manufacturer 2530. The next field is the invoice details 2540 can be exported to spreadsheet, xml, sql, word or pdf documents. The next field is the coupon applied information 2550. The next field gives the action taken by and date 2560. The submitted coupons are sent daily to their respective manufacturers. Electronic submission also cuts down on the delay clinics and clients experience when receiving replenishment doses or debit cards with rebates, as it does away with manual processing of scanning, evaluating, and entering data performed by third-party companies when dealing with hand-filled coupons.

Figure 26:
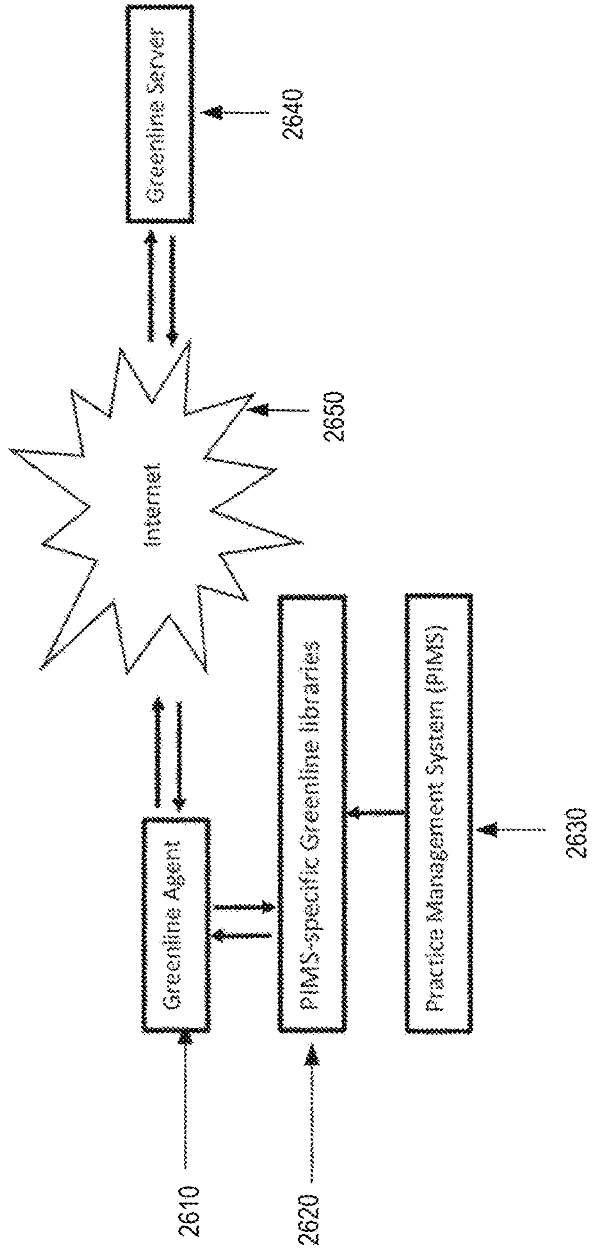
FIG. 26 is an exploded view of setting up agents and libraries for coupon processing, according to one embodiment.

FIG. 26 is an exploded view 2600 of setting up agents and libraries for coupon processing, according to one embodiment. The Processing Agent (or Agent for short) is a piece of software installed on a computer in the clinic to extract invoice, patient, client, product, reminders, and appointment data daily from the practice management system. These data are subsequently submitted to server for processing (e.g., coupon generation and wellness processing).

The major components shown in FIG. 26 are: Practice Management System 2630: Used by the clinic to manage client, patients, inventory, etc. PIMS-specific libraries 2620: Used by the Agent to extract the data from a given type of PIMS. The Agent 2610: The Agent communicates with the Processing (Greenline) Server 2640 to receive commands and send invoice data. The Processing Server is made of the coupon processor computing device. The internet 2650 connects all the computing devices.

Since each type of PIMS stores data in a different way, all the logic for data extraction for a given type of PIMS is encapsulated in a group of PIMS-dependent libraries. All libraries implement a common set of endpoints used by the Agent to read the data extracted by the library from the PIMS. This lets a single codebase (Agent) be used across multiple PIMS. The Agent subsequently sends the data through the Internet to the processing server, where is it processed. This is a classic client/server architecture, where the Agent acts as the client of the Processing Server. The Agent itself is made up of the components listed below and their ancillary files. First, Agent service: A Windows service-type application that is responsible for extracting data from the PIMS, and submitting the data to the Processing Server. Second, Sync Config: This application has a user interface through which the operator can configure the time of the synchronization operation so that it does not interfere with the clinic's normal operation; manually initiate a synchronization operation; define the persistence period of the logs collected during the normal operation; start and stop the Agent service.

Third, Config: provides a user interface that lets the operator configure the Agent to use a the PIMS installed at the clinic. Fourth, Update helper: Automatically updates the PIMS-specific libraries.

The daily synchronization operation performed by the Agent has several steps: Authenticate the Agent with the Processing Server; Submit a list of the PIMS-specific library files to the Processing Server to verify if any updates are available; Download and install any updates to the PIMS-specific library files; Download the start date of the invoices that need to be retrieved; Download data that indicate whether the following items need to be submitted in addition to invoice data: Product list, Appointments, Reminders, Full list of clients and patients, Extract the data request by the Processing Server, and Submit the extracted data. This daily sync operation is totally automated, transparent to the clinic, and typically takes only a few minutes. The Agent does not write any data to the PIMS's database to avoid interfering with the correct operation of the PIMS.

Figure 27:
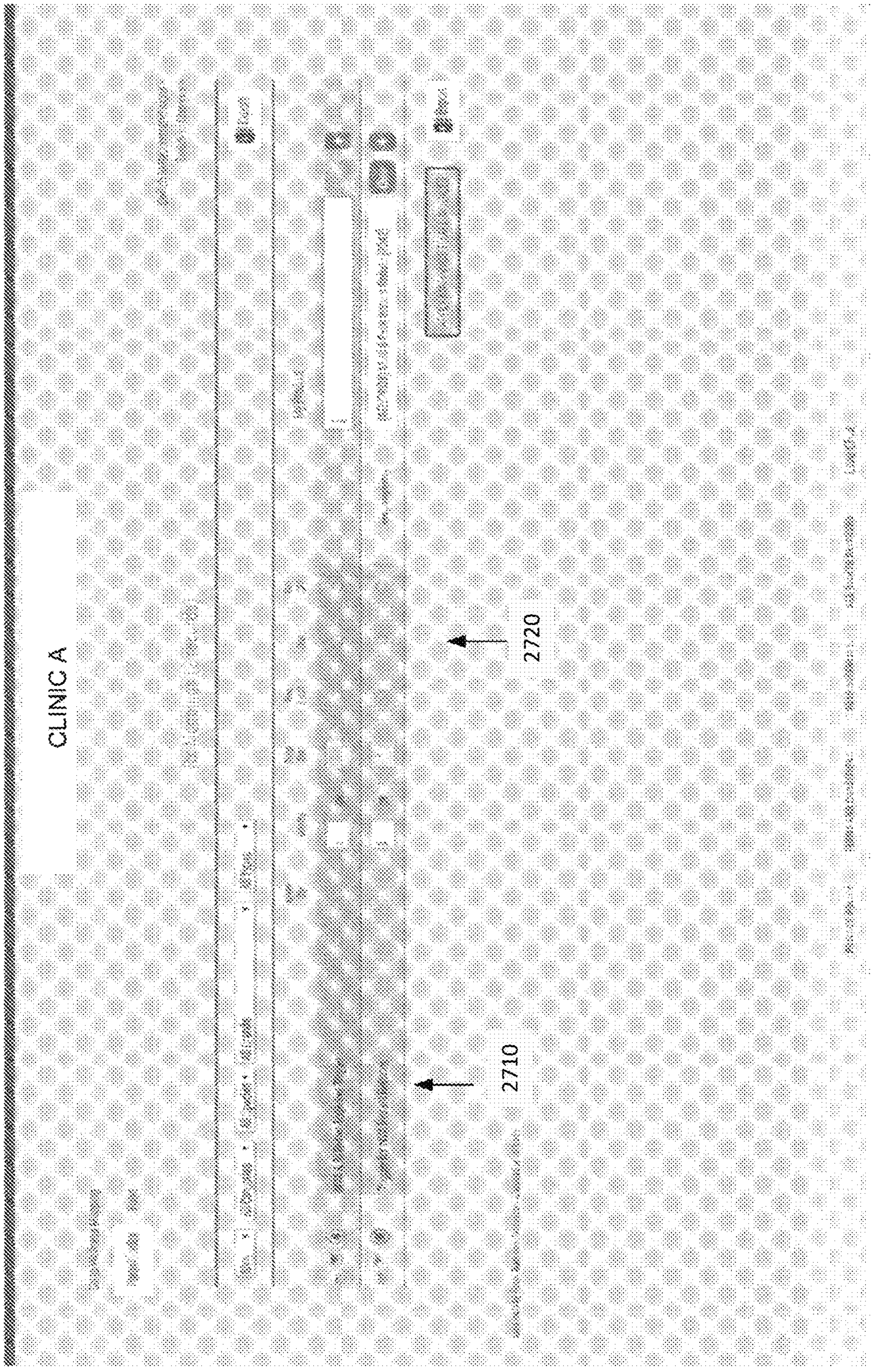
FIG. 27 is an exploded view of a clinic conforming product mappings and dosages, according to one embodiment.

FIG. 27 is an exploded view 2700 of a clinic conforming product mappings and dosages, according to one embodiment. The screenshot shows master mapping software below is an example of a "trigger code." A trigger code is a custom code created by the clinic at the request of a clinic operator. This code is always used in combination with other inventory codes in certain types of offers to inform the coupon processor that a particular offer is to be redeemed. In most cases, this is for instant rebate execution for the coupon. Different offers require the trigger code to be have a positive, negative, or zero price. Also, the actual description may matter and may need to contain certain keywords in order to create the redemption or for qualifying transaction in the clinic's audit portal.

After mapping is complete, the clinic operator will go through the available offers and determine which offers are available to the clinic. Not all offers are available to every clinic as some offers, for instance, are explicitly defined by the manufacturer to apply to a subset of clinics. The coupon code trigger code 2710 that has set parameters 2720 according to the product defined therein. Once in programs, the operator sees all active programs that the clinic has entered a voucher code for. This makes the offers available to that program visible to the clinic. The operator clicks on the program they want to setup coupons for.

Figure 28:
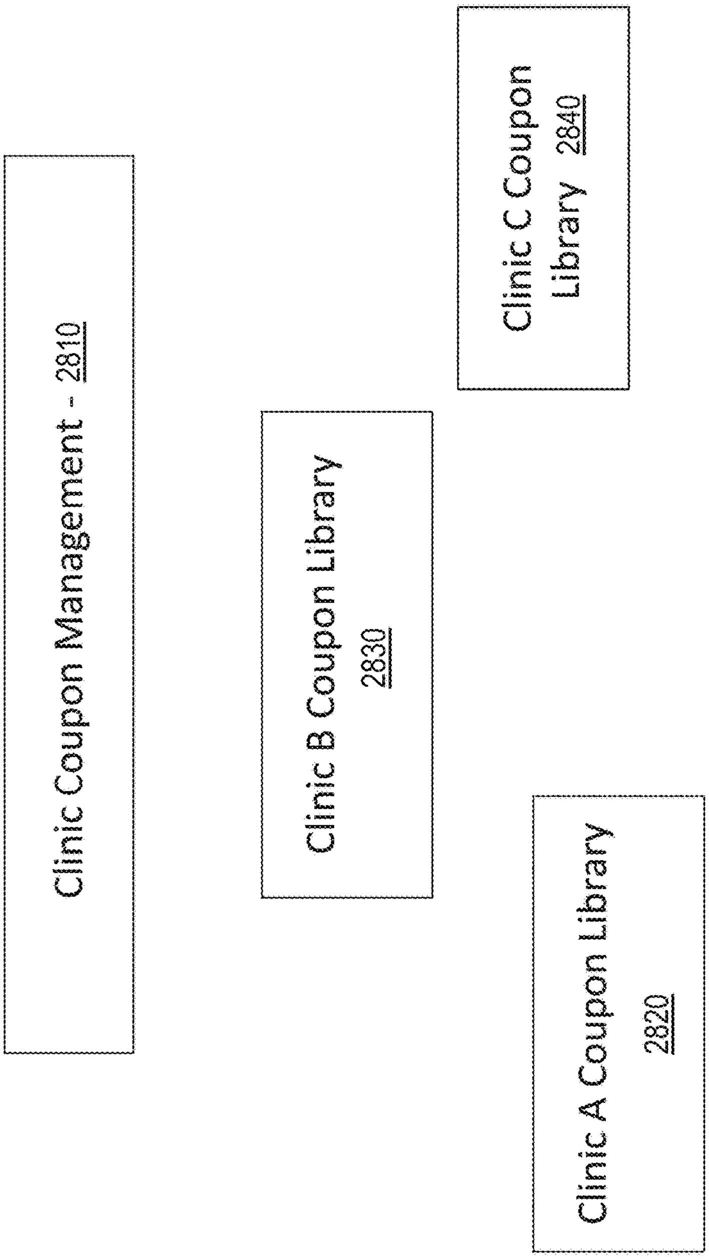
FIG. 28 is an exploded view of coupon management across different clinics, according to one embodiment.

FIG. 28 is an exploded view 2800 of coupon management across different clinics, according to one embodiment. The coupons available for a clinic are the coupons that the particular clinic can opt-in or opt-out as set by a manufacturer. The clinic coupon management 2810 for different clinics from the perspective of a manufacturer. Clinic A coupon library 2820 is available, Clinic B coupon library 2830 is available and clinic C coupon 2840 library is also available. In one embodiment, the coupon management computing device is configured to report coupon usage to the manufacturer. In one embodiment, the coupon management computing device is configured to report coupon usage at a clinic location. The coupon management computing device works with the coupon creator computing device.

Figure 29:
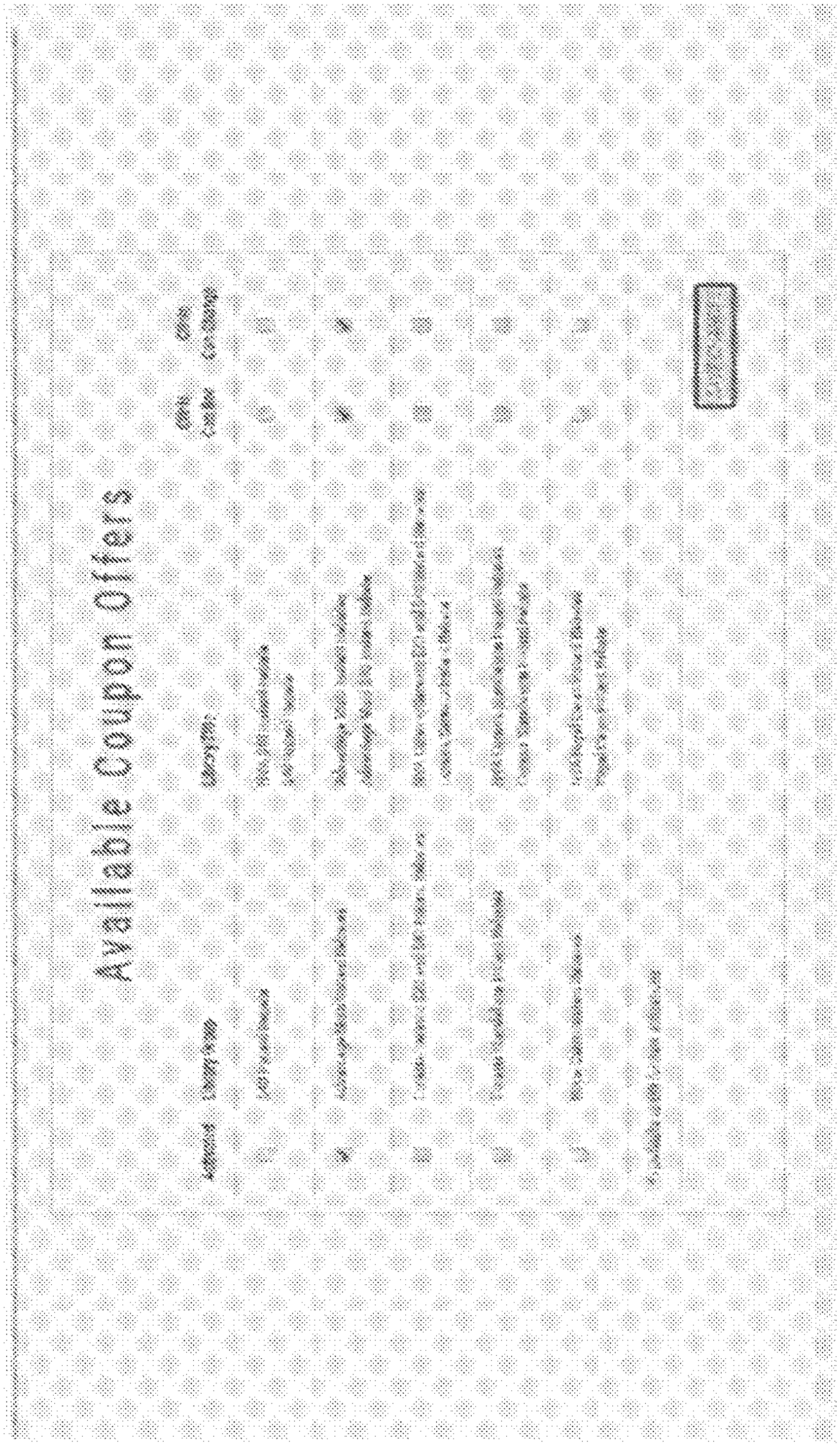
FIG. 29 is an exploded view of coupon offers, according to one embodiment.

FIG. 29 is an exploded view 2900 of coupon offers, according to one embodiment. The screen allows for customization of different coupon offers. The screen allows the operator to control the offers that are active, that the clinic can see, and the clinic can opt in or out. All the offers that appear here are initially set based on the voucher code used and the eligibility requirements of the manufacturer. In one embodiment, another tool of data validation and reporting includes the use of Location ID. The Location ID is a unique number that is shared between the coupons system and the manufacturer client to make sure all the data is assigned to the correct account. In one embodiment, the clinic login process to access coupon library requires clinic location registration and authentication.

Figure 30:
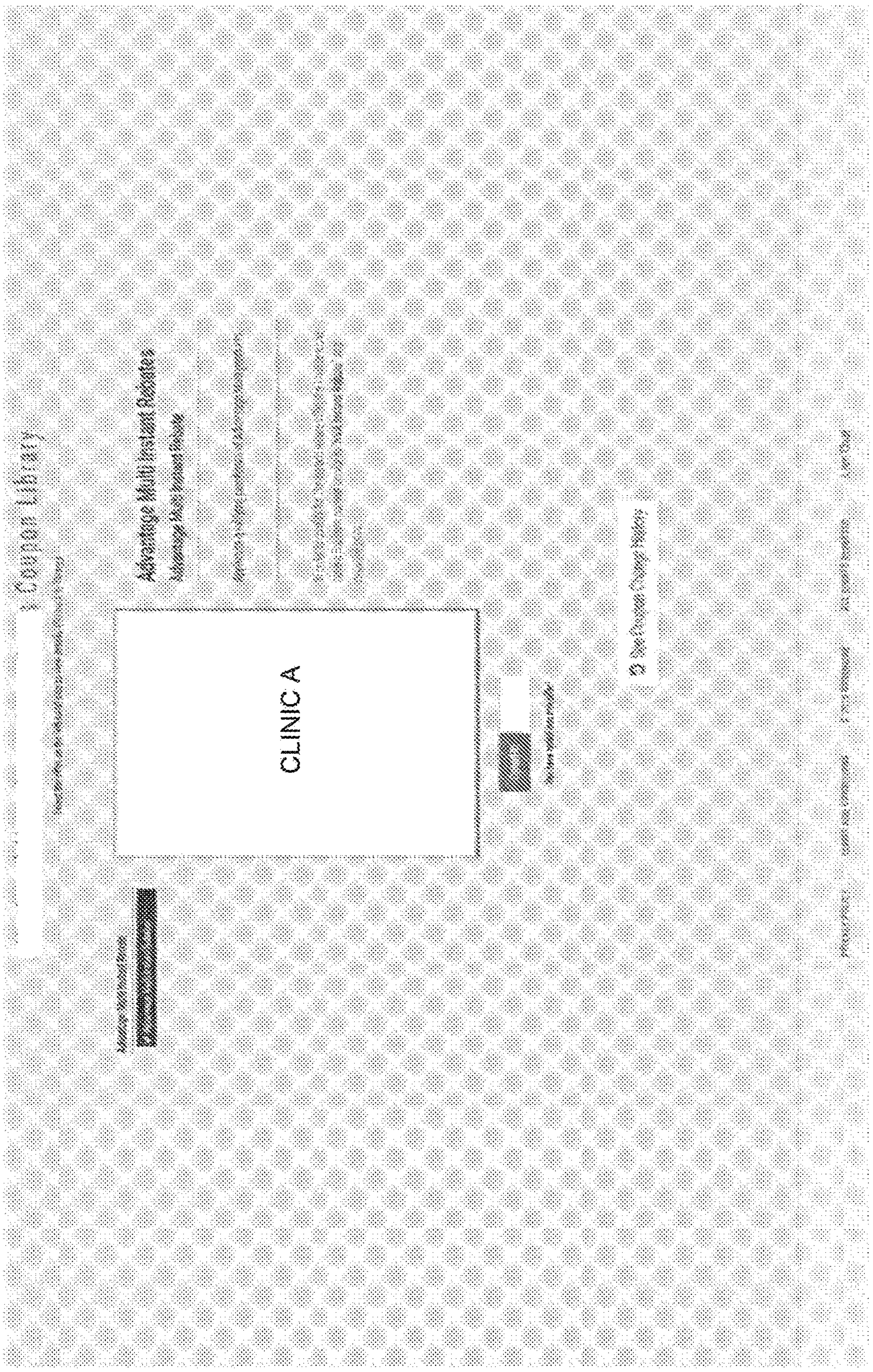
FIG. 30 is an exploded view of available coupons for a clinic, according to one embodiment.

FIG. 30 is an exploded view 3000 of available coupons for a clinic, according to one embodiment. The screenshot shows the coupons that the clinic can opt-in or opt-out of. Each coupon can be selected to see additional details including coupon types etc. The page also includes a coupon history and any changes made to the coupon after publication.

Figure 31:
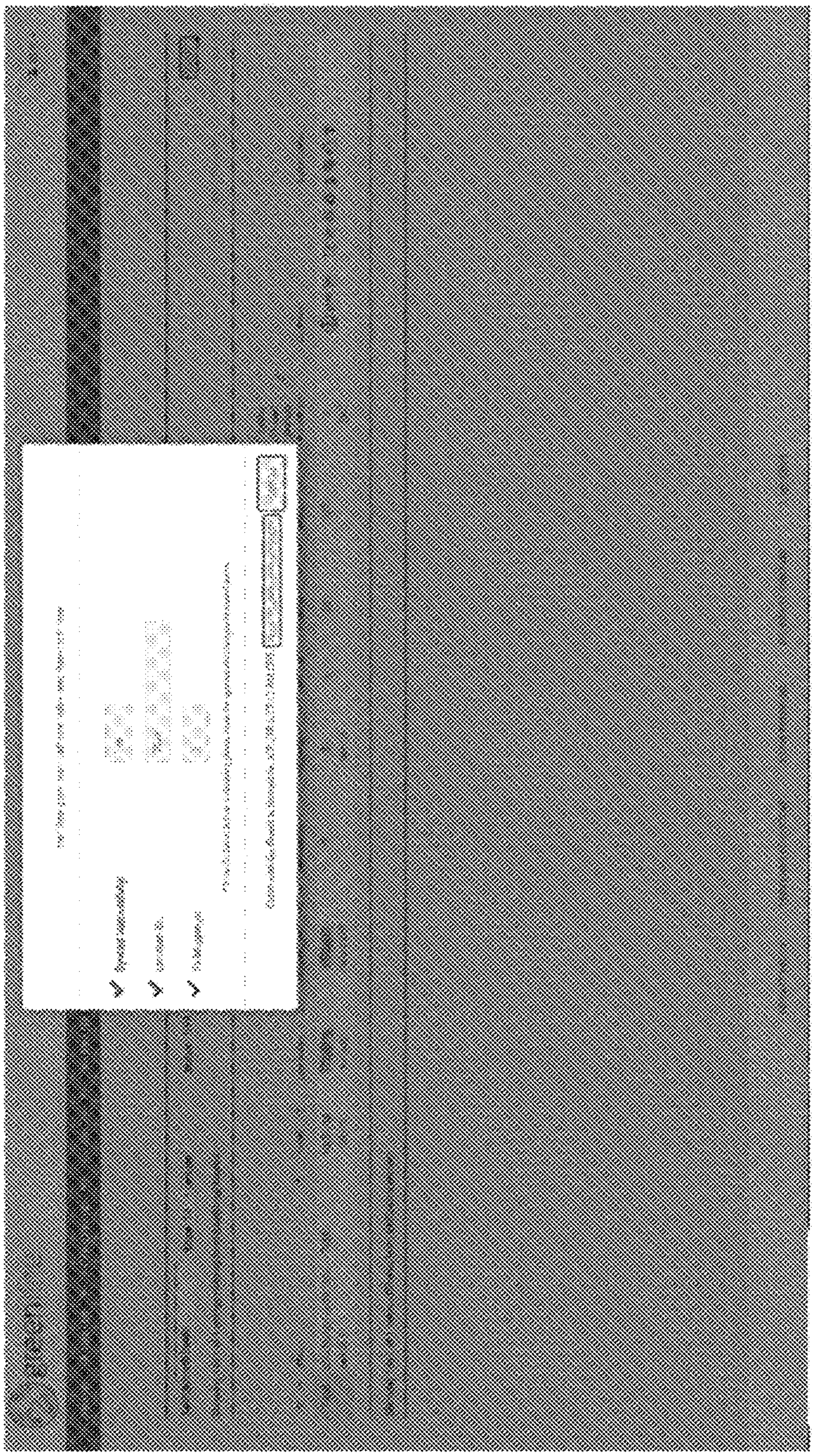
FIG. 31 is an exploded view of synching coupon processing, according to one embodiment.

FIG. 31 is an exploded view 3100 of synching coupon processing, according to one embodiment. The final step in the process of the clinic being ready to execute digital coupons is for the operator to "take the clinic Green". For a clinic to be taken Green, a series of requirements must be completed, such as having mapped products and being associated with a valid location identifier. Those requirements are validated by the digital coupon software, and shown to the operator before he or she can take the clinic Green. The requirements to "GoGreen" vary by manufacturer client and are customizable within the digital coupon software. The requirements ensure the coupon and wellness data submitted to the manufacturers is as accurate as possible to minimize processing issues. At this point, the clinic is now active for digital couponing.

In one embodiment, the process also includes checklist that is invoked at the beginning by the clinics to invoke digital coupons.

While the examples herein are shown for distribution network of products and services for pets that sold at different veterinary clinics using different veterinarians or service providers and sourced from different manufacturers, a person of ordinary skill in the art would understand that the disclosure can be applied to different types of distribution networks of products. For example, this could apply equally to a distribution network for contact lens and ophthalmologists, salons with beauty parlor products, fitness/gyms with instructors, or dentist with cosmetic teeth whitening products.

Several components described here, including clients, servers, and engines, can be compatible with or implemented using a cloud-based computing system. As used here, an overlay network including, for example, a peer to peer network, is a system that provides computing resources, software, and/or information to client systems by maintaining de-centralized services and resources that the client systems can access over a communications interface, such as a network. A person of ordinary skill in the art would understand that different modules or components described herein could be implemented using a cloud-based computing system. Such systems can involve a subscription for services or use a utility pricing model. Users can access the protocols of the distribution network through a web browser or other container application located on their client system.

The invention disclosure describes techniques that those of skill in the art can implement in numerous ways. For instance, those of skill in the art can implement the techniques described here using a process, an apparatus, a system, a composition of matter, a computer program product embodied on a computer-readable storage medium, and/or a processor, such as a processor configured to execute instructions stored on and/or provided by a memory coupled to the processor. Unless stated otherwise, a component such as a processor or a memory described as being configured to perform a task may be implemented as a general component that is configured to perform the task at a given time or a specific component that is manufactured to perform the task. As used here, the term 'processor' refers to one or more devices, circuits, and/or processing cores configured to process data, such as computer program instructions.

A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Techniques described here relate to apparatus for performing the operations. The apparatus can be specially constructed for the required purposes, or it can comprise a general-purpose computer selectively activated or reconfigured by a computer program stored in the computer. Such a computer program may be stored in a computer-readable storage medium, such as, but is not limited to, read-only memories (ROMs), random access memories (RAMS), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus. Although the foregoing implementations have been described in some detail for purposes of clarity of understanding, implementations are not necessarily limited to the details provided.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order. The structures and modules in the figures may be shown as distinct and communicating with only a few specific structures and not others. The structures may be merged with each other, may perform overlapping functions, and may communicate with other structures not shown to be connected in the figures.

The above-described functions and components may be comprised of instructions that are stored on a storage medium such as a computer readable medium. The instructions may be retrieved and executed by a processor. Some examples of instructions are software, program code, and firmware. Some examples of storage medium are memory devices, tapes, disks, integrated circuits, and servers. The instructions are operational when executed by the processor to direct the processor to operate in accord with some embodiments. Those skilled in the art are familiar with instructions, processor(s), and storage medium.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. A detailed description of one or more implementations of the invention is provided here along with accompanying figures that illustrate the principles of the invention. The invention is described in connection with such implementations, but the invention is not limited to any implementation. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The structures and modules in the figures may be shown as distinct and communicating with only a few specific structures and not others. The structures may be merged with each other, may perform overlapping functions, and may communicate with other structures not shown to be connected in the figures.

The invention claimed is:

1. A method of processing transactions across a distribution network of products through a plurality of clinics, the method executed by a computing device comprising a processor and a storage unit for storing data associated with a coupon library with available coupons together with their applicability requirements, the processor executing a program to function as a coupon library module, a coupon definition module, and a coupon processing module, the method comprising:

- presenting, via the computing device, a user interface to each clinic of the plurality of clinics, the user interface displaying one or more of the available coupons together with their applicability requirements stored in the coupon library;
- receiving, via the user interface, a selection for opt-in or opt-out for each displayed available coupon from each clinic of the plurality of clinics;
- for each respective clinic of the plurality of clinics:
  - customizing, via the coupon library module, the coupon library based at least on the selection for opt-in or opt-out for each displayed available coupon from the respective clinic;
  - generating, via the coupon definition module, a plurality of rules that define requirements for a transaction to qualify for a coupon based on a combination of parameters including one or more of the following: number of doses bought, number of doses previously bought, number of doses given for no charge to a client, patient's age, patient's weight, patient's species, patient's breed, or invoice date;
  - receiving, via the user interface, one or more voucher codes corresponding to a plurality of transactions performed at the respective clinic;
  - generating, via the computing device, one or more invoices based on the received plurality of transactions;
  - analyzing, via the coupon processing module, the generated one or more invoices to identify transactions that qualify for one or more coupons included in the customized coupon library for the respective clinic, based on the defined plurality of rules;
  - identifying, via the coupon processing module, one or more redemptions for the identified transactions based on successful application of the defined plurality of rules for the selected opted-in coupons for the respective clinic; and
  - generating, via the computing device, a list of the one or more redemptions for the respective clinic; and
- validating the generated lists across the distribution network of products.

2. The method of claim 1, further comprising customizing the coupon library based also on one or more of a location of the respective clinic, a list of products or services sold at the respective clinic, time of year, a number of clients of the respective clinic, types of patients of the respective clinic, and a number of patients of the respective clinic.

3. The method of claim 1, further comprising receiving, via the user interface, authentication information from each clinic to access the coupon library.

4. The method of claim 1, further comprising reporting, via the computing device, the validated lists of the one or more redemptions to one or more manufacturers.

5. The method of claim 1, wherein validating the generated lists further comprises permitting, via the user interface, the respective clinic to approve or reject each redemption of the one or more redemptions.

6. The method of claim 1, further comprising, via the computing device, permitting instant rebate execution for applicable redemptions to automatically reduce the invoice price.

7. The method of claim 1, further comprising conforming the customized coupon library across the distribution network of products by categorizing duplicate codes correctly to map to a same transaction code at a clinic location, thereby avoiding duplicate transaction codes at the distribution network.

8. The method of claim 1, wherein identifying the one or more redemptions for the identified transactions further includes identifying a redemption with a maximum discount for the identified transactions.

9. A system for processing transactions across a distribution network of products through a plurality of clinics comprising:

- one or more storage devices configured to store data associated with a coupon library with available coupons together with their applicability requirements; and
- one or more processors configured to:
  - present a user interface to each clinic of the plurality of clinics, the user interface displaying one or more of the available coupons together with their applicability requirements stored in the coupon library;
  - receive, via the user interface, a selection for opt-in or opt-out for each displayed available coupon from each clinic of the plurality of clinics;
  - for each respective clinic of the plurality of clinics:
    - customize the coupon library based at least on the selection for opt-in or opt-out for each displayed available coupon from the respective clinic;
    - generate a plurality of rules that define requirements for a transaction to qualify for a coupon based on a combination of parameters including one or more of the following: number of doses bought, number of doses previously bought, number of doses given for no charge to a client, patient's age, patient's weight, patient's species, patient's breed, or invoice date;
    - receive, via the user interface, one or more voucher codes corresponding to a plurality of transactions performed at the respective clinic;
    - generate one or more invoices based on the received plurality of transactions;
    - analyze the generated one or more invoices to identify transactions that qualify for one or more coupons included in the customized coupon library for the respective clinic, based on the defined plurality of rules;
    - identify one or more redemptions for the identified transactions based on successful application of the defined plurality of rules for the selected opted-in coupons for the respective clinic; and generate a list of the one or more redemptions for the respective clinic; and validate the generated lists across the distribution network of products.

10. The system of claim 9, wherein the one or more processors are further configured to customize the coupon library based also on one or more of a location of the respective clinic, a list of products or services sold at the respective clinic, time of year, a number of clients of the respective clinic, types of patients of the respective clinic, and a number of patients of the respective clinic.

11. The system of claim 9, wherein the one or more processors are further configured to receive, via the user interface, authentication information from each clinic to access the coupon library.

12. The system of claim 9, wherein the one or more processors are further configured to report the validated lists of the one or more redemptions to one or more manufacturers.

13. The system of claim 9, wherein the one or more processors are further configured to permit, via the user interface, the respective clinic to approve or reject each redemption of the one or more redemptions.

14. The system of claim 9, wherein the one or more processors are further configured to permit instant rebate execution for applicable redemptions to automatically reduce the invoice price.

15. The system of claim 9, wherein the one or more processors are further configured to conform the customized coupon library across the distribution network of products by categorizing duplicate codes correctly to map to a same transaction code at a clinic location, thereby avoiding duplicate transaction codes at the distribution network.

16. The system of claim 9, wherein identifying the one or more redemptions for the identified transactions further includes identifying a redemption with a maximum discount for the identified transactions.

17. A non-transitory computer-readable medium storing a program that performs a method of processing transactions across a distribution network of products through a plurality of clinics, the method executed by a computing device comprising a processor and a storage unit for storing data associated with a coupon library with available coupons together with their applicability requirements, the processor executing a program to function as a coupon library module, a coupon definition module, and a coupon processing module, the method comprising:

presenting, via the computing device, a user interface to each clinic of the plurality of clinics, the user interface displaying one or more of the available coupons together with their applicability requirements stored in the coupon library;

receiving, via the user interface, a selection for opt-in or opt-out for each displayed available coupon from each clinic of the plurality of clinics;

for each respective clinic of the plurality of clinics:

customizing, via the coupon library module, the coupon library based at least on the selection for opt-in or opt-out for each displayed available coupon from the respective clinic;

generating, via the coupon definition module, a plurality of rules that define requirements for a transaction to qualify for a coupon based on a combination of parameters including one or more of the following: number of doses bought, number of doses previously bought, number of doses given for no charge to a client, patient's age, patient's weight, patient's species, patient's breed, or invoice date;

receiving, via the user interface, one or more voucher codes corresponding to a plurality of transactions performed at the respective clinic;

generating, via the computing device, one or more invoices based on the received plurality of transactions;

analyzing, via the coupon processing module, the generated one or more invoices to identify transactions that qualify for one or more coupons included in the customized coupon library for the respective clinic, based on the defined plurality of rules;

identifying, via the coupon processing module, one or more redemptions for the identified transactions based on successful application of the defined plurality of rules for the selected opted-in coupons for the respective clinic; and generating, via the computing device, a list of the one or more redemptions for the respective clinic; and validating the generated lists across the distribution network of products.

* * * * *